United States Patent
Mallina et al.

(10) Patent No.: US 12,540,551 B1
(45) Date of Patent: Feb. 3, 2026

(54) GAS TURBINE ENGINES INCLUDING SPLITTERED AIRFOILS

(71) Applicants: General Electric Company, Evendale, OH (US); General Electric Deutschland Holding GmbH, Frankfurt (DE)

(72) Inventors: Ramakrishna Venkata Mallina, Mason, OH (US); Anthony Louis DiPietro, Jr., Evendale, OH (US); Gregory John Kajfasz, Evendale, OH (US); David Paul Lurie, Evendale, OH (US); Rudolf K. Selmeier, Fahrenzhausen (DE); Benjamin Walther, Garching (DE); Christofer Mathias Kendall-Torry, Garching (DE); Taylan Ercan, Garching (DE); Sungho Yoon, Garching (DE)

(73) Assignees: General Electric Company, Evendale, OH (US); General Electric Deutschland Holding GmbH, Frankfurt (DE)

( * ) Notice: Subject to any disclaimer, the term of this patent is extended or adjusted under 35 U.S.C. 154(b) by 0 days.

(21) Appl. No.: 19/256,300

(22) Filed: Jul. 1, 2025

(51) Int. Cl.
*F01D 5/14* (2006.01)

(52) U.S. Cl.
CPC .......... *F01D 5/141* (2013.01); *F05D 2220/36* (2013.01); *F05D 2240/303* (2013.01); *F05D 2240/304* (2013.01)

(58) Field of Classification Search
CPC ................. F01D 5/141; F05D 2220/36; F05D 2240/303; F05D 2240/304
See application file for complete search history.

(56) References Cited

U.S. PATENT DOCUMENTS

| | | | |
|---|---|---|---|
| 2,264,297 | A | 12/1941 | Clay |
| 2,533,791 | A | 12/1950 | Groenenberg |

(Continued)

FOREIGN PATENT DOCUMENTS

| | | | |
|---|---|---|---|
| CN | 1603596 | A | 4/2005 |
| CN | 101173672 | A | 5/2008 |

(Continued)

OTHER PUBLICATIONS

Bae, Integrally Cored Ceramic Investment Casting Mold Fabricated by Ceramic Stereolithography, Chapter 5, A Dissertation Submitted in Partial Fulfillment of the Requirements for the Degree of Doctor of Philosophy, Materials and Engineering, 2008, pp. 102-139.

(Continued)

*Primary Examiner* — Nathaniel E Wiehe
*Assistant Examiner* — Theodore C Ribadeneyra
(74) *Attorney, Agent, or Firm* — Dority & Manning, P.A.

(57) ABSTRACT

A compressor section for a gas turbine engine defining a centerline axis, a radial direction, and a circumferential direction includes a hub extending along the centerline axis, a plurality of non-splittered airfoils extending from the hub from an airfoil root to an airfoil tip opposite the airfoil root, and a plurality of splittered airfoils extending from a splittered root to a splittered tip. Each of the non-splittered airfoils include an airfoil leading edge, an airfoil trailing edge, an airfoil pressure side, and an airfoil suction side. Each of the plurality of splittered airfoils include a splittered leading edge, a splittered trailing edge, a splittered pressure side, and a splittered suction. Each of the plurality of splittered airfoils are disposed between the non-splittered airfoils, and each of the plurality of splittered airfoils include a splittered root coupled to the hub and a splittered tip opposite the splittered root.

20 Claims, 22 Drawing Sheets

(56) References Cited

U.S. PATENT DOCUMENTS

| | | | |
|---|---|---|---|
| 2,623,721 A | 12/1952 | Harrington | |
| 2,839,239 A | 6/1958 | Stalker | |
| 2,920,864 A | 1/1960 | Lee | |
| 2,953,295 A | 9/1960 | Stalker | |
| 3,039,736 A | 6/1962 | Pon | |
| 3,173,604 A | 3/1965 | Sheets et al. | |
| 3,193,185 A | 7/1965 | Erwin et al. | |
| 3,420,055 A | 1/1969 | Lavash | |
| 3,528,250 A | 9/1970 | Johnson | |
| 3,628,885 A | 12/1971 | Sidenstick | |
| 3,651,645 A | 3/1972 | Grieb | |
| 3,692,425 A | 9/1972 | Erwin | |
| 3,779,007 A | 12/1973 | Lavash | |
| 4,012,012 A | 3/1977 | Ligler | |
| 4,064,692 A | 12/1977 | Johnson et al. | |
| 4,078,604 A | 3/1978 | Christl et al. | |
| 4,078,761 A | 3/1978 | Thompson | |
| 4,120,150 A | 10/1978 | Wakeman | |
| 4,137,705 A | 2/1979 | Andersen et al. | |
| 4,254,618 A | 3/1981 | Elovic | |
| 4,263,786 A | 4/1981 | Eng | |
| 4,512,718 A | 4/1985 | Stargardter | |
| 4,546,605 A | 10/1985 | Mortimer et al. | |
| 4,624,104 A * | 11/1986 | Stroem | F01D 5/148 |
| | | | 415/115 |
| 4,696,156 A | 9/1987 | Burr et al. | |
| 4,741,152 A | 5/1988 | Burr et al. | |
| 4,773,212 A | 9/1988 | Griffin et al. | |
| 4,776,536 A | 10/1988 | Hudson et al. | |
| 4,966,005 A | 10/1990 | Cowell et al. | |
| 5,002,461 A | 3/1991 | Young et al. | |
| 5,024,580 A | 6/1991 | Olive | |
| 5,121,598 A | 6/1992 | Butler | |
| 5,152,146 A | 10/1992 | Butler | |
| 5,152,661 A | 10/1992 | Sheets | |
| 5,177,951 A | 1/1993 | Butler | |
| 5,203,163 A | 4/1993 | Parsons | |
| 5,236,307 A | 8/1993 | Ng et al. | |
| 5,241,814 A | 9/1993 | Butler | |
| 5,255,505 A | 10/1993 | Cloyd et al. | |
| 5,256,340 A | 10/1993 | Allison et al. | |
| 5,261,227 A | 11/1993 | Giffin, III | |
| 5,296,308 A | 3/1994 | Caccavale et al. | |
| 5,297,386 A | 3/1994 | Kervistin | |
| 5,299,914 A | 4/1994 | Schilling | |
| 5,305,616 A | 4/1994 | Coffinberry | |
| 5,317,877 A | 6/1994 | Stuart | |
| 5,370,499 A | 12/1994 | Lee | |
| 5,387,380 A | 2/1995 | Cima et al. | |
| 5,392,614 A | 2/1995 | Coffinberry | |
| 5,402,638 A | 4/1995 | Johnson | |
| 5,414,992 A | 5/1995 | Glickstein | |
| 5,511,374 A | 4/1996 | Glickstein et al. | |
| 5,544,700 A | 8/1996 | Shagoury | |
| 5,545,003 A | 8/1996 | O'Connor et al. | |
| 5,553,449 A | 9/1996 | Rodgers et al. | |
| 5,558,303 A | 9/1996 | Koethe et al. | |
| 5,615,547 A | 4/1997 | Beutin et al. | |
| 5,619,855 A | 4/1997 | Burrus | |
| 5,639,217 A | 6/1997 | Ohtsuki et al. | |
| 5,680,767 A | 10/1997 | Lee et al. | |
| 5,724,816 A | 3/1998 | Ritter et al. | |
| 5,782,076 A | 7/1998 | Huber et al. | |
| 5,802,841 A | 9/1998 | Maeda | |
| 5,819,525 A | 10/1998 | Gaul et al. | |
| 5,853,044 A | 12/1998 | Wheaton et al. | |
| 5,918,458 A | 7/1999 | Coffinberry et al. | |
| 6,017,186 A | 1/2000 | Hoeger et al. | |
| 6,106,229 A | 8/2000 | Nikkanen et al. | |
| 6,117,612 A | 9/2000 | Halloran et al. | |
| 6,182,435 B1 | 2/2001 | Niggemann et al. | |
| 6,182,458 B1 | 2/2001 | Franklin, Jr. | |
| 6,253,554 B1 | 7/2001 | Kobayashi et al. | |
| 6,302,191 B1 | 10/2001 | Wickham et al. | |
| 6,347,660 B1 | 2/2002 | Sikkenga et al. | |
| 6,415,595 B1 | 7/2002 | Wilmot, Jr. et al. | |
| 6,478,545 B2 | 11/2002 | Crall et al. | |
| 6,508,626 B1 | 1/2003 | Sakurai et al. | |
| 6,511,294 B1 | 1/2003 | Mielke et al. | |
| 6,578,362 B1 | 6/2003 | Coffinberry | |
| 6,584,778 B1 | 7/2003 | Griffiths et al. | |
| 6,595,749 B2 | 7/2003 | Lee et al. | |
| 6,805,535 B2 | 10/2004 | Tiemann | |
| 6,910,855 B2 | 6/2005 | Dailey et al. | |
| 6,913,064 B2 | 7/2005 | Beals et al. | |
| 6,990,797 B2 | 1/2006 | Venkataramani et al. | |
| 6,993,913 B2 | 2/2006 | Kobayashi et al. | |
| 7,000,404 B2 | 2/2006 | Palmisano et al. | |
| 7,094,027 B2 | 8/2006 | Turner et al. | |
| 7,140,174 B2 | 11/2006 | Johnson | |
| 7,143,581 B2 | 12/2006 | Kobayashi et al. | |
| 7,188,464 B2 | 3/2007 | Ackerman et al. | |
| 7,216,475 B2 | 5/2007 | Johnson | |
| 7,231,769 B2 | 6/2007 | Spadaccini et al. | |
| 7,234,917 B2 | 6/2007 | Dailey et al. | |
| 7,260,926 B2 | 8/2007 | Sabatino et al. | |
| 7,306,026 B2 | 12/2007 | Memmen | |
| 7,395,657 B2 | 7/2008 | Johnson | |
| 7,444,802 B2 | 11/2008 | Parry | |
| 7,448,433 B2 | 11/2008 | Ortiz et al. | |
| 7,452,202 B2 | 11/2008 | Gram | |
| 7,465,155 B2 | 12/2008 | Nguyen | |
| 7,481,214 B2 | 1/2009 | Eilers | |
| 7,527,475 B1 | 5/2009 | Liang | |
| 7,533,713 B2 | 5/2009 | Pfeifer et al. | |
| 7,608,131 B2 | 10/2009 | Jensen | |
| 7,610,946 B2 | 11/2009 | Morris et al. | |
| 7,624,592 B2 | 12/2009 | Lui et al. | |
| 7,716,913 B2 | 5/2010 | Rolt | |
| 7,717,676 B2 | 5/2010 | Cunha et al. | |
| 7,753,104 B2 | 7/2010 | Luczak et al. | |
| 7,770,381 B2 | 8/2010 | Johnson et al. | |
| 7,836,680 B2 | 11/2010 | Schwarz et al. | |
| 7,926,289 B2 | 4/2011 | Lee et al. | |
| 8,015,788 B2 | 9/2011 | Stephenson et al. | |
| 8,056,345 B2 | 11/2011 | Norris et al. | |
| 8,066,052 B2 | 11/2011 | Blair | |
| 8,167,548 B2 | 5/2012 | Greim et al. | |
| 8,182,204 B2 | 5/2012 | Durocher et al. | |
| 8,303,258 B2 | 11/2012 | Aubin | |
| 8,307,662 B2 | 11/2012 | Turco | |
| 8,403,645 B2 | 3/2013 | Barnes et al. | |
| 8,506,836 B2 | 8/2013 | Szuromi et al. | |
| 8,529,210 B2 | 9/2013 | Merritt et al. | |
| 8,641,807 B2 | 2/2014 | Thomas | |
| 8,747,055 B2 | 6/2014 | McCune et al. | |
| 8,789,376 B2 | 7/2014 | Coffinberry | |
| 8,851,151 B2 | 10/2014 | Frasier et al. | |
| 8,858,161 B1 | 10/2014 | Ryznic et al. | |
| 8,920,127 B2 | 12/2014 | McCaffrey | |
| 8,943,827 B2 | 2/2015 | Prociw et al. | |
| 8,955,330 B2 | 2/2015 | Narcus et al. | |
| 8,961,114 B2 | 2/2015 | Ruthemeyer | |
| 8,985,540 B1 | 3/2015 | Slesinski | |
| 9,039,382 B2 | 5/2015 | Stapleton | |
| 9,068,460 B2 * | 6/2015 | Suciu | F01D 1/04 |
| 9,079,357 B2 | 7/2015 | Ebert et al. | |
| 9,140,128 B2 | 9/2015 | Aggarwala et al. | |
| 9,200,855 B2 | 12/2015 | Kington et al. | |
| 9,410,482 B2 | 8/2016 | Krautheim et al. | |
| 9,422,063 B2 | 8/2016 | Diaz | |
| 9,429,072 B2 | 8/2016 | Diaz et al. | |
| 9,458,764 B2 | 10/2016 | Alecu et al. | |
| 9,650,147 B2 | 5/2017 | Selechert et al. | |
| 9,677,501 B2 | 6/2017 | Pierluissi et al. | |
| 9,683,449 B2 | 6/2017 | He et al. | |
| 9,835,035 B2 | 12/2017 | Mueller et al. | |
| 9,845,768 B2 | 12/2017 | Pesyna et al. | |
| 9,874,221 B2 | 1/2018 | DiPietro, Jr. et al. | |
| 9,920,710 B2 | 3/2018 | Dawson et al. | |
| 9,938,984 B2 | 4/2018 | DiPietro, Jr. et al. | |
| 9,995,314 B2 | 6/2018 | Miller et al. | |
| 10,022,790 B2 | 7/2018 | Lee et al. | |
| 10,100,736 B2 | 10/2018 | Niergarth et al. | |

(56) References Cited

U.S. PATENT DOCUMENTS

| | | |
|---|---|---|
| 10,260,419 B2 | 4/2019 | Cerny et al. |
| 10,280,486 B2 | 5/2019 | Zhang et al. |
| 10,352,243 B2 | 7/2019 | Mizukami et al. |
| 10,399,270 B2 | 9/2019 | Xu et al. |
| 10,578,028 B2 | 3/2020 | Becker, Jr. |
| 10,654,579 B2 | 5/2020 | Diaz |
| 10,883,516 B2 | 1/2021 | Mandel et al. |
| 11,351,599 B2 | 6/2022 | Deines et al. |
| 2001/0024000 A1 | 9/2001 | Lee et al. |
| 2005/0109016 A1 | 5/2005 | Ullyott |
| 2005/0205232 A1 | 9/2005 | Wang et al. |
| 2007/0154314 A1 | 7/2007 | Jarrah et al. |
| 2008/0006384 A1 | 1/2008 | Memmen |
| 2008/0080979 A1 | 4/2008 | Brassfield et al. |
| 2008/0110603 A1 | 5/2008 | Fellague et al. |
| 2008/0135722 A1 | 6/2008 | Wang et al. |
| 2008/0190093 A1 | 8/2008 | Gauthier et al. |
| 2008/0310955 A1 | 12/2008 | Norris et al. |
| 2008/0314573 A1 | 12/2008 | Schwarz et al. |
| 2009/0060714 A1 | 3/2009 | Moors |
| 2009/0175718 A1 | 7/2009 | Diaz et al. |
| 2009/0188234 A1 | 7/2009 | Suciu et al. |
| 2009/0211273 A1 | 8/2009 | Klewer |
| 2009/0229812 A1 | 9/2009 | Pineo et al. |
| 2010/0003619 A1 | 1/2010 | Das et al. |
| 2010/0025001 A1 | 2/2010 | Lee et al. |
| 2010/0028645 A1 | 2/2010 | Maguire et al. |
| 2010/0068464 A1 | 3/2010 | Meyer |
| 2010/0068465 A1 | 3/2010 | Su et al. |
| 2010/0107603 A1 | 5/2010 | Smith |
| 2010/0139288 A1 | 6/2010 | Rago |
| 2010/0158684 A1 | 6/2010 | Baralon |
| 2010/0170262 A1 | 7/2010 | Kaslusky et al. |
| 2010/0192593 A1 | 8/2010 | Brown et al. |
| 2010/0212857 A1 | 8/2010 | Bulin et al. |
| 2011/0079683 A1 | 4/2011 | Stolte et al. |
| 2011/0088405 A1 | 4/2011 | Turco |
| 2011/0132562 A1 | 6/2011 | Merrill et al. |
| 2011/0132563 A1 | 6/2011 | Merrill et al. |
| 2011/0150634 A1 | 6/2011 | Bajusz et al. |
| 2011/0162387 A1 | 7/2011 | Chir et al. |
| 2011/0302928 A1 | 12/2011 | Mudawar |
| 2011/0310370 A1 | 12/2011 | Rohner et al. |
| 2011/0314835 A1 | 12/2011 | Liu |
| 2012/0067055 A1 | 3/2012 | Held |
| 2012/0174583 A1 | 7/2012 | Lehar |
| 2012/0192578 A1 | 8/2012 | Finney |
| 2012/0243970 A1 | 9/2012 | Hellgren et al. |
| 2012/0248657 A1 | 10/2012 | Ebert et al. |
| 2012/0297789 A1 | 11/2012 | Coffinberry |
| 2013/0051996 A1 | 2/2013 | Hoeger et al. |
| 2013/0104564 A1 | 5/2013 | Arar |
| 2013/0186100 A1 | 7/2013 | Rhoden et al. |
| 2013/0195658 A1 | 8/2013 | Saito et al. |
| 2013/0224423 A1 | 8/2013 | Mikulak et al. |
| 2013/0247587 A1 | 9/2013 | Lo |
| 2013/0333855 A1 | 12/2013 | Merrill et al. |
| 2014/0079540 A1 | 3/2014 | Morris et al. |
| 2014/0182264 A1 | 7/2014 | Weisgerber et al. |
| 2014/0230444 A1 | 8/2014 | Hao et al. |
| 2014/0245741 A1 | 9/2014 | He et al. |
| 2014/0255159 A1 | 9/2014 | Paradis et al. |
| 2014/0271129 A1 | 9/2014 | Mueller et al. |
| 2014/0314549 A1 | 10/2014 | Pakkala et al. |
| 2014/0328675 A1 | 11/2014 | Derclaye et al. |
| 2014/0348660 A1 | 11/2014 | Guendogdu et al. |
| 2014/0352315 A1 | 12/2014 | Diaz |
| 2014/0352562 A1 | 12/2014 | Raymond, Jr. |
| 2015/0000291 A1 | 1/2015 | Smith et al. |
| 2015/0037601 A1 | 2/2015 | Blackmore |
| 2015/0048209 A1 | 2/2015 | Hoyt et al. |
| 2015/0064015 A1 | 3/2015 | Perez |
| 2015/0068629 A1 | 3/2015 | Kottilingam et al. |
| 2015/0076739 A1 | 3/2015 | Batchelder |
| 2015/0090070 A1 | 4/2015 | Etter et al. |
| 2015/0100607 A1 | 4/2015 | Kobashi et al. |
| 2015/0114611 A1 | 4/2015 | Morris et al. |
| 2015/0202683 A1 | 7/2015 | Bunker |
| 2015/0209910 A1 | 7/2015 | Denney et al. |
| 2015/0306657 A1 | 10/2015 | Frank |
| 2015/0321249 A1 | 11/2015 | Shah et al. |
| 2015/0321250 A1 | 11/2015 | Xu |
| 2015/0337730 A1 | 11/2015 | Kupiszewski et al. |
| 2015/0354465 A1 | 12/2015 | Suciu et al. |
| 2016/0038866 A1 | 2/2016 | Gibson et al. |
| 2016/0059302 A1 | 3/2016 | McBrien et al. |
| 2016/0108814 A1 | 4/2016 | Schmitz |
| 2016/0201684 A1 | 7/2016 | Schwarz et al. |
| 2016/0221262 A1 | 8/2016 | Das et al. |
| 2016/0298550 A1 | 10/2016 | Kupratis et al. |
| 2016/0326963 A1 | 11/2016 | Yamazaki |
| 2016/0341126 A1 | 11/2016 | Kupratis et al. |
| 2017/0022835 A1* | 1/2017 | Clark ................. F01D 9/06 |
| 2017/0030266 A1 | 2/2017 | Cerny et al. |
| 2017/0044984 A1 | 2/2017 | Pesyna et al. |
| 2017/0087630 A1 | 3/2017 | Lee et al. |
| 2017/0114721 A1 | 4/2017 | Miller et al. |
| 2017/0159563 A1 | 6/2017 | Sennoun |
| 2017/0159566 A1 | 6/2017 | Sennoun et al. |
| 2017/0167382 A1 | 6/2017 | Miller et al. |
| 2017/0184027 A1 | 6/2017 | Moniz et al. |
| 2017/0260905 A1 | 9/2017 | Schmitz |
| 2018/0017079 A1 | 1/2018 | DiPietro, Jr. et al. |
| 2018/0029944 A1 | 2/2018 | Subramanian et al. |
| 2018/0156124 A1* | 6/2018 | Clements ............. F04D 29/542 |
| 2018/0161852 A1 | 6/2018 | McCarren et al. |
| 2018/0161853 A1 | 6/2018 | Deines et al. |
| 2018/0161854 A1 | 6/2018 | Deines et al. |
| 2018/0161855 A1 | 6/2018 | Deines et al. |
| 2018/0161856 A1 | 6/2018 | Yang et al. |
| 2018/0161857 A1 | 6/2018 | Garay et al. |
| 2018/0161858 A1 | 6/2018 | Garay et al. |
| 2018/0161859 A1 | 6/2018 | Garay et al. |
| 2018/0161866 A1 | 6/2018 | Deines et al. |
| 2018/0252113 A1* | 9/2018 | Northall ............... F01D 5/142 |
| 2018/0252231 A1* | 9/2018 | Northall ............... F02C 3/06 |
| 2019/0218971 A1 | 7/2019 | Niergarth et al. |
| 2019/0359340 A1 | 11/2019 | Pachidis et al. |
| 2021/0180458 A1* | 6/2021 | DiPietro, Jr. ......... F01D 5/142 |
| 2021/0199013 A1 | 7/2021 | Read et al. |
| 2021/0239132 A1 | 8/2021 | DiPietro, Jr. et al. |
| 2022/0288673 A1 | 9/2022 | Deines et al. |
| 2024/0218802 A1 | 7/2024 | Mondin et al. |

FOREIGN PATENT DOCUMENTS

| | | |
|---|---|---|
| CN | 101576024 A | 11/2009 |
| CN | 102078924 A | 6/2011 |
| CN | 202291247 U | 7/2012 |
| CN | 102802834 A | 11/2012 |
| CN | 103008558 A | 4/2013 |
| CN | 203441604 U | 2/2014 |
| CN | 105579688 A | 5/2016 |
| CN | 107035528 A | 8/2017 |
| DE | 611328 C | 3/1935 |
| DE | 102009039255 A1 | 3/2011 |
| EP | 0978632 A1 | 2/2000 |
| EP | 1927723 A1 | 6/2008 |
| EP | 2359959 A1 | 8/2011 |
| EP | 2359962 A2 | 8/2011 |
| EP | 2746534 A1 | 6/2014 |
| EP | 2992982 A1 | 3/2016 |
| EP | 3514349 A1 | 7/2019 |
| FR | 2939852 A1 | 6/2010 |
| GB | 630747 A | 10/1949 |
| GB | 752674 A | 7/1956 |
| GB | 1514096 A | 6/1978 |
| GB | 2034822 A | 6/1980 |
| JP | H07208200 A | 8/1995 |
| JP | 2001/027103 A | 1/2001 |
| JP | 2013/512783 A | 4/2013 |
| JP | 2014/208373 A | 11/2014 |
| JP | 2016/501139 A | 1/2016 |
| JP | 2016/516591 A | 6/2016 |

(56) References Cited

FOREIGN PATENT DOCUMENTS

| JP | 2016/533905 A | 11/2016 |
|---|---|---|
| WO | WO97/03281 A1 | 1/1997 |
| WO | WO00/32331 A1 | 6/2000 |
| WO | WO00/51761 A1 | 9/2000 |
| WO | WO2009/127204 A1 | 10/2009 |
| WO | WO2015/021168 A1 | 2/2015 |
| WO | WO2015/026535 A1 | 2/2015 |
| WO | WO2015/053846 A2 | 4/2015 |
| WO | WO2015/112885 A1 | 7/2015 |

OTHER PUBLICATIONS

Krithivasan, Detection of Propagation of Over-Heat Sections in Supply Air Duct of Aircrafts, Honeywell Technology Solutions Lab Pvt Ltd., Dec. 6, 2011, pp. 1-6.

Kumar et al., 30 Printing of Hollow Compounds, IJRET: International Journal of Research in Engineering and Technology, vol. 4, Issue 12, 2015, pp. 18-21.

Mikro Systems, Advanced Filtration to Improve Single Crystal Casting Yield, National Energy Technology Laboratory, Aug. 2013, pp. 1-4.

Rame et al., Development of AGAT, a Third-Generation Nickel-Based Superalloy for Single Crystal Turbine Blade Applications, The Minerals, Metals & Materials Society, Superalloys 2020, pp. 31-40.

\* cited by examiner

| PARAMETER | SPLITTERED SPAN RADIUS ($R_S$) | CHORD LENGTH ($C_S$) | SPLITTERED MAX THICKNESS ($t_{ms}$) | AIRFOIL COUNT ($N_b$) | SPLITTERED TIP RADIUS ($R_{st}$) | SPLITTERED HUB RADIUS ($R_{sh}$) | SPLITTERED LEADING EDGE MEAN-LINE ANGLE ($zeta1_S$) | SPLITTERED TRAILING EDGE MEAN LINE ANGLE ($zeta2_S$) | SPLITTERED RELATIONSHIP (f) | SPLITTERED LEADING EDGE ANGULAR PLACEMENT $\theta_S$ |
|---|---|---|---|---|---|---|---|---|---|---|
| UNITS | INCHES | INCHES | INCHES | N/A | INCHES | INCHES | DEGREES | DEGREES | N/A | N/A |
| EX. 1 | 19.4 | 1.07 | 0.06 | 70 | 19.8 | 19 | 58 | 42 | 0.6 | 0.054 |
| EX. 2 | 22.1 | 2.1 | 0.12 | 40 | 22.3 | 22 | 77 | 70 | 0.7 | 0.110 |
| EX. 3 | 23.2 | 1.32 | 0.12 | 78 | 23.37 | 23 | 31 | 26 | 0.45 | 0.036 |
| EX. 4 | 22.3 | 1.04 | 0.024 | 52 | 22.5 | 22 | 18 | 18 | 0.3 | 0.036 |
| EX. 5 | 7.7 | 0.1 | 0.007 | 72 | 7.77 | 7.7 | 48 | 32 | 0.4 | 0.035 |
| EX. 6 | 33.9 | 14 | 0.24 | 53 | 34.05 | 15.4 | 87 | 55 | 0.285 | 0.034 |
| EX. 7 | 9.1 | 0.29 | 0.048 | 48 | 9.2 | 9 | 39 | 26 | 0.55 | 0.072 |
| EX. 8 | 23.7 | 15.52 | 0.698 | 12 | 32 | 15.4 | 61 | 52 | 0.3 | 0.157 |
| EX. 9 | 23.7 | 34 | 0.595 | 11 | 32 | 15.4 | 60 | 52 | 0.8 | 0.457 |
| EX. 10 | 4 | 0.45 | 0.003 | 29 | 5.5 | 4 | 39 | 32 | 0.75 | 0.162 |
| EX. 11 | 2 | 1.28 | 0.036 | 24 | 2.5 | 2 | 69 | 52 | 0.95 | 0.249 |
| EX. 12 | 61 | 10 | 0.173 | 22 | 61 | 50 | 56 | 54 | 0.55 | 0.157 |
| EX. 13 | 3.4 | 0.227 | 0.01 | 10 | 3.42 | 3.12 | 54 | 54 | 0.55 | 0.346 |
| EX. 14 | 6.9 | 0.43 | 0.006 | 70 | 7.204 | 6.82 | 48 | 33 | 0.3 | 0.027 |
| EX. 15 | 7.1 | 0.67 | 0.018 | 15 | 7.05 | 6 | 45 | 18 | 0.6 | 0.251 |
| EX. 16 | 20 | 1.57 | 0.24 | 40 | 20 | 19 | 64.5 | 38 | 0.5 | 0.079 |
| EX. 17 | 22.2 | 0.71 | 0.012 | 52 | 22.4 | 21.93 | 79 | 32 | 0.05 | 0.006 |
| EX. 18 | 32.9 | 5.36 | 0.35 | 90 | 32.85 | 30 | 63 | 63 | 0.63 | 0.044 |

FIG. 7A

| PARAMETER | SPLITTERED SPAN RADIUS ($R_s$) | CHORD LENGTH ($C_s$) | SPLITTERED MAX THICKNESS ($t_{ms}$) | AIRFOIL COUNT ($N_b$) | SPLITTERED TIP RADIUS ($R_{st}$) | SPLITTERED HUB RADIUS ($R_{sh}$) | SPLITTERED LEADING EDGE MEAN-LINE ANGLE ($\zeta_{1s}$) | SPLITTERED TRAILING EDGE MEAN-LINE ANGLE ($\zeta_{2s}$) | SPLITTERED RELATIONSHIP ($f$) | SPLITTERED LEADING EDGE ANGULAR PLACEMENT $\theta_s$ | SPLITTERED PRESSURE COEFFICIENT ($y_s$) | SPLITTERED SPAN PARAMETER ($x_s$) |
|---|---|---|---|---|---|---|---|---|---|---|---|---|
| UNITS | INCHES | INCHES | INCHES | N/A | INCHES | INCHES | DEGREES | DEGREES | N/A | N/A | N/A | N/A |
| EX. 1 | 19.4 | 1.07 | 0.06 | 70 | 19.8 | 19 | 58 | 42 | 0.6 | 0.054 | 0.49 | 1.4 |
| EX. 2 | 22.1 | 2.1 | 0.12 | 40 | 22.3 | 22 | 77 | 70 | 0.7 | 0.110 | 0.57 | 4.31 |
| EX. 3 | 23.2 | 1.32 | 0.12 | 78 | 23.37 | 23 | 31 | 26 | 0.45 | 0.036 | 0.09 | 2.7 |
| EX. 4 | 22.3 | 1.04 | 0.024 | 52 | 22.5 | 22 | 18 | 18 | 0.3 | 0.036 | 0 | 1.71 |
| EX. 5 | 7.7 | 0.1 | 0.007 | 72 | 7.77 | 7.7 | 48 | 32 | 0.4 | 0.035 | 0.38 | 0.8 |
| EX. 6 | 33.9 | 14 | 0.24 | 53 | 34.05 | 15.4 | 87 | 55 | 0.285 | 0.034 | 0.99 | 4.5 |
| EX. 7 | 9.1 | 0.29 | 0.048 | 48 | 9.2 | 9 | 39 | 26 | 0.55 | 0.072 | 0.25 | 0.87 |
| EX. 8 | 23.7 | 15.52 | 0.698 | 12 | 32 | 15.4 | 61 | 52 | 0.3 | 0.157 | 0.38 | 2.79 |
| EX. 9 | 23.7 | 34 | 0.595 | 11 | 32 | 15.4 | 60 | 52 | 0.8 | 0.457 | 0.34 | 3.32 |
| EX. 10 | 4 | 0.45 | 0.003 | 29 | 5.5 | 4 | 39 | 32 | 0.75 | 0.162 | 0.16 | 0.5 |
| EX. 11 | 2 | 1.28 | 0.036 | 24 | 2.5 | 2 | 69 | 52 | 0.95 | 0.249 | 0.66 | 3.41 |
| EX. 12 | 61 | 10 | 0.173 | 22 | 61 | 50 | 56 | 54 | 0.55 | 0.157 | 0.09 | 1.28 |
| EX. 13 | 3.4 | 0.227 | 0.01 | 10 | 3.42 | 3.12 | 54 | 54 | 0.55 | 0.346 | 0 | 0.5 |
| EX. 14 | 6.9 | 0.43 | 0.006 | 70 | 7.204 | 6.82 | 48 | 33 | 0.3 | 0.027 | 0.36 | 1.8 |
| EX. 15 | 7.1 | 0.67 | 0.018 | 15 | 7.05 | 6 | 45 | 18 | 0.6 | 0.251 | 0.45 | 0.5 |
| EX. 16 | 20 | 1.57 | 0.24 | 40 | 20 | 19 | 64.5 | 38 | 0.5 | 0.079 | 0.7 | 1.54 |
| EX. 17 | 22.2 | 0.71 | 0.012 | 52 | 22.4 | 21.93 | 79 | 32 | 0.05 | 0.006 | 0.95 | 3.21 |
| EX. 18 | 32.9 | 5.36 | 0.35 | 90 | 32.85 | 30 | 63 | 63 | 0.63 | 0.044 | 0 | 4.5 |

FIG. 7B

| PARAMETER: | ELEMENT: | MINIMUM: | MAXIMUM: | UNITS: |
|---|---|---|---|---|
| $R_s$ | SPLITTERED SPAN RADIUS | 2 | 61 | INCHES |
| $C_s$ | CHORD LENGTH | 0.1 | 34 | INCHES |
| $t_{ms}$ | SPLITTERED MAX THICKNESS | 0.005 | 0.7 | INCHES |
| $N_b$ | AIRFOIL COUNT | 10 | 90 | N/A |
| $R_{st}$ | SPLITTERED TIP RADIUS | 2.5 | 61 | INCHES |
| $R_{sh}$ | SPLITTERED HUB RADIUS | 2 | 50 | INCHES |
| $zeta1_s$ | SPLITTERED LEADING EDGE MEAN-LINE ANGLE | 18 | 87 | DEGREES |
| $zeta2_s$ | SPLITTERED TRAILING EDGE MEAN-LINE ANGLE | 18 | 70 | DEGREES |
| $f$ | SPLITTERED RELATIONSHIP | 0.05 | 0.95 | N/A |
| $\theta_s$ | SPLITTERED LEADING EDGE ANGULAR PLACEMENT | 0.006 | 0.457 | N/A |
| $y_s$ | SPLITTERED PRESSURE COEFFICIENT | 0 | 1 | N/A |
| $x_s$ | SPLITTERED SPAN PARAMETER | 0.5 | 4.5 | N/A |

FIG. 7D

| PARAMETER: | ELEMENT: | MINIMUM: | MAXIMUM: | UNITS: |
|---|---|---|---|---|
| $R_s$ | SPLITTERED SPAN RADIUS | 3 | 40 | INCHES |
| $C_s$ | CHORD LENGTH | 0.2 | 10 | INCHES |
| $t_{ms}$ | SPLITTERED MAX THICKNESS | 0.005 | 0.7 | INCHES |
| $N_b$ | AIRFOIL COUNT | 15 | 70 | N/A |
| $R_{st}$ | SPLITTERED TIP RADIUS | 3 | 25 | INCHES |
| $R_{sh}$ | SPLITTERED HUB RADIUS | 4 | 40 | INCHES |
| $zeta1_s$ | SPLITTERED LEADING EDGE MEAN-LINE ANGLE | 40 | 70 | DEGREES |
| $zeta2_s$ | SPLITTERED TRAILING EDGE MEAN-LINE ANGLE | 30 | 65 | DEGREES |
| $f$ | SPLITTERED RELATIONSHIP | 0.2 | 0.5 | N/A |
| $\theta_s$ | SPLITTERED LEADING EDGE ANGULAR PLACEMENT | 0.006 | 0.457 | N/A |
| $y_s$ | SPLITTERED PRESSURE COEFFICIENT | 0 | 1 | N/A |
| $x_s$ | SPLITTERED SPAN PARAMETER | 1 | 2 | N/A |

FIG. 7E

| PARAMETER | TIP CHORD LENGTH ($C_t$) | TIP MAX THICKNESS ($t_{mt}$) | AIRFOIL COUNT ($N_b$) | TIP RADIUS ($R_t$) | HUB RADIUS ($R_h$) | AIRFOIL TIP LEADING EDGE MEAN-LINE ANGLE ($zeta_{1t}$) | AIRFOIL TIP TRAILING EDGE MEAN-LINE ANGLE ($zeta_{2t}$) |
|---|---|---|---|---|---|---|---|
| UNITS | INCHES | INCHES | N/A | INCHES | INCHES | DEGREES | DEGREES |
| EX. 1 | 3 | 0.169 | 70 | 24 | 19 | 64 | 45 |
| EX. 2 | 2.8 | 0.16 | 40 | 24.4 | 22 | 84 | 70 |
| EX. 3 | 2.7 | 0.245 | 78 | 26 | 23 | 64 | 30 |
| EX. 4 | 2.9 | 0.067 | 52 | 24.3 | 22 | 76 | 20 |
| EX. 5 | 1 | 0.07 | 72 | 8.4 | 7.7 | 72 | 36 |
| EX. 6 | 32.2 | 0.553 | 53 | 72.1 | 15.4 | 87 | 55 |
| EX. 7 | 1.2 | 0.2 | 48 | 11 | 9 | 55 | 30 |
| EX. 8 | 33 | 1.8 | 12 | 67 | 15.4 | 70 | 56 |
| EX. 9 | 50 | 0.875 | 11 | 67 | 15.4 | 74 | 56 |
| EX. 10 | 0.47 | 0.003 | 29 | 5 | 4 | 68.5 | 36 |
| EX. 11 | 2 | 0.056 | 24 | 6 | 2 | 65.6 | 56 |
| EX. 12 | 29 | 0.503 | 22 | 80 | 50 | 68 | 58 |
| EX. 13 | 2.18 | 0.098 | 10 | 9.1 | 3.12 | 63.9 | 56 |
| EX. 14 | 0.9 | 0.013 | 70 | 7.3 | 6.82 | 69 | 37 |
| EX. 15 | 3.2 | 0.087 | 15 | 12.2 | 6 | 60 | 20 |
| EX. 16 | 2.92 | 0.446 | 40 | 24.4 | 19 | 74.5 | 42 |
| EX. 17 | 2.95 | 0.05 | 52 | 24 | 21.93 | 74 | 36 |
| EX. 18 | 10.95 | 0.715 | 90 | 52.43 | 30 | 71.4 | 63 |

FIG. 8A

| PARAMETER | TIP CHORD LENGTH ($C_t$) | TIP MAX THICKNESS ($t_{mt}$) | AIRFOIL COUNT ($N_b$) | TIP RADIUS ($R_t$) | HUB RADIUS ($R_h$) | AIRFOIL TIP LEADING EDGE MEAN-LINE ANGLE ($zeta_{1t}$) | AIRFOIL TIP TRAILING EDGE MEAN-LINE ANGLE ($zeta_{2t}$) | AIRFOIL TIP PRESSURE COEFFICIENT ($y_t$) | AIRFOIL TIP PARAMETER ($x_t$) |
|---|---|---|---|---|---|---|---|---|---|
| UNITS | INCHES | INCHES | N/A | INCHES | INCHES | DEGREES | DEGREES | N/A | N/A |
| EX. 1 | 3 | 0.169 | 70 | 24 | 19 | 64 | 45 | 0.62 | 1.13 |
| EX. 2 | 2.8 | 0.16 | 40 | 24.4 | 22 | 84 | 70 | 0.91 | 1.61 |
| EX. 3 | 2.7 | 0.245 | 78 | 26 | 23 | 64 | 30 | 0.74 | 1.23 |
| EX. 4 | 2.9 | 0.067 | 52 | 24.3 | 22 | 76 | 20 | 0.93 | 1.16 |
| EX. 5 | 1 | 0.07 | 72 | 8.4 | 7.7 | 72 | 36 | 0.85 | 1.63 |
| EX. 6 | 32.2 | 0.553 | 53 | 72.1 | 15.4 | 87 | 55 | 0.99 | 2 |
| EX. 7 | 1.2 | 0.2 | 48 | 11 | 9 | 55 | 30 | 0.56 | 0.82 |
| EX. 8 | 33 | 1.8 | 12 | 67 | 15.4 | 70 | 56 | 0.63 | 1.06 |
| EX. 9 | 50 | 0.875 | 11 | 67 | 15.4 | 74 | 56 | 0.76 | 1.52 |
| EX. 10 | 0.47 | 0.003 | 29 | 5 | 4 | 68.5 | 36 | 0.79 | 0.5 |
| EX. 11 | 2 | 0.056 | 24 | 6 | 2 | 65.6 | 56 | 0.45 | 1.09 |
| EX. 12 | 29 | 0.503 | 22 | 80 | 50 | 68 | 58 | 0.5 | 1.54 |
| EX. 13 | 2.18 | 0.098 | 10 | 9.1 | 3.12 | 63.9 | 56 | 0.38 | 0.5 |
| EX. 14 | 0.9 | 0.013 | 70 | 7.3 | 6.82 | 69 | 37 | 0.8 | 1.81 |
| EX. 15 | 3.2 | 0.087 | 15 | 12.2 | 6 | 60 | 20 | 0.72 | 0.59 |
| EX. 16 | 2.92 | 0.446 | 40 | 24.4 | 19 | 74.5 | 42 | 0.87 | 0.79 |
| EX. 17 | 2.95 | 0.05 | 52 | 24 | 21.93 | 74 | 36 | 0.88 | 1.35 |
| EX. 18 | 10.95 | 0.715 | 90 | 52.43 | 30 | 71.4 | 63 | 0.51 | 2 |

FIG. 8B

| PARAMETER: | ELEMENT: | MINIMUM: | MAXIMUM: | UNITS: |
|---|---|---|---|---|
| $C_t$ | TIP CHORD LENGTH | 0.47 | 50 | INCHES |
| $t_{mt}$ | TIP MAX THICKNESS | 0.003 | 1.8 | INCHES |
| $N_b$ | AIRFOIL COUNT | 10 | 90 | N/A |
| $R_t$ | TIP RADIUS | 5 | 80 | INCHES |
| $R_h$ | HUB RADIUS | 2 | 50 | INCHES |
| $zeta_{1t}$ | AIRFOIL TIP LEADING EDGE MEAN-LINE ANGLE | 55 | 87 | DEGREES |
| $zeta_{2t}$ | AIRFOIL TIP TRAILING EDGE MEAN-LINE ANGLE | 20 | 70 | DEGREES |
| $y_t$ | AIRFOIL TIP PRESSURE COEFFICIENT | 0.38 | 1 | N/A |
| $x_t$ | AIRFOIL TIP PARAMETER | 0.5 | 2 | N/A |

FIG. 8D

| PARAMETER: | ELEMENT: | MINIMUM: | MAXIMUM: | UNITS: |
|---|---|---|---|---|
| $C_t$ | TIP CHORD LENGTH | 0.47 | 50 | INCHES |
| $t_{mt}$ | TIP MAX THICKNESS | 0.003 | 1.8 | INCHES |
| $N_b$ | AIRFOIL COUNT | 15 | 70 | N/A |
| $R_t$ | TIP RADIUS | 5 | 70 | INCHES |
| $R_h$ | HUB RADIUS | 3 | 30 | INCHES |
| $zeta_{1t}$ | AIRFOIL TIP LEADING EDGE MEAN-LINE ANGLE | 60 | 75 | DEGREES |
| $zeta_{2t}$ | AIRFOIL TIP TRAILING EDGE MEAN-LINE ANGLE | 30 | 70 | DEGREES |
| $y_t$ | AIRFOIL TIP PRESSURE COEFFICIENT | 0.38 | 1 | N/A |
| $x_t$ | AIRFOIL TIP PARAMETER | 0.6 | 1.7 | N/A |

FIG. 8E

| PARAMETER | MIDSPAN RADIUS ($R_p$) | MIDSPAN CHORD LENGTH ($C_p$) | AIRFOIL MIDSPAN MAX THICKNESS ($t_{mp}$) | TIP RADIUS ($R_t$) | HUB RADIUS ($R_h$) | AIRFOIL MIDSPAN LEADING EDGE MEAN-LINE ANGLE ($zeta_{1p}$) | AIRFOIL MIDSPAN TRAILING EDGE MEAN-LINE ANGLE ($zeta_{2p}$) |
|---|---|---|---|---|---|---|---|
| UNITS | INCHES | INCHES | INCHES | INCHES | INCHES | DEGREES | DEGREES |
| EX. 1 | 21.5 | 3 | 0.169 | 24 | 19 | 52.5 | 43 |
| EX. 2 | 23.2 | 2.8 | 0.16 | 24.4 | 22 | 80 | 70 |
| EX. 3 | 24.5 | 2.7 | 0.245 | 26 | 23 | 60 | 28 |
| EX. 4 | 23.15 | 2.9 | 0.067 | 24.3 | 22 | 71 | 18 |
| EX. 5 | 8.05 | 1 | 0.07 | 8.4 | 7.7 | 72 | 34 |
| EX. 6 | 69 | 32.2 | 0.553 | 72.1 | 15.4 | 87 | 53 |
| EX. 7 | 10 | 1.2 | 0.2 | 11 | 9 | 51 | 28 |
| EX. 8 | 67 | 33 | 1.8 | 67 | 15.4 | 66 | 54 |
| EX. 9 | 67 | 50 | 0.875 | 67 | 15.4 | 70 | 54 |
| EX. 10 | 5 | 0.47 | 0.003 | 5 | 4 | 59.7 | 34 |
| EX. 11 | 2 | 2 | 0.056 | 6 | 2 | 64 | 54 |
| EX. 12 | 80 | 29 | 0.503 | 80 | 50 | 68 | 56 |
| EX. 13 | 8.6 | 2.18 | 0.098 | 9.1 | 3.12 | 58.9 | 54 |
| EX. 14 | 7.06 | 0.9 | 0.013 | 7.3 | 6.82 | 65 | 35 |
| EX. 15 | 9.1 | 3.2 | 0.087 | 12.2 | 6 | 50 | 18 |
| EX. 16 | 21.7 | 2.92 | 0.446 | 24.4 | 19 | 68.5 | 40 |
| EX. 17 | 22.965 | 2.95 | 0.05 | 24 | 21.93 | 70 | 34 |
| EX. 18 | 47 | 10.6 | 0.692 | 52.43 | 30 | 67.7 | 61 |

FIG. 9A

| PARAMETER | MIDSPAN RADIUS ($R_p$) | MIDSPAN CHORD LENGTH ($c_p$) | AIRFOIL MIDSPAN MAX THICKNESS ($t_{mp}$) | TIP RADIUS ($R_t$) | HUB RADIUS ($R_h$) | AIRFOIL MIDSPAN LEADING EDGE MEAN-LINE ANGLE ($zeta1_p$) | AIRFOIL MIDSPAN TRAILING EDGE MEAN-LINE ANGLE ($zeta2_p$) | AIRFOIL MIDSPAN PRESSURE COEFFICIENT ($y_p$) | AIRFOIL MIDSPAN PARAMETER ($x_p$) |
|---|---|---|---|---|---|---|---|---|---|
| UNITS | INCHES | INCHES | INCHES | INCHES | INCHES | DEGREES | DEGREES | | |
| EX. 1 | 21.5 | 3 | 0.169 | 24 | 19 | 52.5 | 43 | N/A | N/A |
| EX. 2 | 23.2 | 2.8 | 0.16 | 24.4 | 22 | 80 | 70 | 0.31 | 1.18 |
| EX. 3 | 24.5 | 2.7 | 0.245 | 26 | 23 | 60 | 28 | 0.74 | 1.66 |
| EX. 4 | 23.15 | 2.9 | 0.067 | 24.3 | 22 | 71 | 18 | 0.68 | 1.26 |
| EX. 5 | 8.05 | 1 | 0.07 | 8.4 | 7.7 | 72 | 34 | 0.88 | 1.19 |
| EX. 6 | 69 | 32.2 | 0.553 | 72.1 | 15.4 | 87 | 53 | 0.86 | 1.65 |
| EX. 7 | 10 | 1.2 | 0.2 | 11 | 9 | 51 | 28 | 0.99 | 2 |
| EX. 8 | 67 | 33 | 1.8 | 67 | 15.4 | 66 | 54 | 0.49 | 0.86 |
| EX. 9 | 67 | 50 | 0.875 | 67 | 15.4 | 70 | 54 | 0.52 | 1.04 |
| EX. 10 | 5 | 0.47 | 0.003 | 5 | 4 | 59.7 | 34 | 0.66 | 1.48 |
| EX. 11 | 2 | 2 | 0.056 | 6 | 2 | 64 | 54 | 0.63 | 0.5 |
| EX. 12 | 80 | 29 | 0.503 | 80 | 50 | 68 | 56 | 0.44 | 1.91 |
| EX. 13 | 8.6 | 2.18 | 0.098 | 9.1 | 3.12 | 58.9 | 54 | 0.55 | 1.5 |
| EX. 14 | 7.06 | 0.9 | 0.013 | 7.3 | 6.82 | 65 | 35 | 0.23 | 0.5 |
| EX. 15 | 9.1 | 3.2 | 0.087 | 12.2 | 6 | 50 | 18 | 0.73 | 1.82 |
| EX. 16 | 21.7 | 2.92 | 0.446 | 24.4 | 19 | 68.5 | 40 | 0.54 | 0.68 |
| EX. 17 | 22.965 | 2.95 | 0.05 | 24 | 21.93 | 70 | 34 | 0.77 | 0.83 |
| EX. 18 | 47 | 10.6 | 0.692 | 52.43 | 30 | 67.7 | 61 | 0.83 | 1.36 |
| | | | | | | | | 0.39 | 2 |

FIG. 9B

| PARAMETER: | ELEMENT: | MINIMUM: | MAXIMUM: | UNITS: |
|---|---|---|---|---|
| $R_p$ | MIDSPAN RADIUS | 2 | 80 | INCHES |
| $C_p$ | MIDSPAN CHORD LENGTH | 0.47 | 50 | INCHES |
| $t_{mp}$ | AIRFOIL MIDSPAN MAX THICKNESS | 0.003 | 1.8 | INCHES |
| $N_b$ | AIRFOIL COUNT | 10 | 90 | N/A |
| $R_t$ | TIP RADIUS | 5 | 80 | INCHES |
| $R_h$ | HUB RADIUS | 2 | 50 | INCHES |
| $zeta1_p$ | AIRFOIL MIDSPAN LEADING EDGE MEAN-LINE ANGLE | 50 | 87 | DEGREES |
| $zeta2_p$ | AIRFOIL MIDSPAN TRAILING EDGE MEAN-LINE ANGLE | 18 | 70 | DEGREES |
| $y_p$ | AIRFOIL MIDSPAN PRESSURE COEFFICIENT | 0.2 | 1 | N/A |
| $x_p$ | AIRFOIL MIDSPAN PARAMETER | 0.5 | 2 | N/A |

FIG. 9D

| PARAMETER: | ELEMENT: | MINIMUM: | MAXIMUM: | UNITS: |
|---|---|---|---|---|
| $R_p$ | MIDSPAN RADIUS | 3 | 70 | INCHES |
| $C_p$ | MIDSPAN CHORD LENGTH | 0.47 | 50 | INCHES |
| $t_{mp}$ | AIRFOIL MIDSPAN MAX THICKNESS | 0.003 | 1.8 | INCHES |
| $N_b$ | AIRFOIL COUNT | 15 | 70 | N/A |
| $R_t$ | TIP RADIUS | 5 | 70 | INCHES |
| $R_h$ | HUB RADIUS | 3 | 30 | INCHES |
| $zeta1_p$ | AIRFOIL MIDSPAN LEADING EDGE MEAN-LINE ANGLE | 60 | 75 | DEGREES |
| $zeta2_p$ | AIRFOIL MIDSPAN TRAILING EDGE MEAN-LINE ANGLE | 30 | 70 | DEGREES |
| $y_p$ | AIRFOIL MIDSPAN PRESSURE COEFFICIENT | 0.2 | 1 | N/A |
| $x_p$ | AIRFOIL MIDSPAN PARAMETER | 0.6 | 1.9 | N/A |

FIG. 9E

| PARAMETER | HUB CHORD LENGTH ($C_h$) | HUB MAX THICKNESS ($t_{mh}$) | TIP RADIUS ($R_t$) | HUB RADIUS ($R_h$) | AIRFOIL HUB LEADING EDGE MEAN-LINE ANGLE ($zeta_{1h}$) | AIRFOIL HUB TRAILING EDGE MEAN-LINE ANGLE ($zeta_{2h}$) |
|---|---|---|---|---|---|---|
| UNITS | INCHES | INCHES | INCHES | INCHES | DEGREES | DEGREES |
| EX. 1 | 3 | 0.169 | 24 | 19 | 49 | 41 |
| EX. 2 | 2.6 | 0.149 | 24.4 | 22 | 76 | 70 |
| EX. 3 | 2.7 | 0.245 | 26 | 23 | 56 | 26 |
| EX. 4 | 2.9 | 0.067 | 24.3 | 22 | 66 | 16 |
| EX. 5 | 1 | 0.07 | 8.4 | 7.7 | 78 | 32 |
| EX. 6 | 14.95 | 0.257 | 72.1 | 15.4 | 87 | 51 |
| EX. 7 | 1.2 | 0.2 | 11 | 9 | 44 | 26 |
| EX. 8 | 33 | 1.8 | 75 | 15.4 | so | 41 |
| EX. 9 | 35 | 0.613 | 79 | 15.4 | 66 | 52 |
| EX. 10 | 0.43 | 0.003 | 5 | 4 | 63 | 32 |
| EX. 11 | 1.5 | 0.042 | 6 | 2 | 53.3 | 52 |
| EX. 12 | 29 | 0.503 | 80 | 50 | 64 | 54 |
| EX. 13 | 1.35 | 0.061 | 9.1 | 3.12 | 53 | 52 |
| EX. 14 | 0.9 | 0.013 | 7.3 | 6.82 | 61 | 33 |
| EX. 15 | 2.5 | 0.068 | 12.2 | 6 | 46 | 16 |
| EX. 16 | 2.92 | 0.446 | 24.4 | 19 | 65 | 18 |
| EX. 17 | 2.95 | 0.05 | 24 | 21.93 | 66 | 32 |
| EX. 18 | 10.055 | 0.657 | 64.3 | 30 | 60.1 | 59 |

FIG. 10A

| PARAMETER | HUB CHORD LENGTH ($C_h$) | HUB MAX THICKNESS ($t_{mh}$) | TIP RADIUS ($R_t$) | HUB RADIUS ($R_h$) | AIRFOIL HUB LEADING EDGE MEAN-LINE ANGLE ($zeta_{1h}$) | AIRFOIL HUB TRAILING EDGE MEAN-LINE ANGLE ($zeta_{2h}$) | AIRFOIL HUB PRESSURE COEFFICIENT ($y_h$) | AIRFOIL HUB PARAMETER ($x_h$) |
|---|---|---|---|---|---|---|---|---|
| UNITS | INCHES | INCHES | INCHES | INCHES | DEGREES | DEGREES | | |
| EX. 1 | 3 | 0.169 | 24 | 19 | 49 | 41 | N/A | N/A |
| EX. 2 | 2.6 | 0.149 | 24.4 | 22 | 76 | 70 | 0.24 | 1.25 |
| EX. 3 | 2.7 | 0.245 | 26 | 23 | 56 | 26 | 0.5 | 1.58 |
| EX. 4 | 2.9 | 0.067 | 24.3 | 22 | 66 | 16 | 0.61 | 1.3 |
| EX. 5 | 1 | 0.07 | 8.4 | 7.7 | 78 | 32 | 0.82 | 1.21 |
| EX. 6 | 14.95 | 0.257 | 72.1 | 15.4 | 87 | 51 | 0.94 | 1.67 |
| EX. 7 | 1.2 | 0.2 | 11 | 9 | 44 | 26 | 0.99 | 2 |
| EX. 8 | 33 | 1.8 | 75 | 15.4 | 50 | 41 | 0.36 | 0.9 |
| EX. 9 | 35 | 0.613 | 79 | 15.4 | 66 | 52 | 0.27 | 1.97 |
| EX. 10 | 0.43 | 0.003 | 5 | 4 | 63 | 32 | 0.56 | 1.96 |
| EX. 11 | 1.5 | 0.042 | 6 | 2 | 53.3 | 52 | 0.71 | 0.5 |
| EX. 12 | 29 | 0.503 | 80 | 50 | 64 | 54 | 0.06 | 1.38 |
| EX. 13 | 1.35 | 0.061 | 9.1 | 3.12 | 53 | 52 | 0.44 | 1.86 |
| EX. 14 | 0.9 | 0.013 | 7.3 | 6.82 | 61 | 33 | 0.04 | 0.51 |
| EX. 15 | 2.5 | 0.068 | 12.2 | 6 | 46 | 16 | 0.67 | 1.83 |
| EX. 16 | 2.92 | 0.446 | 24.4 | 19 | 65 | 18 | 0.48 | 0.65 |
| EX. 17 | 2.95 | 0.05 | 24 | 21.93 | 66 | 32 | 0.8 | 0.81 |
| EX. 18 | 10.055 | 0.657 | 64.3 | 30 | 60.1 | 59 | 0.77 | 1.38 |
| | | | | | | | 0.06 | 2 |

FIG. 10B

| PARAMETER: | ELEMENT: | MINIMUM: | MAXIMUM: | UNITS: |
|---|---|---|---|---|
| $c_h$ | HUB CHORD LENGTH | 0.43 | 35 | INCHES |
| $t_{mh}$ | HUB MAX THICKNESS | 0.003 | 1.8 | INCHES |
| $N_b$ | AIRFOIL COUNT | 10 | 90 | N/A |
| $R_t$ | TIP RADIUS | 5 | 80 | INCHES |
| $R_h$ | HUB RADIUS | 2 | 50 | INCHES |
| $zeta_{1h}$ | AIRFOIL HUB LEADING EDGE MEAN-LINE ANGLE | 44 | 87 | DEGREES |
| $zeta_{2h}$ | AIRFOIL HUB TRAILING EDGE MEAN-LINE ANGLE | 16 | 70 | DEGREES |
| $y_h$ | AIRFOIL HUB PRESSURE COEFFICIENT | 0.06 | 0.99 | N/A |
| $x_h$ | AIRFOIL HUB PARAMETER | 0.5 | 2 | N/A |

FIG. 10D

| PARAMETER: | ELEMENT: | MINIMUM: | MAXIMUM: | UNITS: |
|---|---|---|---|---|
| $c_h$ | HUB CHORD LENGTH | 0.43 | 35 | INCHES |
| $t_{mh}$ | HUB MAX THICKNESS | 0.003 | 1.8 | INCHES |
| $N_b$ | AIRFOIL COUNT | 15 | 70 | N/A |
| $R_t$ | TIP RADIUS | 5 | 70 | INCHES |
| $R_h$ | HUB RADIUS | 3 | 30 | INCHES |
| $zeta_{1h}$ | AIRFOIL HUB LEADING EDGE MEAN-LINE ANGLE | 50 | 75 | DEGREES |
| $zeta_{2h}$ | AIRFOIL HUB TRAILING EDGE MEAN-LINE ANGLE | 30 | 70 | DEGREES |
| $y_h$ | AIRFOIL HUB PRESSURE COEFFICIENT | 0.06 | 0.99 | N/A |
| $x_h$ | AIRFOIL HUB PARAMETER | 0.6 | 1.9 | N/A |

FIG. 10E

GAS TURBINE ENGINES INCLUDING SPLITTERED AIRFOILS

FIELD

The present subject matter relates generally to gas turbine engines including splittered airfoils.

BACKGROUND

A gas turbine engine typically includes a fan and a turbomachine. The turbomachine generally includes an inlet, one or more compressors, a combustor, and at least one turbine. The compressors compress air, which is channeled to the combustor where it is mixed with fuel. The mixture is then ignited for generating hot combustion gases. The combustion gases are channeled to the turbine(s), which extract(s) energy from the combustion gases for powering the compressor(s), as well as for producing useful work to propel an aircraft in flight. The turbomachine is mechanically coupled to the fan for driving the fan during operation.

During operation of the gas turbine engine, airfoils forming fan blades and compressor rotor blades are rotated to accelerate an airflow though the gas turbine engine. Gas turbine engine designs, and more particularly airfoil designs, for improving aerodynamic efficiency are desirable.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 7A lists various relationships between characteristics of a plurality of splittered airfoils of engines according to exemplary embodiments of the present disclosure.

FIG. 7B provides values for a splittered pressure coefficient and a splittered span parameter for each of the examples of FIG. 7A according to exemplary embodiments of the present disclosure.

FIG. 7D provides a table illustrating minimum and maximum values for the various relationships shown in FIGS. 7A-7B according to exemplary embodiments of the present disclosure.

FIG. 7E provides another table illustrating minimum and maximum values for the various relationships shown in FIGS. 7A-7B according to exemplary embodiments of the present disclosure.

FIG. 8A lists various relationships between characteristics of a plurality of non-splittered airfoils of engines according to exemplary embodiments of the present disclosure.

FIG. 8B provides values for an airfoil tip pressure coefficient and an airfoil tip parameter for each of the examples of FIG. 8A according to exemplary embodiments of the present disclosure.

FIG. 8D provides a table illustrating minimum and maximum values for the various relationships shown in FIGS. 8A-8B according to exemplary embodiments of the present disclosure.

FIG. 8E provides another table illustrating minimum and maximum values for the various relationships shown in FIGS. 8A-8B according to exemplary embodiments of the present disclosure.

FIG. 9A lists various relationships between characteristics of a plurality of non-splittered airfoils of engines according to exemplary embodiments of the present disclosure.

FIG. 9B provides values for an airfoil midspan pressure coefficient and an airfoil midspan parameter for each of the examples of FIG. 9A according to exemplary embodiments of the present disclosure.

FIG. 9D provides a table illustrating minimum and maximum values for the various relationships shown in FIGS. 9A-9B according to exemplary embodiments of the present disclosure.

FIG. 9E provides another table illustrating minimum and maximum values for the various relationships shown in FIGS. 9A-9B according to exemplary embodiments of the present disclosure.

FIG. 10A lists various relationships between characteristics of a plurality of non-splittered airfoils of engines according to exemplary embodiments of the present disclosure.

FIG. 10B provides values for an airfoil hub pressure coefficient and an airfoil hub parameter for each of the examples of FIG. 10A according to exemplary embodiments of the present disclosure.

FIG. 10D provides a table illustrating minimum and maximum values for the various relationships shown in FIGS. 10A-10B according to exemplary embodiments of the present disclosure.

FIG. 10E provides another table illustrating minimum and maximum values for the various relationships shown in FIGS. 10A-10B according to exemplary embodiments of the present disclosure.

DETAILED DESCRIPTION

Figure 1:
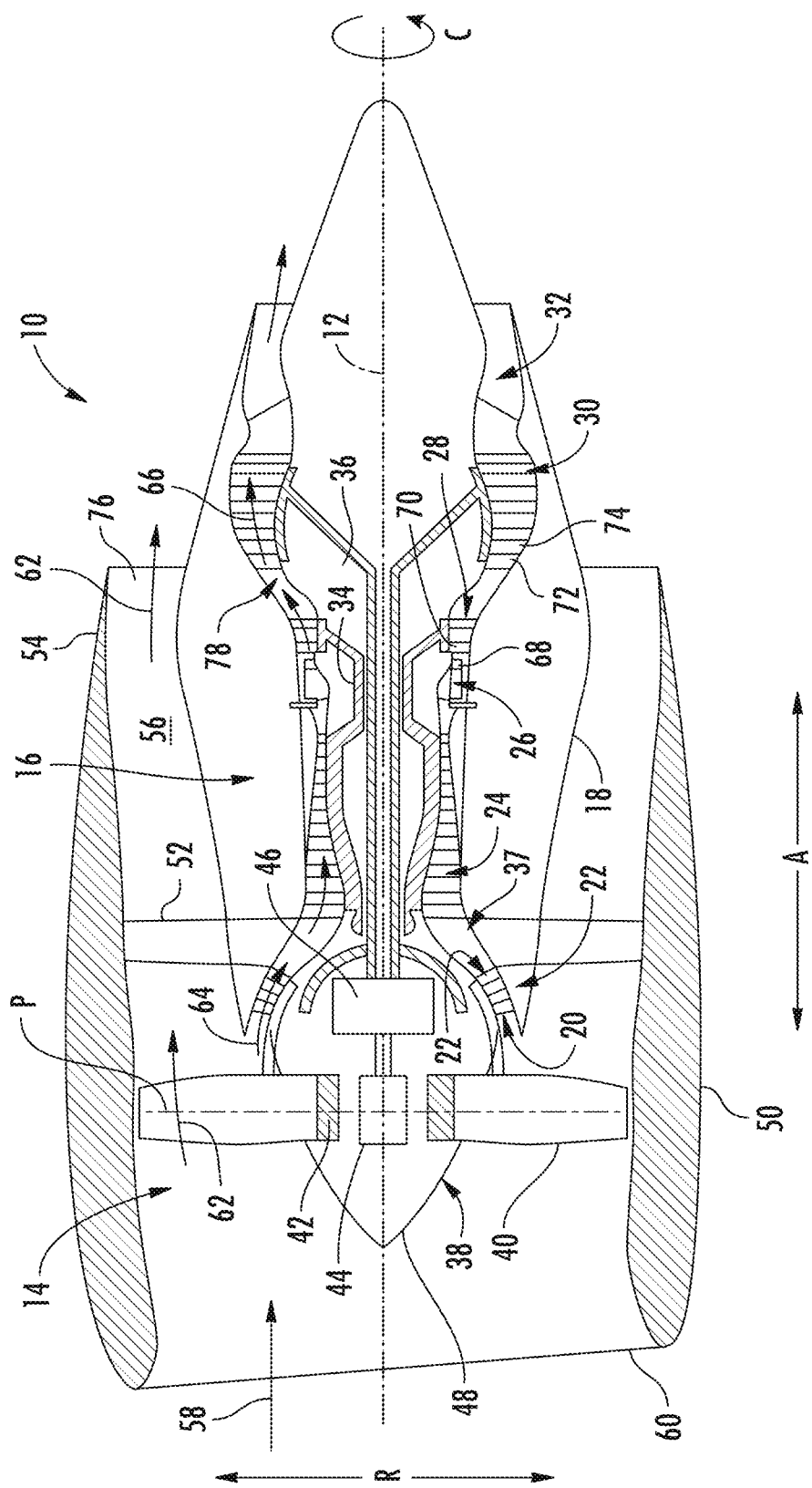
FIG. 1 is a schematic cross-sectional view of a gas turbine engine in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Aspects of the present disclosure generally relate to splittered airfoils for gas turbine engines. Specifically, a plurality of splittered airfoils are disposed adjacent to and in an alternating arrangement with a plurality of non-splittered airfoils such that one of the plurality of splittered airfoils is between adjacent ones of the plurality of non-splittered airfoils. The plurality of splittered airfoils have a height less than 80% of a height of the plurality of non-splittered airfoils. The plurality of non-splittered airfoils and the plurality of splittered airfoils may be incorporated into the gas turbine engine as a plurality of fan blades, a plurality of compressor rotor blades, or both.

As the plurality of non-splittered airfoils rotate, an airflow is accelerated through the gas turbine engine. It is generally desirable to incorporate a compressor that meets stability and efficiency requirements for a target pressure ratio (e.g., the ratio of inlet pressure to outlet pressure). However, there are well-known inter-related aerodynamic limits to achieving this goal. For example, increasing an airfoil count improves performance but also increases weight of the gas turbine engine. On the other hand, reducing weight, such as by reducing airfoil count, improves rotor performance and simplifies manufacturing. However, as airfoil count is reduced, the accompanying reduced hub solidity tends to cause the airflow in the hub region of the airfoil to either result in large boundary layers that lead to high losses or undesirably separate from the airfoil surface. Therefore, there is a need for a gas turbine engine design including a plurality of non-splittered airfoils and a plurality of splittered airfoils that maintain good flow in the hub region and increase aerodynamic efficiency and stability without increasing weight and while potentially reducing weight.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a," "an," and "the" include plural references unless the context clearly dictates otherwise.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high," or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle, and are based on a normal operational attitude of the gas turbine engine or vehicle. More particularly, forward and aft are used herein with reference to a direction of travel of the vehicle and a direction of propulsive thrust of the gas turbine engine.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

The term "bypass passage" refers generally to a passage with an airflow from a fan of the gas turbine engine that flows over an upstream-most inlet to a turbomachine of the gas turbine engine. In a ducted gas turbine engine, the bypass passage is the passage defined between an outer nacelle (surrounding the fan of the gas turbine engine) and one or more cowls inward of the outer nacelle (e.g., a fan cowl, a core cowl or both if both are present). In an unducted gas turbine engine, the bypass passage refers to an open sided passage (i.e., not explicitly defined by structure such as an outer nacelle) where airflow from the fan passes over an upstream-most inlet to the turbomachine (e.g., an inlet to inlet duct of the engine), defined at least in part by a primary fan outer fan area, which refers to an area defined by an annulus representing a portion of the fan located outward of an inlet splittered at the upstream-most inlet to the turbomachine. An airflow through the bypass passage of a ducted or an unducted engine refers to all of the airflow from the fan that is not provided through the upstream-most inlet to the turbomachine.

The term "bypass ratio" refers to a ratio in an engine of an amount of airflow that is bypassed around the engine's ducted inlet (through the bypass passage) to the amount that passes through the engine's ducted inlet. For example, in the embodiment of FIG. 1, discussed below, the bypass ratio refers to an amount of airflow from the fan 38 that flows over the outer casing 18 and into the bypass airflow passage 56 to an amount of airflow from the fan 38 that flows through the annular core inlet 20.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the terms "first," "second," and "third" may be used interchangeably to distinguish one component from another and are not intended to signify location or importance of the individual components.

For purposes of the description hereinafter, the terms "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the term "adjacent" when used to identify a component of a plurality of the same or similar components relative to a base component, refers to a component of the plurality of components positioned next to the base component with no intervening components of the plurality of components positioned therebetween.

Referring now to the drawings, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine, sometimes also referred to as a "turbofan engine." As shown in FIG. 1, the gas turbine engine 10 defines an axial direction A (extending parallel to a centerline axis 12 provided for reference), a radial direction R, and a circumferential direction C extending about the centerline axis 12. In general, the gas turbine engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft 34 (which may additionally or alternatively be a spool) drivingly connects the HP turbine 28 to the HP compressor 24. A low pressure (LP) shaft 36 (which may additionally or alternatively be a spool) drivingly connects the LP turbine 30 to the LP compressor 22. The compressor section, combustion section 26, turbine section, and jet exhaust nozzle section 32 together define a working gas flowpath 37.

For the embodiment depicted, the fan section 14 includes a fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40, e.g., in unison. The gas turbine engine 10 further includes a power gear box 46, and the fan blades 40, disk 42, and pitch change mechanism 44 are together rotatable about the centerline axis 12 by LP shaft 36 across the power gear box 46. The power gear box 46 includes a plurality of gears for adjusting a rotational speed of the fan 38 relative to a rotational speed of the LP shaft 36, such that the fan 38 may rotate at a more efficient fan speed.

Referring still to the exemplary embodiment of FIG. 1, the disk 42 is covered by rotatable front hub 48 of the fan section 14 (sometimes also referred to as a "spinner"). The front hub 48 aerodynamically contoured to promote an airflow through the plurality of fan blades 40.

Additionally, the exemplary fan section 14 includes an annular fan casing or outer nacelle 50 that circumferentially surrounds the fan 38 and/or at least a portion of the turbomachine 16. It should be appreciated that the nacelle 50 is supported relative to the turbomachine 16 by a plurality of circumferentially-spaced outlet guide vanes 52 in the embodiment depicted. Moreover, a downstream section 54 of the nacelle 50 extends over an outer portion of the turbomachine 16 so as to define a bypass airflow passage 56 therebetween.

During operation of the gas turbine engine 10, a volume of air 58 enters the gas turbine engine 10 through an associated inlet 60 of the nacelle 50 and fan section 14. As the volume of air 58 passes across the fan blades 40, a first portion of air 62 is directed or routed into the bypass airflow passage 56 and a second portion of air 64 as indicated by arrow 64 is directed or routed into the working gas flowpath 37, or more specifically into the LP compressor 22. The ratio between the first portion of air 62 and the second portion of air 64 is commonly known as a bypass ratio. A pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the gas turbine engine 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary gas turbine engine 10 depicted in FIG. 1 is by way of example only, and that in other exemplary embodiments, the gas turbine engine 10 may have any other suitable configuration. For example, although the gas turbine engine 10 depicted is configured as a ducted gas turbine engine (i.e., including the outer nacelle 50), in other embodiments, the gas turbine engine 10 may be an unducted gas turbine engine (such that the fan 38 is an unducted fan, and the outlet guide vanes 52 are cantilevered from the outer casing 18). Additionally, or alternatively, although the gas turbine engine 10 depicted is configured as a geared gas turbine engine (i.e., including the power gear box 46) and a variable pitch gas turbine engine (i.e., including a fan 38 configured as a variable pitch fan), in other embodiments, the gas turbine engine 10 may additionally or alternatively be configured as a direct drive gas turbine engine (such that the LP shaft 36 rotates at the same speed as the fan 38), as a fixed pitch gas turbine engine (such that the fan 38 includes fan blades 40 that are not rotatable about a pitch axis P), or both. It should also be appreciated, that in still other exemplary embodiments, aspects of the present disclosure may be incorporated into any other suitable gas turbine engine. For example, in other exemplary embodiments, aspects of the present disclosure may (as appropriate) be incorporated into, e.g., a turboprop gas turbine engine, a turboshaft gas turbine engine, or a turbojet gas turbine engine.

Figure 2:
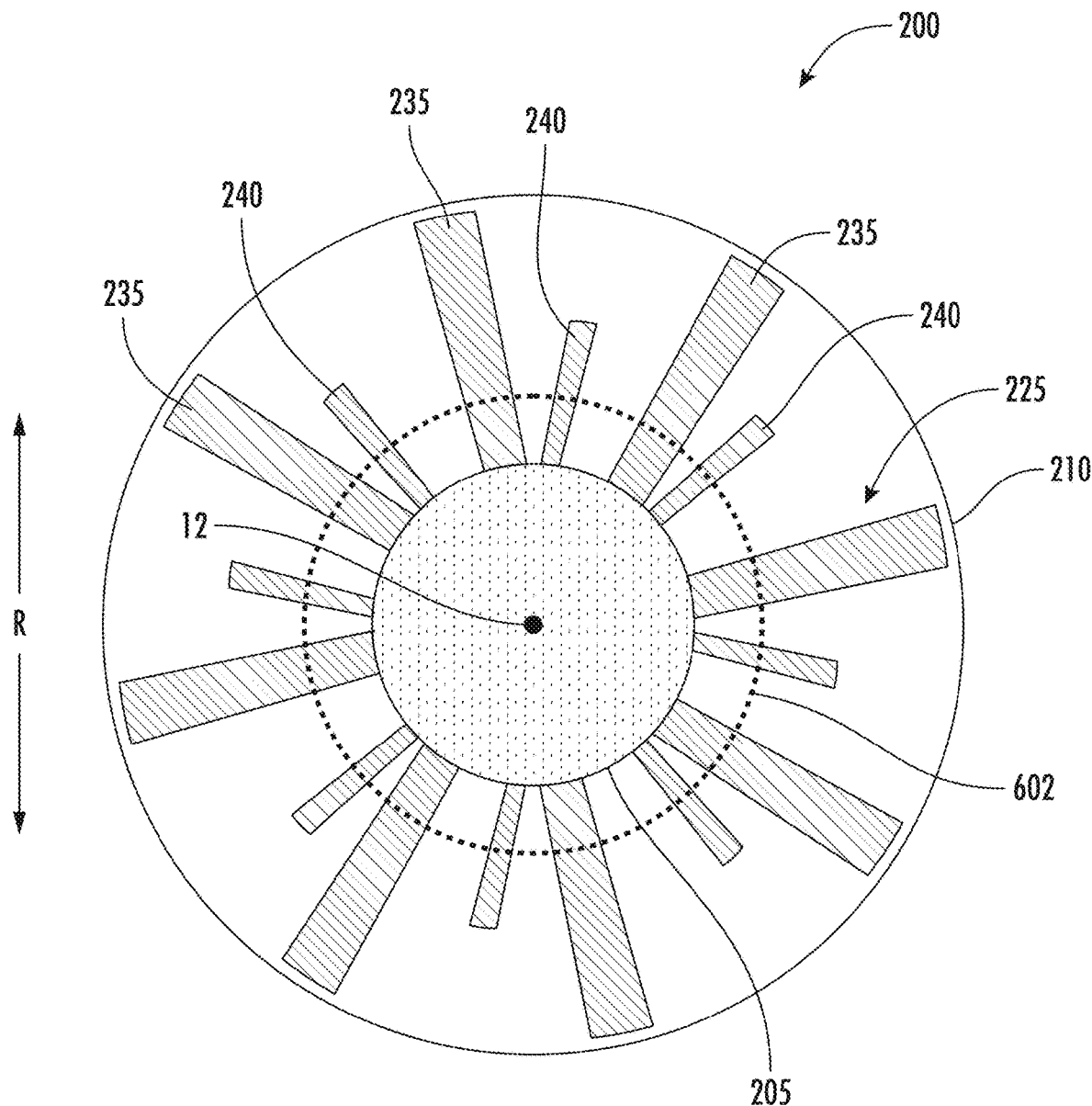
FIG. 2 is a schematic cross-sectional view of a stage of a compressor section of the gas turbine engine of FIG. 1 in accordance with an exemplary embodiment of the present disclosure.

FIG. 2 is a schematic cross-sectional view of a stage of a compressor section 200 of the gas turbine engine 10 of FIG. 1 in accordance with an exemplary embodiment of the present disclosure. The compressor section 200 includes the LP compressor 22 and the HP compressor 24 described with respect to FIG. 1. More specifically, FIG. 2 illustrates a plurality of rotor blades of a stage of the compressor section 200.

The compressor section 200 includes a hub 205 and a casing 210 extending along the centerline axis 12. The casing 210 is spaced from the hub 205 in the radial direction R and circumferentially circumscribes the hub 205. As shown in FIG. 2, the radial direction R extends in any radial direction from the centerline axis 12. A flow path 225 is defined between the hub 205 and the casing 210. For example, the flow path 225 defines at least a portion of the working gas flowpath 37 (FIG. 1). A plurality of non-splittered airfoils 235 and a plurality of splittered airfoils 240 are disposed in the flow path 225.

The plurality of non-splittered airfoils 235 and the plurality of splittered airfoils 240 extend from the hub 205 towards the casing 210. As shown in FIG. 2, the plurality of non-splittered airfoils 235 are spaced apart about the centerline axis 12 and one of the plurality of splittered airfoils 240 is disposed between a pair of the plurality of non-splittered airfoils 235. The plurality of splittered airfoils 240 mitigate flow separation or weak flow near the hub 205, providing improved efficiency and turbine performance. While FIG. 2 shows the plurality of non-splittered airfoils 235 and the plurality of splittered airfoils 240 unequally spaced about the centerline axis, it should be understood that the plurality of non-splittered airfoils 235 and the plurality of splittered airfoils 240 can be equally spaced about the centerline axis 12.

While FIG. 2 illustrates the compressor section 200, it should be understood that the plurality of non-splittered airfoils 235 and the plurality of splittered airfoils 240 may additionally or alternatively be incorporated into the fan section 14 as the plurality of fan blades 40.

Figure 3A:
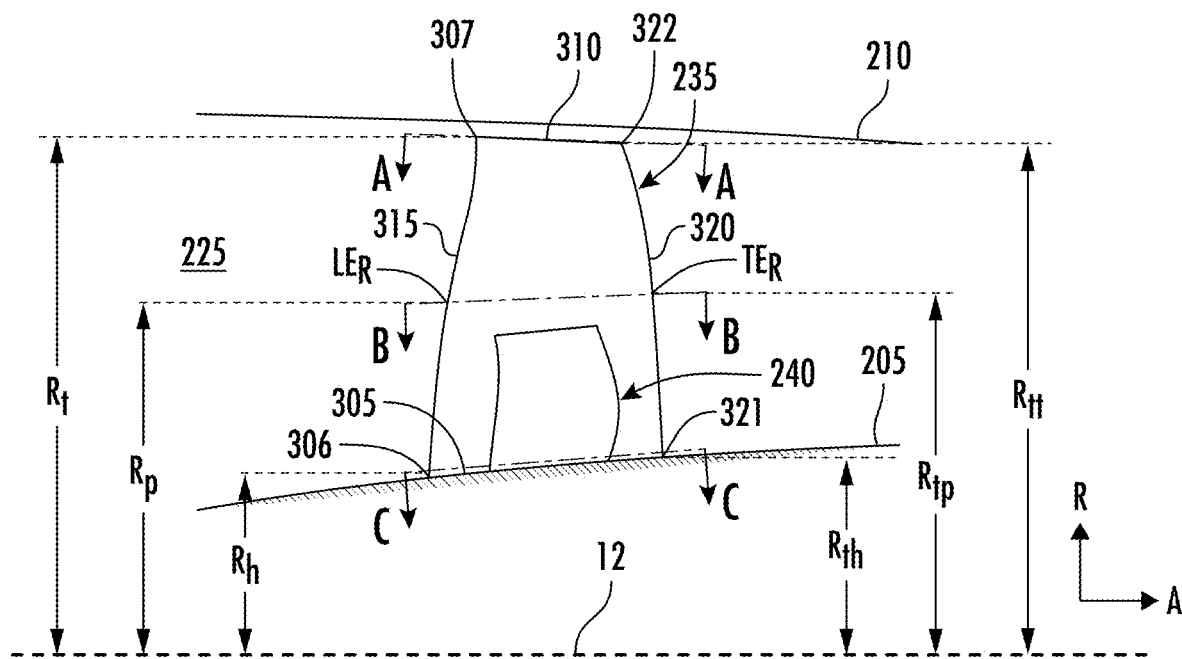
FIG. 3A is a detailed view of an airfoil and a splittered airfoil of the compressor section of FIG. 2 in accordance with an exemplary embodiment of the present disclosure.
Figure 3B:
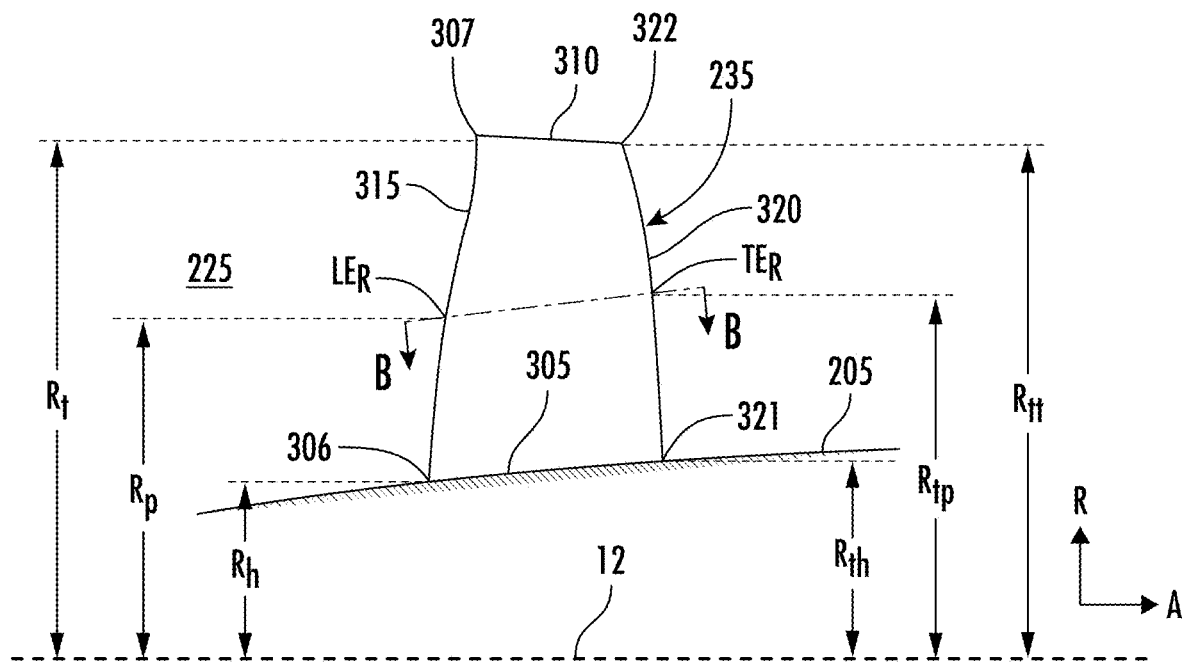
FIG. 3B is a detailed view of the airfoil of FIG. 3A in accordance with an exemplary embodiment of the present disclosure.

FIG. 3A is a detailed view of one of the plurality of non-splittered airfoils 235 and one of the plurality of splittered airfoils 240 of the compressor section 200 of FIG. 2 in accordance with an exemplary embodiment of the present disclosure. FIG. 3B is a detailed view of one of the plurality of non-splittered airfoils 235 of FIG. 3A in accordance with an exemplary embodiment of the present disclosure. More particularly, FIG. 3B illustrates one of the plurality of non-splittered airfoils 235 of FIG. 3A with the splittered airfoil 240 and the casing 210 removed for clarity.

The non-splittered airfoil 235 extends into the flow path 225 from an airfoil root 305 coupled to the hub 205 to an airfoil tip 310 opposite the airfoil root 305. The non-splittered airfoil 235 also includes a leading edge 315 and a trailing edge 320 opposite the leading edge 315. Additionally, the non-splittered airfoil 235 defines a hub radius $R_h$ extending from the centerline axis 12 to the airfoil root 305 measured at the leading edge 315, a midspan radius $R_p$ extending from the centerline axis 12 to an airfoil midspan location (indicated along line B-B) measured at the leading edge 315, and a tip radius $R_t$ extending from the centerline axis 12 to the airfoil tip 310 measured at the leading edge 315. More specifically, the hub radius $R_h$ is measured between the centerline axis 12 and an airfoil leading edge root 306 at the leading edge 315 and the tip radius $R_t$ is measured between the centerline axis 12 and an airfoils leading edge tip 307 at the leading edge 315.

The non-splittered airfoil 235 defines a trailing edge midspan radius $R_{tp}$ along the trailing edge 320 between the centerline axis 12 and the airfoil midspan location at the trailing edge 320, a trailing edge hub radius $R_{th}$ along the trailing edge 320 between the centerline axis 12 and an airfoil trailing edge root 321, and a trailing edge tip radius $R_{tt}$ between the centerline axis 12 and an airfoil trailing edge tip 322 at the trailing edge 320.

Moreover, the non-splittered airfoil 235 defines an airfoil span extending from the airfoil root 305 to the airfoil tip 310 such that the airfoil root 305 defines 0% of the airfoil span and the airfoil tip 310 defines 100% of the airfoil span. The airfoil midspan location (shown along line B-B in FIGS. 3A-3B) is equal to 50% of the airfoil span of the non-splittered airfoil 235. Moreover, the airfoil midspan location is measured at the leading edge 315.

The airfoil midspan location of the non-splittered airfoil 235 is defined between an airfoil leading edge radial coordinate $LE_R$ on the leading edge 315 and an airfoil trailing edge coordinate $TE_R$ on the trailing edge 320 (shown along line B-B in FIGS. 3A-3B). The midspan radius $R_p$ is defined between the centerline axis 12 and the airfoil leading edge radial coordinate $LE_R$ and the trailing edge midspan radius $R_{tp}$ is defined between the centerline axis 12 and the airfoil trailing edge coordinate $TE_R$.

The airfoil midspan location of the non-splittered airfoil 235 has a same value of a fraction span at the leading edge 315 and a fraction span the trailing edge 320. The fraction span at the leading edge ($S_{LE}$) is equal to $$\frac{R_p - R_h}{R_t - R_h}.$$

The fraction span at the trailing edge ($S_{TE}$) is equal to $$\frac{R_{tp} - R_{th}}{R_{tt} - Rt_h}.$$

Accordingly, the airfoil midspan location is defined along a line extending through the airfoil leading edge radial coordinators $LE_R$ and airfoil trailing edge coordinate $TE_R$ where $S_{LE}=S_{TE}=0.5$, indicated by line B-B.

Figure 4A:
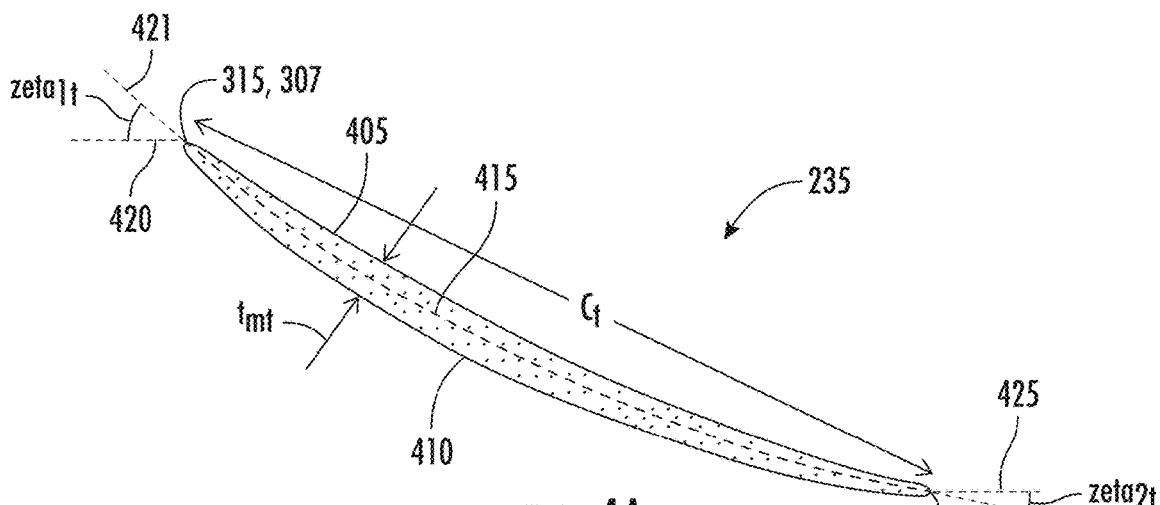
FIG. 4A is a cross-sectional view of the airfoil of FIG. 3A along line A-A in accordance with an exemplary embodiment of the present disclosure.
Figure 4B:
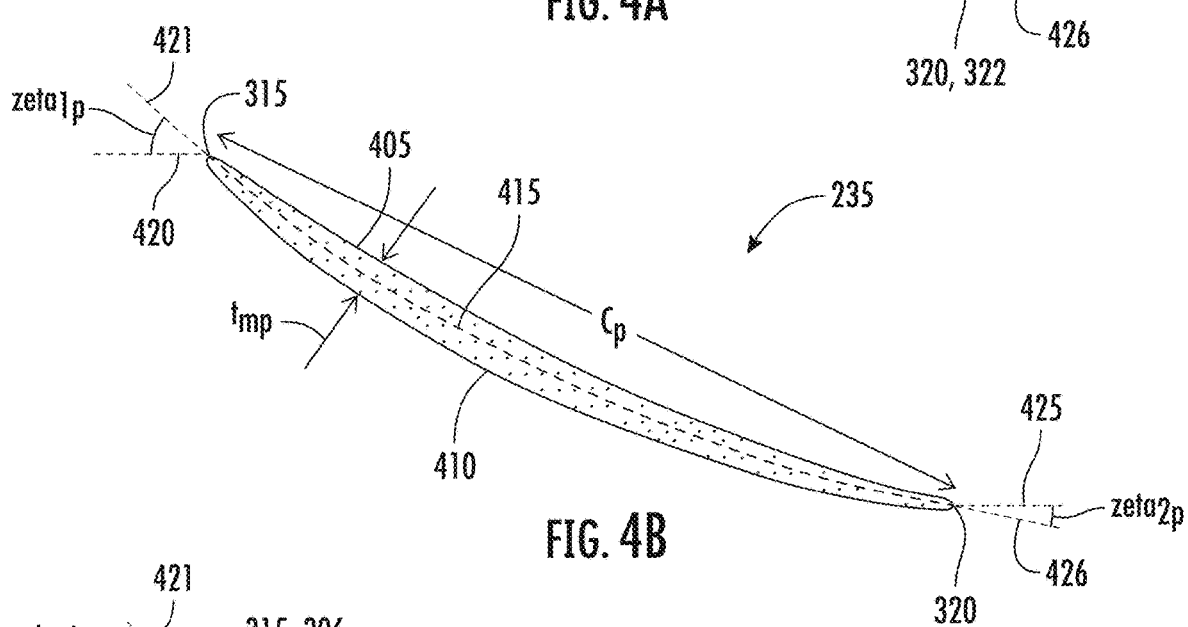
FIG. 4B is a cross-sectional view of the airfoil of FIG. 3A along line B-B in accordance with an exemplary embodiment of the present disclosure.
Figure 4C:
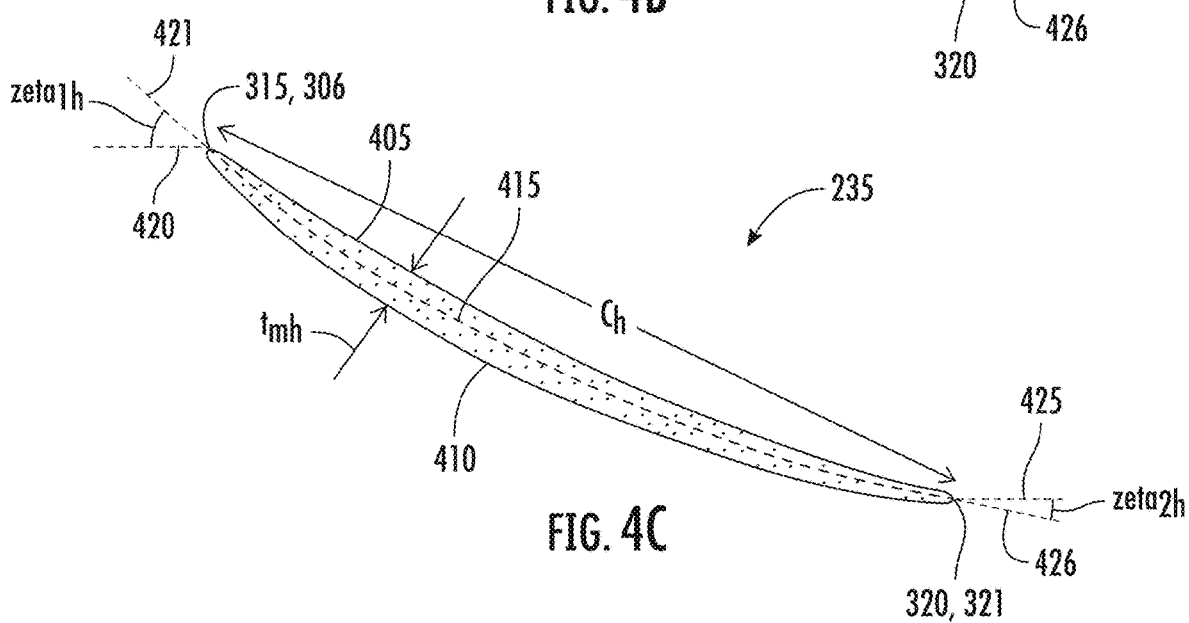
FIG. 4C is a cross-sectional view of the airfoil of FIG. 3A along line C-C in accordance with an exemplary embodiment of the present disclosure.

FIG. 4A is a cross-sectional view of the non-splittered airfoil 235 of FIG. 3A along line A-A in accordance with an exemplary embodiment of the present disclosure. FIG. 4B is a cross-sectional view of the non-splittered airfoil 235 of FIG. 3A along line B-B in accordance with an exemplary embodiment of the present disclosure. FIG. 4C is a cross-sectional view of the non-splittered airfoil 235 of FIG. 3A along line C-C in accordance with an exemplary embodiment of the present disclosure. More specifically, FIG. 4A illustrates a cross-sectional view of the non-splittered airfoil 235 at the airfoil tip 310, FIG. 4B illustrates a cross-sectional view of the non-splittered airfoil 235 at the airfoil midspan location along line B-B, and FIG. 4C illustrates a cross-sectional view of the non-splittered airfoil 235 at the airfoil root 305.

The non-splittered airfoil 235 includes an airfoil pressure side 405 between the leading edge 315 and the trailing edge 320 and an airfoil suction side 410 between the leading edge 315 and the trailing edge 320 opposite the airfoil pressure side 405.

With reference to FIG. 4A, the non-splittered airfoil 235 defines a tip chord length $C_t$ extending linearly between the leading edge 315 and the trailing edge 320. More specifically, the tip chord length $C_t$ extends linearly between the airfoil leading edge tip 307 and the airfoil trailing edge tip 322. The non-splittered airfoil 235 also defines an airfoil mean line 415 extending between the leading edge 315 (the airfoil leading edge tip 307) and the trailing edge 320 (the airfoil trailing edge tip 322) at a location midway between the airfoil pressure side 405 and the airfoil suction side 410.

Additionally, the non-splittered airfoil 235 defines a leading edge extension 421 of the airfoil mean line 415 extending from the leading edge 315 (the airfoil leading edge tip 307) and an airfoil leading edge reference line 420. Moreover, the leading edge extension 421 is tangent to the mean line 415 at the leading edge 315. The airfoil leading edge reference line 420 extends through the leading edge 315 (the airfoil leading edge tip 307) parallel to the centerline axis 12 (FIGS. 1-3B). An airfoil tip leading edge mean-line angle $zeta_{1t}$ is defined between the airfoil leading edge reference line 420 and the leading edge extension 421.

Moreover, the non-splittered airfoil 235 defines a trailing edge extension 426 of the airfoil mean line extending from the trailing edge 320 (the airfoil trailing edge tip 322) and an airfoil trailing edge reference line 425. The airfoil trailing edge reference line 425 extends through the trailing edge 320 (the airfoil trailing edge tip 322) parallel to the centerline axis 12 (FIGS. 1-3B). An airfoil tip trailing edge mean-line angle $zeta_{2t}$ is defined between the airfoil trailing edge reference line 425 and the trailing edge extension 426.

Still referring to FIG. 4A, the non-splittered airfoil 235 defines a tip max thickness $t_{mt}$ between the airfoil pressure side 405 and the airfoil suction side 410. For example, the tip max thickness $t_{mt}$ is a maximum thickness of the non-splittered airfoil 235 between the airfoil pressure side 405 and the airfoil suction side 410 at a position between the leading edge 315 and the trailing edge 320 and along the airfoil mean line 415. Moreover, the tip max thickness $t_{mt}$ is measured in a direction that is perpendicular to the airfoil mean line 415. The tip chord length $C_t$, the airfoil tip leading edge mean-line angle $zeta_{1t}$, the airfoil tip trailing edge mean-line angle $zeta_{2t}$, and the tip max thickness $t_{mt}$ are measured at the airfoil tip 310.

With reference to FIG. 4B, the non-splittered airfoil 235 defines a midspan chord length $C_p$ extending linearly between the leading edge 315 (the leading edge radial coordinate $LE_R$) and the trailing edge 320 (the trailing edge radial coordinate $TE_R$) measured at the airfoil midspan location (discussed with respect to FIG. 3B). The non-splittered airfoil 235 also defines an airfoil midspan leading edge mean-line angle $zeta_{1p}$ between the airfoil mean line 415 and the airfoil leading edge reference line 420 measured at the airfoil midspan location. Moreover, the non-splittered airfoil 235 defines an airfoil midspan trailing edge mean-line angle $zeta_{2p}$ between the airfoil mean line 415 and the airfoil trailing edge reference line 425 measured at the airfoil midspan location. Additionally, the non-splittered airfoil 235 defines a midspan max thickness $t_{mp}$ extending between the airfoil pressure side 405 and the airfoil suction side 410 measured at the airfoil midspan location. For example, the midspan max thickness $t_{mp}$ is a maximum thickness of the non-splittered airfoil 235 between the airfoil pressure side 405 and the airfoil suction side 410 at a position between the leading edge 315 and the trailing edge 320 measured at the airfoil midspan location.

Now referring to FIG. 4C, the non-splittered airfoil 235 defines a hub chord length $C_h$ extending linearly between the leading edge 315 and the trailing edge 320 measured at the airfoil root 305 or the hub 205 (FIGS. 2-3B). The non-splittered airfoil 235 also defines an airfoil hub leading edge mean-line angle $zeta_{1h}$ between the airfoil mean line 415 and the airfoil leading edge reference line 420 measured at the airfoil root 305 or the hub 205. Moreover, the non-splittered airfoil 235 defines an airfoil hub trailing edge mean-line angle $zeta_{2h}$ between the airfoil mean line 415 and the airfoil trailing edge reference line 425 measured at the airfoil root 305 or the hub 205. Additionally, the non-splittered airfoil 235 defines a hub max thickness $t_{mh}$ extending between the airfoil pressure side 405 and the airfoil suction side 410 measured at the airfoil root 305 or the hub 205. For example, the hub max thickness $t_{mh}$ is a maximum thickness of the non-splittered airfoil 235 between the airfoil pressure side 405 and the airfoil suction side 410 at a position between the leading edge 315 and the trailing edge 320 measured at the airfoil root 305 or the hub 205.

Figure 5A:
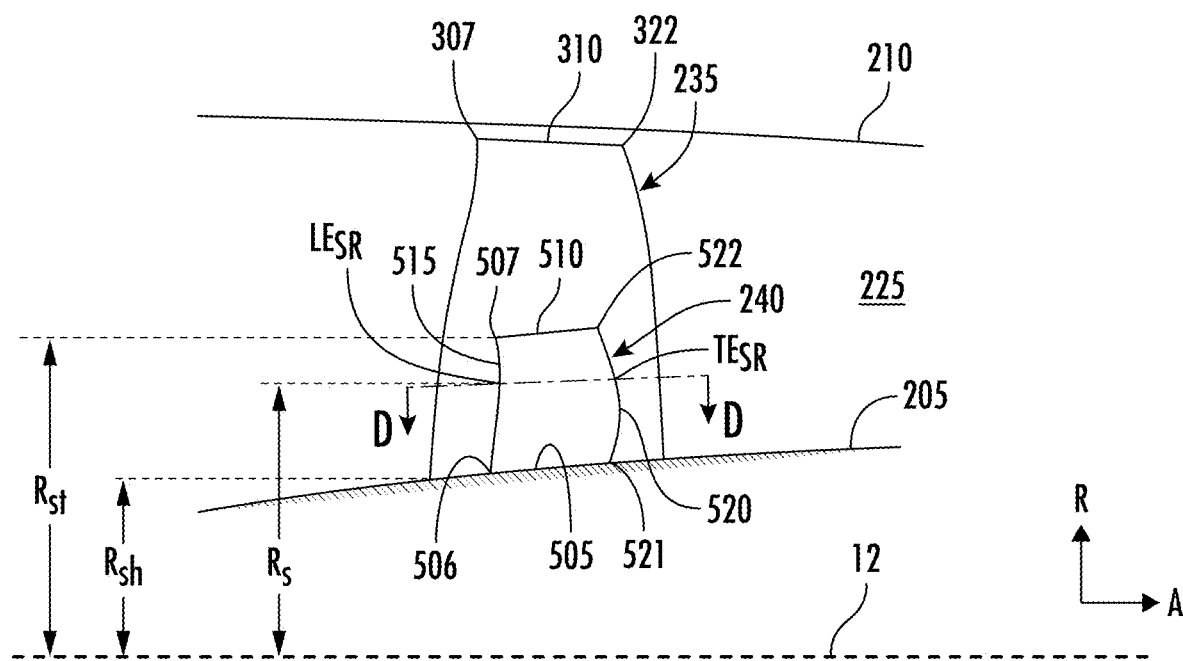
FIG. 5A is a detailed view of the airfoil and the splittered airfoil of the compressor section of FIG. 2 in accordance with an exemplary embodiment of the present disclosure.

FIG. 5A is a detailed view of one of the plurality of non-splittered airfoils 235 and one of the plurality of splittered airfoils 240 of the compressor section 200 of FIG. 2 in accordance with an exemplary embodiment of the present disclosure.

The splittered airfoil 240 extends into the flow path 225 from a splittered root 505 coupled to the hub 205 to a splittered tip 510 opposite the splittered root 505. The splittered airfoil 240 also include a splittered leading edge 515 and a splittered trailing edge 520 opposite the splittered leading edge 515.

As shown in FIG. 5A, the splittered leading edge 515 is aft of the leading edge 315 (FIG. 3A) and the splittered trailing edge 520 is forward of the trailing edge 320 (FIG. 3A). In some example embodiments, the splittered trailing edge 520 may be aligned with the trailing edge 320 (FIG. 3A).

The splittered airfoil 240 defines a splittered hub radius $R_{sh}$ extending from the centerline axis 12 to the splittered root 505 measured at the splittered leading edge 515, a splittered span radius $R_s$ extending from the centerline axis 12 to any splittered span location between the splittered root 505 and the splittered tip 510 measured at the splittered leading edge 515, and a splittered tip radius $R_{st}$ extending from the centerline axis 12 to the splittered tip 510 measured at the splittered leading edge 515. More specifically, the splittered hub radius $R_{sh}$ is measured between the centerline axis 12 and a splittered leading edge root 506 and the splittered tip radius $R_{st}$ is measured between the centerline axis 12 and a splittered leading edge tip 507.

The splittered airfoil 240 defines a span extending from the splittered root 505 to the splittered tip 510 such that the splittered root 505 defines 0% of the span and the splittered tip 510 defines 100% of the span. The splittered span location is greater than 0% and less than 100% of the span of the splittered airfoil 240. Moreover, the splittered span location is measured at the splittered leading edge 515.

The splittered span radius $R_s$ is defined between the centerline axis 12 and a splittered leading edge radial coordinate $LE_R$ on the splittered leading edge 515 between the splitter leading edge root 506 and the splittered leading edge tip 507. For example, the splittered leading edge radial coordinate $LE_{SR}$ indicates the splittered span location on the splittered leading edge 515, as will be described in greater detail below with respect to FIG. 5B.

Figure 5B:
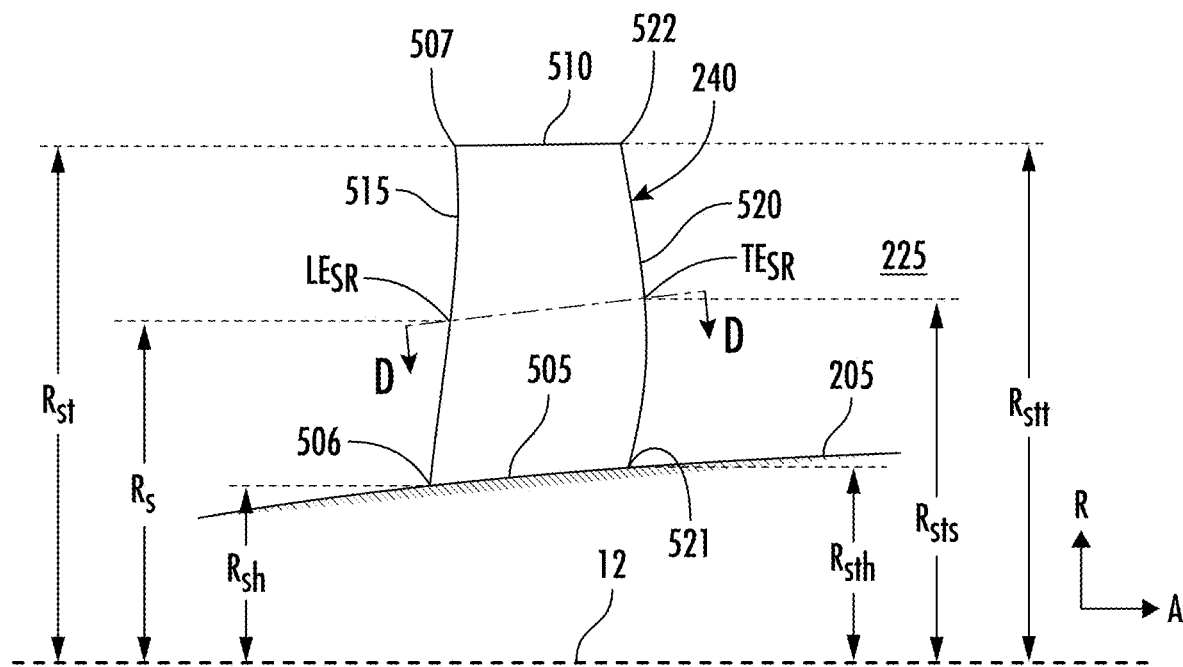
FIG. 5B is a detailed view of the splittered airfoil of FIG. 5A in accordance with an exemplary embodiment of the present disclosure.

The splittered span location of the plurality of splittered airfoils 240 is defined between the splittered leading edge radial coordinate $LE_{SR}$ and a splittered trailing edge radial coordinate $TE_{SR}$ defined along the splittered trailing edge 520 (shown along line D-D) and has a same value of a fraction span at the splittered leading edge 515 and a fraction span the splittered trailing edge 520. With reference to FIG. 5B, the splittered span radius $R_s$ is defined between the centerline axis 12 and the splittered leading edge radial coordinate $LE_{SR}$ on the splittered leading edge 515. The fraction span at the splittered leading edge ($S_{SLE}$) is equal to $$\frac{R_S - R_{sh}}{R_{st} - R_{sh}}.$$

A splittered trailing edge span radius $R_{sts}$ is defined between the centerline axis 12 and the splittered trailing edge radial coordinate $TE_{SR}$ on the splittered trailing edge 520. The fraction span at the splittered trailing edge ($S_{STE}$) is based on a splittered trailing edge hub radius $R_{sth}$ between the centerline axis 12 and the splittered trailing edge hub 521, a splittered trailing edge tip radius $R_{stt}$ between the centerline axis 12 and the splittered trailing edge tip 522, and the splittered trailing edge span radius $R_{sts}$. The fraction span at the splittered trailing edge ($S_{STE}$) is equal to $$\frac{R_{sts} - R_{sth}}{R_{stt} - R_{sth}}.$$

Accordingly, the splittered span location is defined along a line extending through the splittered leading edge radial coordinate $LE_{SR}$ and the splittered trailing edge radial coordinate $TE_{SR}$ where $S_{SLE}=S_{STE}$, indicated by line D-D.

Figure 6:
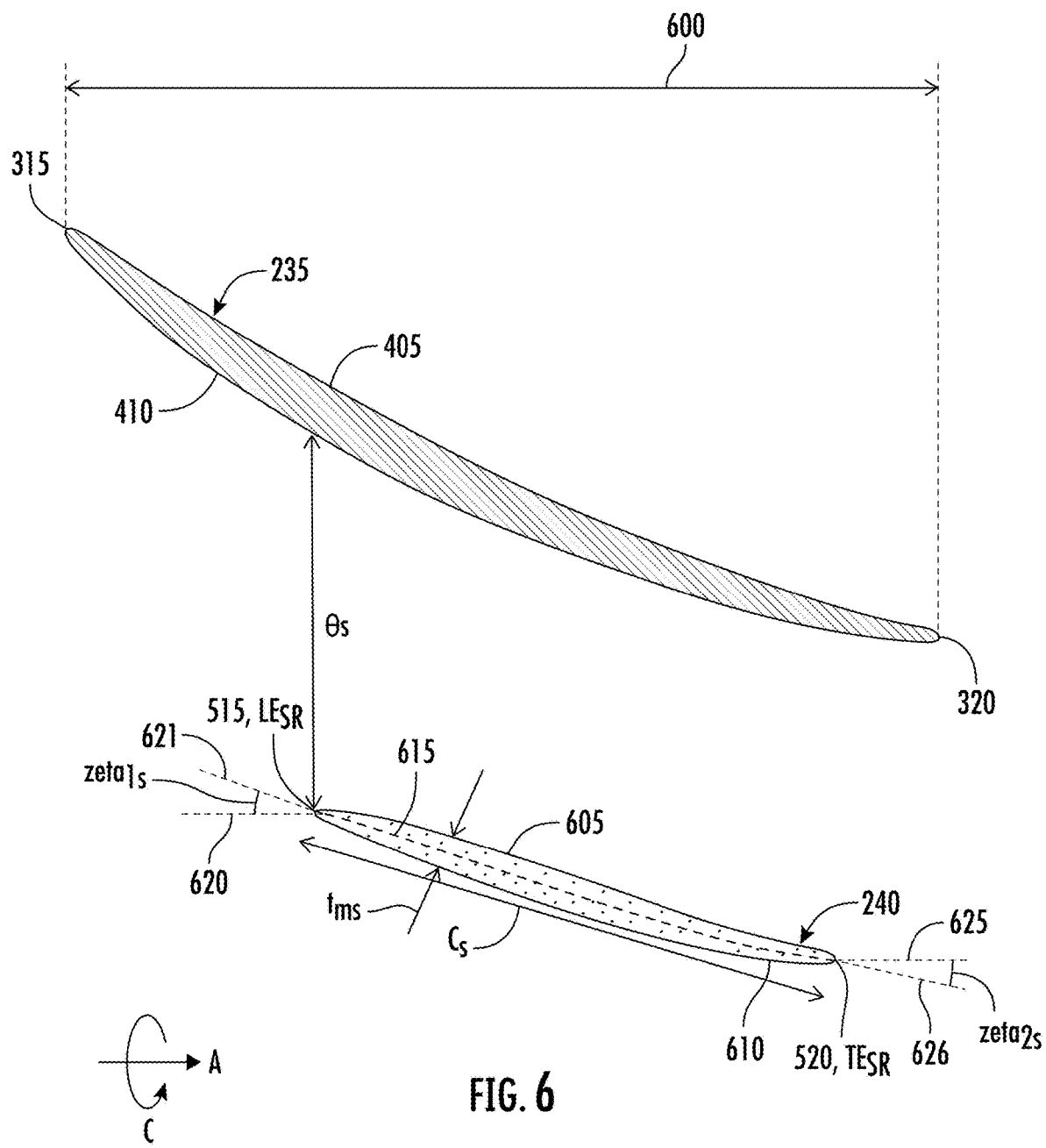
FIG. 6 is a cross-sectional view of the airfoil and the splittered airfoil of FIG. 5A in accordance with an exemplary embodiment of the present disclosure.

FIG. 6 is a cross-sectional view of the non-splittered airfoil 235 and the splittered airfoil 240 of FIG. 5A at the splittered span location defined along line D-D in accordance with an exemplary embodiment of the present disclosure. More specifically, the cross-section of the non-splittered airfoil 235 and the splittered airfoil 240 shown in FIG. 6 is taken at a same radial distance the centerline 12, as indicated by line 602 shown in FIG. 2.

The splittered airfoil 240 include a splittered pressure side 605 between the splittered leading edge 515 and the splittered trailing edge 520 and a splittered suction side 610 between the splittered leading edge 515 and the splittered trailing edge 520 opposite the splittered pressure side 605.

As shown in FIG. 6, the splittered airfoil 240 defines a chord length $C_s$ extending linearly between the splittered leading edge 515 and the splittered trailing edge 520. The chord length $C_s$ is measured at the splittered span location (shown along line D-D in FIG. 5) between the splittered leading edge radial coordinate $LE_{SR}$ and the splittered trailing edge radial coordinate $TE_{SR}$. The splittered airfoil 240 also defines a splittered mean line 615 between the splittered leading edge 515 and the splittered trailing edge 520 at a location midway between the splittered pressure side 605 and the splittered suction side 610. For example, the splittered mean line 615 is halfway between the splittered pressure side 605 and the splittered suction side 610 between the splittered leading edge 515 and the splittered trailing edge 520.

Additionally, the splittered airfoil 240 defines a leading edge extension 621 of the mean line 615 extending from the splittered leading edge 515 (splittered leading edge radial coordinate $LE_{SR}$) and a splittered leading edge reference line 620. Moreover, the leading edge extension 621 is tangent to the mean line 615 at the leading edge 315. The splittered leading edge reference line 620 extends through the splittered leading edge 515 (splittered leading edge radial coordinate $LE_{SR}$) parallel to the centerline axis 12 (FIGS. 1-3B and 5A-5B). A splittered leading edge mean-line angle $zeta_{1s}$ is defined between the splittered leading edge reference line 620 and the leading edge extension 621.

Moreover, the splittered airfoil 240 defines a trailing edge extension 626 of the mean line 615 extending from the splittered trailing edge 520 (the splittered trailing edge radial coordinate $TE_{SR}$) and a splittered trailing edge reference line 625. The splittered trailing edge reference line 625 extends through the splittered trailing edge 520 (the splittered trailing edge radial coordinate $TE_{SR}$) parallel to the centerline axis 12 (FIGS. 1-3B and 5A-5B). A splittered trailing edge mean-line angle $zeta_{2s}$ is defined between the splittered trailing edge reference line 625 and the trailing edge extension 626.

Additionally, the splittered airfoil 240 defines a splittered max thickness $t_{ms}$ extending between the splittered pressure side 605 and the splittered suction side 610. For example, the splittered max thickness $t_{ms}$ is a maximum thickness of the splittered airfoil 240 between the splittered pressure side 605 and the splittered suction side 610 at a position between the splittered leading edge 515 and the splittered trailing edge 520 and along the mean line 615. Moreover, the splittered max thickness $t_{ms}$ extends perpendicularly to the mean line 615. The chord length $C_s$, the splittered leading edge mean-line angle $zeta_{1s}$, the splittered trailing edge mean-line angle $zeta_{2s}$, and the splittered max thickness $t_{ms}$ are measured at any location along the splittered span between the splittered root 505 and the splittered tip 510 of the splittered airfoil 240, such as at the splittered span radius $R_s$ shown along line D-D in FIG. 5.

An axial airfoil distance 600 is defined between the leading edge 315 and the trailing edge 320 extending parallel to the centerline axis 12 (FIGS. 5A-5B). The axial airfoil distance 600 is measured at the airfoil root 305 (FIG. 3A). As shown in FIG. 6, the splittered leading edge 515 at the splittered root 505 is positioned at one-third the axial airfoil distance 600 from the leading edge 315 of the non-splittered airfoils 235. In other example embodiments, the splittered leading edge 515 at the splittered root 505 is positioned at one-half of the axial airfoil distance 600 from the leading edge 315 of the non-splittered airfoil 235.

Still referring to FIG. 6, a splittered leading edge angular placement $\theta_s$ is defined between the splittered leading edge 515 and the airfoil suction side 410 of an adjacent non-splittered airfoil 235. More specifically, the leading edge angular placement $\theta_s$ is defined between the splittered leading edge radial coordinate $LE_{SR}$ and the airfoil suction side 410 of the adjacent non-splittered airfoil 235. The splittered leading edge angular placement $\theta_s$ is measured in radians in the circumferential direction C (FIG. 1) between the splittered leading edge 515 and the airfoil suction side 410 of the adjacent non-splittered airfoil 235.

The inventors devised multiple airfoil and splittered airfoil designs and determined that geometry and dimensions of the splittered airfoils have a significant effect on aerodynamic efficiency and radial balance of flow (e.g., reducing losses near the hub or preventing flow separation from the hub). In particular, the inventors discovered that the splittered leading edge mean-line angle $zeta_{1s}$, the splittered trailing edge mean-line angle $zeta_{2s}$, an airfoil count $N_b$ of the plurality of non-splittered airfoils 235, the chord length $C_s$ of the plurality of splittered airfoils 240, the splittered max thickness $t_{ms}$, the splittered span radius $R_s$, the splittered tip radius $R_{st}$, the splittered hub radius $R_{sh}$, and a splittered relationship f based on the splittered leading edge angular placement $\theta_s$ have an effect on aerodynamic efficiency and the radial balance of flow. Additionally, the plurality of non-splittered airfoils 235 having a geometry as described herein can increase efficiency without weakening flow at the hub.

Further, the inventors determined, through devising splittered airfoil designs, that dimensions of a plurality of non-splittered airfoils spaced in an alternating arrangement with the plurality of splittered airfoils in a circumferential direction about the gas turbine engine reduce losses near the hub and prevent flow separation from the hub, which has an effect on aerodynamic efficiency and the radial balance of flow. Therefore, the inventors determined during the course of their airfoil and splittered airfoil design that geometry and dimensions of both the plurality of non-splittered airfoils 235 and the plurality of splittered airfoils 240 illustrated in FIGS. 2-6 have an effect on aerodynamic efficiency and the radial balance of flow.

As stated above, the inventors created solutions with relatively high aerodynamic efficiency that also prevented flow weakness or separation in the hub region that meet engine requirements. With reference to FIG. 7A, a table illustrates eighteen examples (denoted Ex. 1-18) of gas turbine engine 10 and compressor sections 200, including the plurality of non-splittered airfoils 235 and the plurality of splittered airfoils 240. The table of FIG. 7A includes $R_s$ values, $C_s$ values, $t_{ms}$ values, $N_b$ values, $R_{st}$ values, $R_{sh}$ values, $zeta_{1s}$ values, $zeta_{2s}$ values, and f values. The inventors found that splittered airfoil designs, such as for the splittered airfoils 240, with parameters defined in Examples 1-18 of FIG. 7A exhibit relatively high aerodynamic efficiency while meeting engine requirements.

The examples developed by the inventors shown in the table of FIG. 7A can be characterized by a splittered pressure coefficient $y_s$ and a splittered span parameter $x_s$, which can be used to identify an improved splittered airfoil design suited for a particular engine operating environment and taking into account constraints imposed on splittered airfoil designs used in such a system. The splittered pressure coefficient $y_s$ is defined as:

$$(\cos(zeta_{1s}))^2 \cdot [(\tan(zeta_{1s}))^2 - (\tan(zeta_{2s}))^2] \quad (1)$$

The splittered pressure coefficient $y_s$ is based on the splittered leading edge mean-line angle $zeta_{1s}$ and the splittered trailing edge mean-line angle $zeta_{2s}$ of the splittered airfoil 240 shown in FIG. 6.

The splittered span parameter $x_s$ is defined as:

$$\left[ \frac{S_s}{\left( \left(1 - S_s \cdot \frac{t_{ms}}{C_s}\right) \cdot a_s \cdot \cos(zeta_{2s}) \right)} \right]^{0.5} \quad (2)$$

The splittered span parameter $x_s$ is based on a splittered solidity Ss, the splittered max thickness $t_{ms}$, the chord length $C_s$, a splittered aspect ratio as, and the splittered trailing edge mean-line angle $zeta_{2s}$.

The splittered solidity Ss is defined as:

$$\frac{C_s \cdot N_b}{2\pi R_s \cdot f} \quad (3)$$

The splittered solidity Ss is based on the chord length $C_s$ of the splittered airfoil 240 shown in FIG. 6, the airfoil count $N_b$ of the non-splittered airfoil 235, the splittered span radius $R_s$ of the splittered airfoil 240 shown in FIG. 5A, and a splittered relationship f. The splittered relationship f is based on the airfoil count $N_b$ of the plurality of non-splittered airfoils 235 and the splittered leading edge angular placement $\theta_s$ of the splittered airfoil 240 shown in FIG. 6. The airfoil count $N_b$ of the plurality of non-splittered airfoils 235 corresponds to a number of the plurality of non-splittered airfoils 235. Accordingly, the splittered relationship f is defined as:

$$\frac{\theta_s \cdot N_b}{2\pi} \quad (4)$$

The splittered aspect ratio as of (2) is based on a splittered height $h_s$, which is equal to $R_{st} - R_{sh}$ (shown in FIG. 5A), and the chord length $C_s$ of the splittered airfoil 240 shown in FIG. 6. The splittered aspect ratio as is defined as:

$$\frac{h_s}{C_s} \quad (5)$$

Values for the splittered pressure coefficient $y_s$ and the splittered span parameter $x_s$ for the examples of FIG. 7A are shown in FIG. 7B. Based on the splittered pressure coefficient $y_s$ and the splittered span parameter $x_s$ values of Examples 1-18 in FIG. 7B, it was determined that gas turbine engine and splittered airfoil designs with $y_s$ values in the range of 0 to 0.99 (i.e., $0 \leq y_s \leq 0.99$) advantageously meet aerodynamic efficiency requirements while remaining within desired tolerances and being capable of use in existing engine systems. More specifically, $y_s$ values greater than or equal to 0 and where $y_s-\min(0.6x_s^{0.4}, 1.0)$ is less than or equal to 0 (i.e., $y_s \geq 0$ and $y_s-\min(0.6x_s^{0.4}, 1.0) \leq 0$) are advantageous.

Benefits are realized when the manufactured component including the plurality of splittered airfoils 240 has a geometry where the splittered span parameter $x_s$ falls within the range 0.5 to 4.5 (i.e., $0.5 \leq x_s \leq 4.5$). Such benefits include improving aerodynamic efficiency and stability.

Figure 7C:
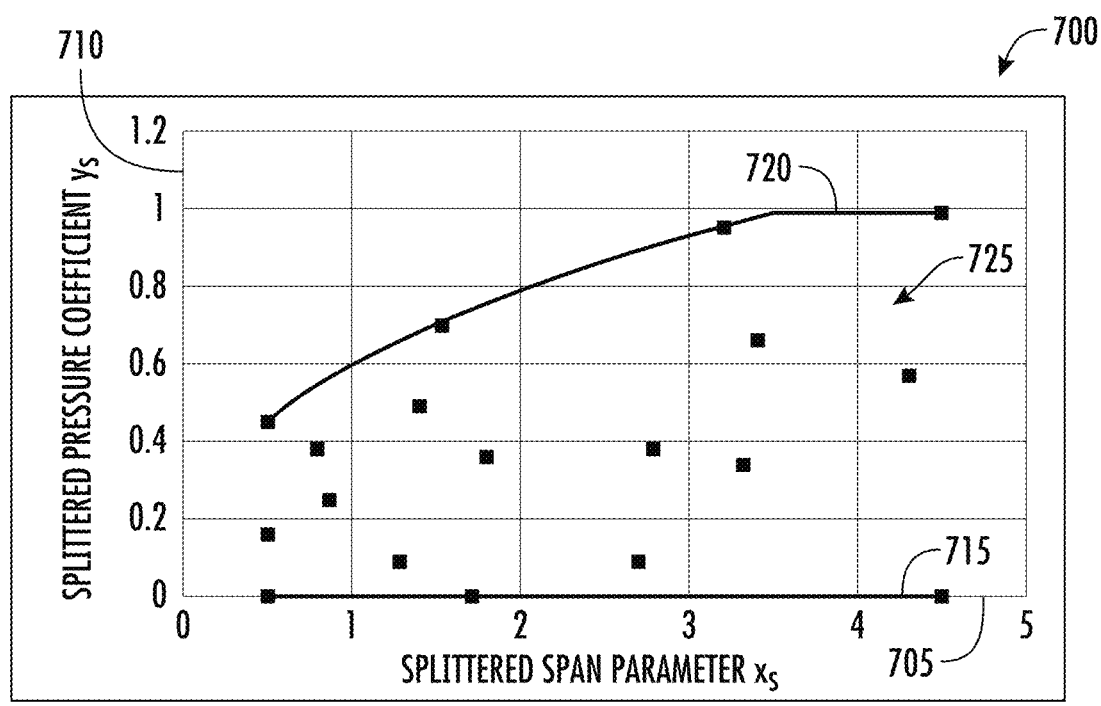
FIG. 7C is a graphical representation of the splittered pressure coefficient relative to the splittered span parameter according to exemplary embodiments of the present disclosure.

With reference to FIG. 7C, a graph 700 is provided depicting the splittered pressure coefficient $y_s$ as a function of the splittered span parameter $x_s$. For example, the graph 700 includes the splittered span parameter $x_s$ on the X-axis 705 and the splittered pressure coefficient $y_s$ on the Y-axis 710. The graph 700 includes a first line 715 where the splittered span parameter $x_s$ is greater than or equal to 0.5 and less than or equal to 4.5 and the splittered pressure coefficient $y_s$ is equal to 0. The graph 700 also includes a second line 720 where $y_s$ is greater than or equal to 0 and $y_s-\min(0.6x_s^{0.4}, 1.0)$ is less than or equal to 0 (i.e., $y_s \geq 0$ and $y_s-\min(0.6x_s^{0.4}, 1.0) \leq 0$). Accordingly, as shown in FIG. 7C, the splittered span parameter $x_s$ is greater than or equal to 0.5 and less than or equal to 4.5 and the splittered pressure coefficient $y_s$ is greater than or equal to 0.45 and less than or equal to 1. The graph 700 depicts a range 725 defined between the first line 715 and the second line 720 where the splittered span parameter $x_s$ is greater than or equal to 0.5 and less than or equal to 4.5 (i.e., $0.5 \leq x_s \leq 4.5$) and the splittered pressure coefficient $y_s$ is greater than or equal to 0 and less than or equal to 0.99 (i.e., $0 \leq y_s \leq 0.99$).

FIG. 7D provides a table illustrating minimum and maximum values for the splittered span radius $R_s$, the chord length $C_s$, the splittered max thickness $t_{ms}$, the airfoil count $N_b$, the splittered tip radius $R_{st}$, the splittered hub radius $R_{sh}$, the splittered leading edge mean-line angle $zeta_{1s}$, the splittered trailing edge mean-line angle $zeta_{2s}$, and the splittered relationship f along with a range of values for the splittered pressure coefficient $y_s$ and the splittered span parameter $x_s$ suited for a plurality of splittered airfoils that meets the aerodynamic efficiency requirements.

More specifically, FIG. 7E illustrates additional minimum and maximum vales for the splittered span radius $R_s$, the chord length $C_s$, the splittered max thickness $t_{ms}$, the airfoil count $N_b$, the splittered tip radius $R_{st}$, the splittered hub radius $R_{sh}$, the splittered leading edge mean-line angle $zeta_{1s}$, the splittered trailing edge mean-line angle $zeta_{2s}$, and the splittered relationship f along with a range of values for the splittered pressure coefficient $y_s$ and the splittered span parameter $x_s$ suited for a plurality of splittered airfoils that meets the aerodynamic efficiency requirements. The minimum and maximum values provided in FIG. 7E provide an increased aerodynamic benefit. Additionally, the minimum and maximum values provided in FIG. 7E provide a reduced physical footprint suitable for smaller engine sizes and which reduces costs.

Moreover, the inventors discovered that the dimensions and geometry of the plurality of non-splittered airfoils 235 in combination with the dimensions and geometry of the plurality of splittered airfoils 240 discussed with respect to (1)-(5) have an effect on aerodynamic efficiency and the radial balance of flow. For example, the airfoil count $N_b$, the tip chord length $C_t$, the tip max thickness $t_{mt}$, the tip radius $R_t$, the hub radius $R_h$, the airfoil tip leading edge mean-line angle $zeta_{1t}$, and the airfoil tip trailing edge mean-line angle $zeta_{2t}$ of the plurality of non-splittered airfoils 235 have an effect on aerodynamic efficiency and the radial balance of flow.

With reference to FIG. 8A, a table is provided illustrating eighteen examples (denoted Ex. 1-18) of gas turbine engine 10 and compressor sections 200, including the plurality of non-splittered airfoils 235. The table of FIG. 8A includes $C_t$ values, $t_{mt}$ values, $N_b$ values, $R_t$ values, $R_h$ values, $zeta_{1t}$ values, and $zeta_{2t}$ values for the plurality of non-splittered airfoils 235 for each of the examples. The inventors found that airfoil designs, such as for the plurality of non-splittered airfoils 235, with parameters defined in Examples 1-18 of FIG. 8A exhibit relatively high aerodynamic efficiency while remaining within current engine constraints. More particularly, such airfoil designs for the plurality of non-splittered airfoils 235 in combination with the splittered designs for the plurality of splittered airfoils 240, discussed above, exhibit relatively high aerodynamic efficiency and prevent flow weakness or separation in the hub region while remaining within current engine constraints.

The examples developed by the inventors shown in the table of FIG. 8A can be characterized by an airfoil tip pressure coefficient $y_t$ and an airfoil tip parameter $x_t$, which can be used to identify an improved airfoil design better suited for a particular engine operating environment and taking into account the constraints imposed on airfoil designs used in such a system.

The airfoil tip pressure coefficient $y_t$ is defined as:

$$(\cos(zeta_{1t}))^2 \cdot [(\tan(zeta_{1t}))^2 - (\tan(zeta_{2t}))^2] \tag{6}$$

The airfoil tip pressure coefficient $y_t$ is based on the airfoil tip leading edge mean-line angle $zeta_{1t}$ and the airfoil tip trailing edge mean-line angle $zeta_{2t}$ for the non-splittered airfoil 235, as shown in FIG. 4A.

The airfoil tip parameter $x_t$ is defined as:

$$\left[\frac{S_t}{\left(\left(1 - S_t \cdot \frac{t_{mt}}{C_t}\right) \cdot a_t \cdot \cos(zeta_{2t})\right)}\right]^{0.5} \tag{7}$$

The airfoil tip parameter $x_t$ is based on a tip solidity $S_t$, the tip max thickness $t_{mt}$ of the non-splittered airfoil 235 shown in FIG. 4A, the tip chord length $C_t$ of the non-splittered airfoil 235 shown in FIG. 4A, an airfoil tip aspect ratio at, and the airfoil tip trailing edge mean-line angle $zeta_{2t}$ of the non-splittered airfoils 235 shown in FIG. 4A.

The tip solidity $S_t$ of (7) is based on the tip chord length $C_t$ of the non-splittered airfoil 235 shown in FIG. 4A; the airfoil count $N_b$, which corresponds to a total number of the plurality of non-splittered airfoils 235 shown in FIG. 2; and the tip radius $R_t$ of the non-splittered airfoil 235 shown in FIG. 3A. The tip solidity $S_t$ is defined as:

$$\frac{C_t N_b}{2\pi R_t} \tag{8}$$

The airfoil tip aspect ratio at of (7) is based on an airfoil height h of the non-splittered airfoil 235, which is equal to $R_t - R_h$ (shown in FIG. 3A), and the tip chord length $C_t$ of the non-splittered airfoil 235 shown in FIG. 4A. The airfoil tip aspect ratio at is defined as:

$$\frac{h}{C_t} \tag{9}$$

Values for the airfoil tip pressure coefficient $y_t$ and the airfoil tip parameter $x_t$ for each of the examples of FIG. 8A are shown in FIG. 8B. Based on the airfoil tip pressure coefficient $y_t$ and the airfoil tip parameter $x_t$ values of examples 1-18 in FIG. 8B, it was determined that gas turbine engine, airfoil, and splittered airfoil designs with $y_t$ values in the range of 0.38 to 0.99 (i.e., $0.38 \leq y_t \leq 0.99$) advantageously meet aerodynamic efficiency requirements while remaining within desired tolerances and being capable of use in existing engine systems. More specifically, values where $y_t - 0.44 x_t^{0.2}$ is greater than or equal to 0 (i.e., $y_t - 0.44 x_t^{0.2} \geq 0$) and values where $y_t - \min(0.92 x_t^{0.2}, 1.0)$ is less than or equal to 0 (i.e., $y_t - \min(0.92 x_t^{0.2}, 1.0) \leq 0$) advantageously meet the aerodynamic efficiency requirements.

Benefits are realized when the manufactured component including the plurality of non-splittered airfoils 235 has a geometry where the airfoil tip parameter $x_t$ falls within the range of 0.5 to 2 (i.e., $0.5 \leq x_t \leq 2$). Such benefits include improving aerodynamic efficiency and throttle margin. Further, benefits are realized when the airfoil tip parameter $x_t$ falls within the range 0.6 to 1.7 (i.e., $0.6 \leq x_t \leq 1.7$), which is applicable to a narrower subset of the airfoil and splittered airfoil designs.

Figure 8C:
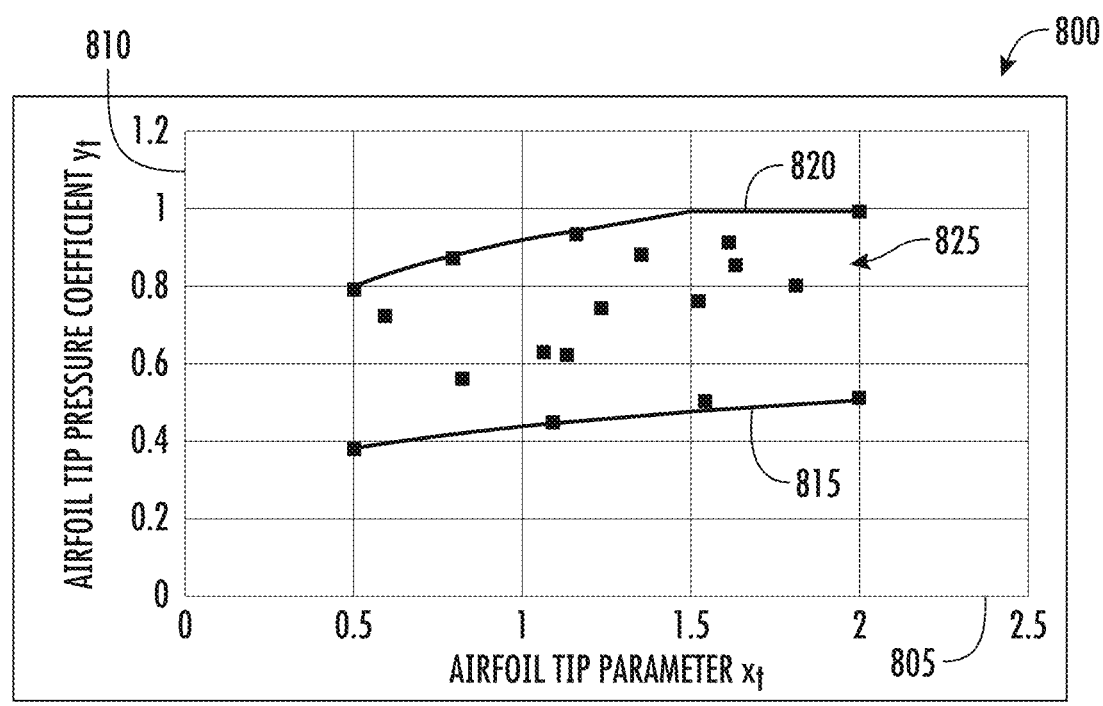
FIG. 8C is a graphical representation of the airfoil tip pressure coefficient relative to the airfoil tip parameter according to exemplary embodiments of the present disclosure.

With reference to FIG. 8C, a graph 800 is provided depicting the airfoil tip pressure coefficient $y_t$ as a function of the airfoil tip parameter $x_t$. For example, the graph 800 includes the airfoil tip parameter $x_t$ on the X-axis 805 and the airfoil tip pressure coefficient $y_t$ on the Y-axis 810. The graph 800 includes a first line 815 where the airfoil tip parameter $x_t$ is greater than or equal to 0.5 and less than or equal to 2 and the airfoil tip pressure coefficient $y_t$ is greater than or equal to 0.38 and less than or equal to 0.51. The graph 800 also includes a second line 820 where $y_t - 0.44 x_t^{0.2}$ is greater than or equal to 0 (i.e., $y_t - 0.44 x_t^{0.2} \geq 0$) and where $y_t - \min(0.92 x_t^{0.2}, 1.0)$ is less than or equal to 0 (i.e., $y_t - \min(0.92 x_t^{0.2}, 1.0) \leq 0$). Accordingly, as shown in FIG. 8C, the airfoil tip parameter $x_t$ is greater than or equal to 0.5 and less than or equal to 2 and the airfoil tip pressure coefficient $y_t$ is greater than or equal to 0.79 and less than or equal to 0.99. The graph 800 depicts a range 825 defined between the first line 815 and the second line 820 where the airfoil tip parameter $x_t$ is greater than or equal to 0.5 and less than or equal to 2 (i.e., $0.5 < x_t \leq 2$) and the airfoil tip pressure coefficient $y_t$ is greater than or equal to 0.38 and less than or equal to 0.99 (i.e., $0.38 \leq y_t \leq 0.99$).

FIG. 8D provides a table illustrating minimum and maximum values for the tip chord length $C_t$, the tip max thickness $t_{mt}$, the airfoil count $N_b$, the tip radius $R_t$, the hub radius $R_h$, the airfoil tip leading edge mean-line angle $\zeta_{1t}$, and the airfoil tip trailing edge mean-line angle $\zeta_{2t}$, along with a range of values for the airfoil tip pressure coefficient $y_t$ and the airfoil tip parameter $x_t$ suited for a plurality of non-splittered airfoils that meets the aerodynamic efficiency requirements.

More specifically, FIG. 8E illustrates additional minimum and maximum values for the tip chord length $C_t$, the tip max thickness $t_{mt}$, the airfoil count $N_b$, the tip radius $R_t$, the hub radius $R_h$, the airfoil tip leading edge mean-line angle $\zeta_{1t}$, and the airfoil tip trailing edge mean-line angle $\zeta_{2t}$, along with a range of values for the airfoil tip pressure coefficient $y_t$ and the airfoil tip parameter $x_t$ suited for a plurality of airfoils that meets the aerodynamic efficiency requirements. The minimum and maximum values provided in FIG. 8E provide an increased aerodynamic benefit. Additionally, the minimum and maximum values provided in FIG. 8E provide a reduced physical footprint suitable for smaller engine sizes and which reduces costs.

Moreover, the inventors further discovered that the dimensions and geometry of the plurality of non-splittered airfoils 235 in combination with the dimensions and geometry of the plurality of splittered airfoils 240 discussed with respect to (1)-(5) have an effect on aerodynamic efficiency and the radial balance of flow. For example, the inventors discovered that the midspan max thickness $t_{mp}$, the midspan radius $R_p$, the midspan chord length $C_p$, a midspan solidity $S_p$, an airfoil midspan aspect ratio $a_p$, and the airfoil midspan trailing edge mean-line angle $\zeta_{2p}$ have a significant effect on the aerodynamic efficiency and the radial balance of flow.

FIG. 9A provides a table including eighteen examples (denoted Ex. 1-18) of gas turbine engines 10 and compressor sections 200, including the plurality of non-splittered airfoils 235 and the plurality of splittered airfoils 240, developed by the inventors. FIG. 9A includes $R_p$ values, $C_p$ values, $t_{mp}$ values, $R_t$ values, $R_h$ values, $\zeta_{1p}$ values, and $\zeta_{2p}$ values for the plurality of non-splittered airfoils 235 for each of the examples. The inventors found that airfoil designs, such as for the plurality of non-splittered airfoils 235, with parameters defined in Examples 1-18 of FIG. 9A exhibit relatively high aerodynamic efficiency while remaining within current engine constraints. More particularly, such airfoil designs for the plurality of non-splittered airfoils 235 in combination with the splittered designs for the plurality of splittered airfoils 240, discussed above, exhibit relatively high aerodynamic efficiency and prevent flow weakness or separation in the hub region while remaining within current engine constraints.

The examples developed by the inventors shown in FIG. 9A can be characterized by an airfoil midspan pressure coefficient $y_p$ and an airfoil midspan parameter $x_p$, which can be used to identify an improved airfoil design better suited for a particular engine operating environment and taking into account the constraints imposed on airfoil designs used in such a system.

The airfoil midspan pressure coefficient $y_p$ is defined as:

$$(\cos(\zeta_{1p}))^2 \cdot [(\tan(\zeta_{1p}))^2 - (\tan(\zeta_{2p}))^2] \quad (10)$$

The airfoil midspan pressure coefficient $y_p$ is based on airfoil midspan leading edge mean-line angle $\zeta_{1p}$ and the airfoil midspan trailing edge mean-line angle $\zeta_{2p}$ discussed with respect to FIG. 4B.

The airfoil midspan parameter $x_p$ is defined as:

$$\left[ \frac{S_p}{\left(\frac{1 - S_p \cdot t_{mp}}{C_p}\right) \cdot a_p \cdot \cos(\zeta_{2p})} \right]^{0.5} \quad (11)$$

The airfoil midspan parameter $x_p$ is based on a midspan solidity $S_p$, the airfoil midspan max thickness $t_{mp}$ discussed with respect to FIG. 4B, the midspan chord length $C_p$ discussed with respect to FIG. 4B, an airfoil midspan aspect ratio $a_p$, and the airfoil midspan trailing edge mean-line angle $\zeta_{2p}$ discussed with respect to FIG. 4B. The midspan solidity $S_p$ of (11) is defined as follows:

$$\frac{C_p N_b}{2 \pi R_p} \quad (12)$$

The airfoil midspan aspect ratio $a_p$ of (11) is defined as:

$$\frac{h}{C_p} \quad (13)$$

Figure 9C:
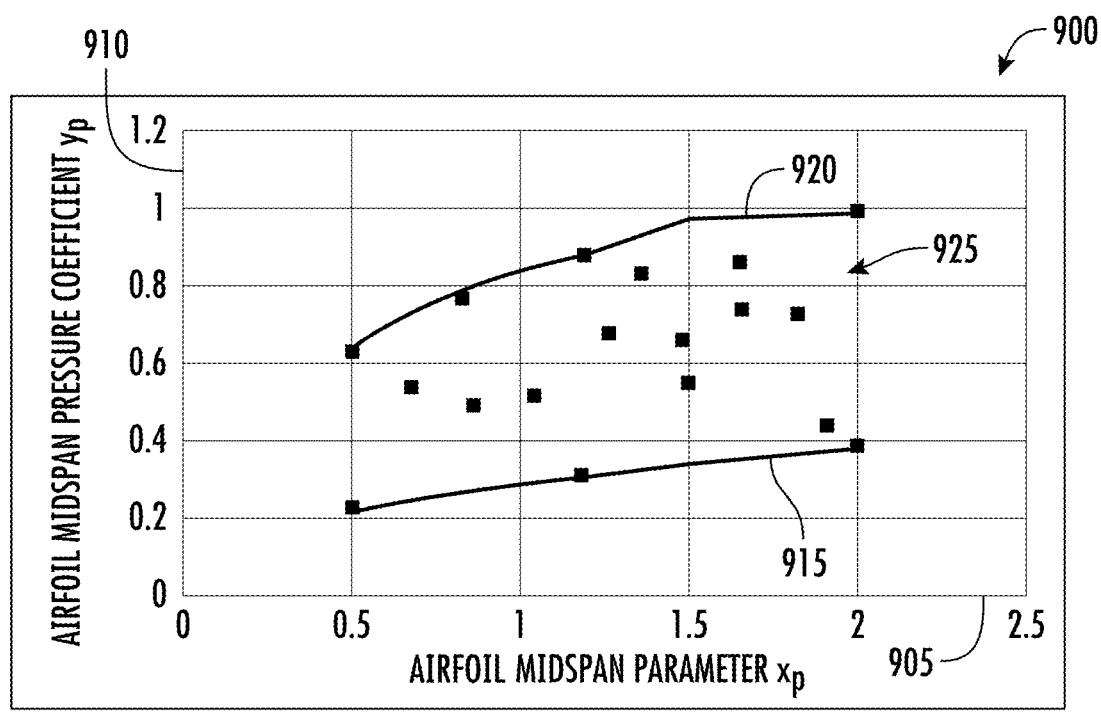
FIG. 9C is a graphical representation of the airfoil midspan pressure coefficient relative to the airfoil midspan parameter according to exemplary embodiments of the present disclosure.

Values for the airfoil midspan pressure coefficient $y_p$ and the airfoil midspan parameter $x_p$ for each of the examples of FIG. 9A are shown in FIG. 9B. Based on the airfoil midspan pressure coefficient $y_p$ and the airfoil midspan parameter $x_p$ values of examples 1-18 in FIG. 9B, and as shown in FIG. 9C to be discussed below, it was determined that gas turbine engine, airfoil, and splittered airfoils designs with $y_p$ values in the range of 0.23 to 0.99 (i.e., $0.23 \leq y_p \leq 0.99$) advantageously meet aerodynamic efficiency requirements while remaining within desired tolerances and being capable of use in existing engine systems. More specifically, values where $y_p - 0.29 x_p^{0.4}$ is greater than or equal to 0 (i.e., $y_p - 0.29 x_p^{0.4} \geq 0$) and $y_p - \min(0.83 x_p^{0.4}, 1.0)$ is less than or equal to 0 (i.e., $y_p - \min(0.83 x_p^{0.4}, 1.0) \leq 0$) advantageously meet the aerodynamic efficiency requirements.

Benefits are realized when the manufactured component including the plurality of non-splittered airfoils 235 has a geometry where the airfoil midspan parameter $x_p$ falls within the range of 0.5 to 2 (i.e., $0.5 \leq x_p \leq 2$). Such benefits include improving aerodynamic efficiency and throttle margin. Further, benefits are realized when the airfoil midspan parameter $x_p$ falls within the range 0.6 to 1.9 (i.e., $0.6 \leq x_p \leq 1.9$), which is applicable to a narrower subset of the airfoil and splittered airfoil designs.

With reference to FIG. 9C, a graph 900 is provided depicting the airfoil midspan pressure coefficient $y_p$ as a function of the airfoil midspan parameter $x_p$. For example, the graph 900 includes the airfoil midspan parameter $x_p$ on the X-axis 905 and the airfoil midspan pressure coefficient $y_p$ on the Y-axis 910. The graph 900 includes a first line 915 where the airfoil midspan parameter $x_p$ is greater than or equal to 0.5 and less than or equal to 2 and the airfoil midspan pressure coefficient $y_p$ is greater than or equal to 0.23 and less than or equal to 0.39. The graph 900 also includes a second line 920 where $y_p - 0.29 x_p^{0.4}$ is greater than or equal to 0 (i.e., $y_p - 0.29 x_p^{0.4} \geq 0$) and $y_p - \min(0.83 x_p^{0.4}, 1.0)$ is less than or equal to 0 (i.e., $y_p - \min(0.83 x_p^{0.4}, 1.0) \leq 0$). Accordingly, as shown in FIG. 9C, the airfoil midspan parameter $x_p$ is greater than or equal to 0.5 and less than or equal to 2 and the airfoil midspan pressure coefficient $y_p$ is greater than or equal to 0.63 and less than or equal to 0.99. The graph 900 depicts a range 925 defined between the first line 915 and the second line 920 where the airfoil midspan parameter $x_p$ is greater than or equal to 0.5 and less than or equal to 2 (i.e., $0.5 \leq x_p \leq 2$) and the airfoil midspan pressure coefficient $y_p$ is greater than or equal to 0.23 and less than or equal to 0.99 (i.e., $0.23 \leq y_p \leq 0.99$).

FIG. 9D provides a table illustrating minimum and maximum values for the midspan chord length $C_p$, the midspan max thickness $t_{mp}$, the airfoil count $N_b$, the tip radius $R_t$, the hub radius $R_h$, the airfoil midspan leading edge mean-line angle $\text{zeta}_{1p}$, and the airfoil midspan trailing edge mean-line angle $\text{zeta}_{2p}$ along with a range of values for the airfoil midspan pressure coefficient $y_p$ and the airfoil midspan parameter $x_p$ suited for a plurality of non-splittered airfoils that meets the aerodynamic efficiency requirements.

More specifically, FIG. 9E illustrates additional minimum and maximum values for the midspan chord length $C_p$, the midspan max thickness $t_{mp}$, the airfoil count $N_b$, the tip radius $R_t$, the hub radius $R_h$, the airfoil midspan leading edge mean-line angle $\text{zeta}_{1p}$, and the airfoil midspan trailing edge mean-line angle $\text{zeta}_{2p}$ along with a range of values for the airfoil midspan pressure coefficient $y_p$ and the airfoil midspan parameter $x_p$ suited for a plurality of airfoils that meets the aerodynamic efficiency requirements. The minimum and maximum values provided in FIG. 9E provide an increased aerodynamic benefit. Additionally, the minimum and maximum values provided in FIG. 9E provide a reduced physical footprint suitable for smaller engine sizes and which reduces costs.

Additionally, the inventors discovered that the hub max thickness $t_{mh}$, the hub radius $R_h$, the hub chord length $C_h$, a hub solidity $S_h$, an airfoil hub aspect ratio an, airfoil hub leading edge mean-line angle $\text{zeta}_{1h}$, and the airfoil hub trailing edge mean-line angle $\text{zeta}_{2h}$ in combination with the dimensions and geometry of the plurality of splittered airfoils 240 discussed with respect to (1)-(5) have a significant effect on the aerodynamic efficiency and the radial balance of flow.

FIG. 10A provides a table including eighteen examples (denoted Ex. 1-18) of gas turbine engines 10 and compressor sections 200, including the plurality of non-splittered airfoils 235 and the plurality of splittered airfoils 240, developed by the inventors. FIG. 10A includes $C_h$ values, $t_{mh}$ values, $R_t$ values, $R_h$ values, $\text{zeta}_{1h}$, and $\text{zeta}_{2h}$ values for the plurality of non-splittered airfoils 235 for each of the examples. The inventors found that airfoil designs, such as for the plurality of non-splittered airfoils 235, with parameters defined in Examples 1-18 of FIG. 10A exhibit relatively high aerodynamic efficiency while remaining within current engine constraints. More particularly, such airfoil designs for the plurality of non-splittered airfoils 235 in combination with the splittered designs for the plurality of splittered airfoils 240, discussed above, exhibit relatively high aerodynamic efficiency and prevent flow weakness or separation in the hub region while remaining within current engine constraints.

The examples developed by the inventors shown in FIG. 9A can be characterized by an airfoil hub pressure coefficient $y_h$ and an airfoil hub parameter $x_h$, which can be used to identify an improved airfoil design better suited for a particular engine operating environment and taking into account the constraints imposed on airfoil designs used in such a system.

The airfoil hub pressure coefficient $y_h$ is defined as:

$$(\cos(\text{zeta}_{1h}))^2 \cdot [(\tan(\text{zeta}_{1h}))^2 - (\tan(\text{zeta}_{2h}))^2] \tag{14}$$

The airfoil hub pressure coefficient $y_h$ is based on the airfoil hub leading edge mean-line angle $\text{zeta}_{1h}$ and the airfoil hub trailing edge mean-line angle $\text{zeta}_{2h}$ discussed with respect to FIG. 4C.

The airfoil hub parameter $x_h$ is defined as:

$$\left[ \frac{S_h}{\left( \frac{1 - S_h \cdot t_{mh}}{C_h} \right) \cdot a_h \cdot \cos(\text{zeta}_{2h})} \right]^{0.5} \tag{15}$$

The airfoil hub parameter $x_h$ is based on a hub solidity $S_h$, the airfoil hub max thickness $t_{mh}$ discussed with respect to FIG. 4C, the hub chord length $C_h$ discussed with respect to FIG. 4C, an airfoil hub aspect ratio an, and the airfoil hub trailing edge mean-line angle $\text{zeta}_{2h}$ discussed with respect to FIG. 4C. The hub solidity $S_h$ of (15) is defined as follows:

$$\frac{C_h N_b}{2 \pi R_h} \tag{16}$$

The airfoil hub aspect ratio an of (15) is defined as:

$$\frac{h}{C_h} \tag{17}$$

Values for the airfoil hub pressure coefficient $y_h$ and the airfoil hub parameter $x_h$ for each of the example of FIG. 10 are shown in FIG. 10B. Based on the airfoil hub pressure coefficient $y_h$ and the airfoil hub parameter $x_h$ values of examples 1-18 in FIG. 10B, it was determined that gas turbine engine, airfoil, and splittered airfoils designs with $y_h$ values in the range of 0.04 to 0.99 (i.e., $0.04 \leq y_h \leq 0.99$) advantageously meet aerodynamic efficiency requirements while remaining within desired tolerances and being capable of use in existing engine systems. More specifically, values where $y_h - 0.05 x_h^{0.25}$ is greater than or equal to 0 (i.e., $y_h - 0.05 x_h^{0.25} \geq 0$) and $y_h - 0.85 x_h^{0.25}$ is less than or equal to 0 (i.e., $y_h - 0.85 x_h^{0.25} \leq 0$) advantageously meet the aerodynamic efficiency requirements.

Benefits are realized when the manufactured component including the plurality of non-splittered airfoils 235 has a geometry where the airfoil hub parameter $x_h$ falls within the range of 0.5 to 2 (i.e., $0.5 \leq x_h \leq 2$). Such benefits include improving aerodynamic efficiency and throttle margin. Further, benefits are realized when the airfoil hub parameter $x_h$ falls within the range 0.6 to 1.9 (i.e., $0.6 \leq x_h \leq 1.9$), which is applicable to a narrower subset of the airfoil and splittered airfoil designs.

Figure 10C:
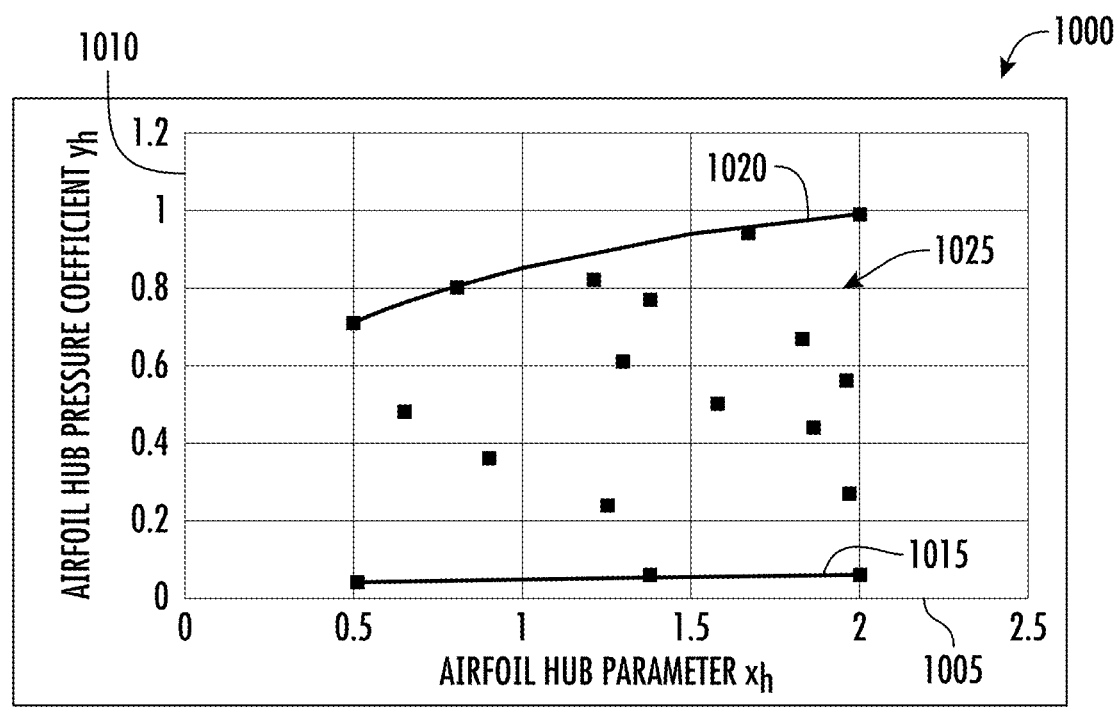
FIG. 10C is a graphical representation of the airfoil hub pressure coefficient relative to the airfoil hub parameter according to exemplary embodiments of the present disclosure.

With reference to FIG. 10C, a graph 900 is provided depicting the airfoil hub pressure coefficient $y_h$ as a function of the airfoil hub parameter $x_h$. For example, the graph 1000 includes the airfoil hub parameter $x_h$ on the X-axis 1005 and the airfoil hub pressure coefficient $y_h$ on the Y-axis 1010. The graph 1000 includes a first line 1015 where the airfoil hub parameter $x_h$ is greater than or equal to 0.5 and less than or equal to 2 and the airfoil hub pressure coefficient $y_h$ is greater than or equal to 0.04 and less than or equal to 0.06. The graph 1000 also includes a second line 1020 where $y_h - 0.05 x_h^{0.25}$ is greater than or equal to 0 (i.e., $y_h - 0.05 x_h^{0.25} \geq 0$) and $y_h - 0.85 x_h^{0.25}$ is less than or equal to 0 (i.e., $y_h - 0.85 x_h^{0.25} \leq 0$). Accordingly, the airfoil hub parameter $x_h$ is greater than or equal to 0.5 and less than or equal to 2 and the airfoil hub pressure coefficient $y_h$ is greater than or equal to 0.71 and less than or equal to 0.99. The graph 1000 depicts a range 1025 defined between the first line 1015 and the second line 1020 where the airfoil hub parameter $x_h$ is greater than or equal to 0.5 and less than or equal to 2 (i.e., $0.5 \leq x_h \leq 2$) and the airfoil hub pressure coefficient $y_h$ is greater than or equal to 0.04 and less than or equal to 0.99 (i.e., $0.04 \leq y_h \leq 0.99$).

FIG. 10D provides a table illustrating minimum and maximum values for the hub chord length $C_h$, the hub max thickness $t_{mh}$, the airfoil count $N_b$, the tip radius $R_t$, the hub radius $R_h$, the airfoil hub leading edge mean-line angle $zeta_{1h}$, and the airfoil hub trailing edge mean-line angle $zeta_{1h}$ along with a range of values for the airfoil hub pressure coefficient $y_h$ and the airfoil hub parameter $x_h$ suited for a plurality of non-splittered airfoils that meets the aerodynamic efficiency requirements.

More specifically, FIG. 10E illustrates additional minimum and maximum values for the hub chord length $C_h$, the hub max thickness $t_{mh}$, the airfoil count $N_b$, the tip radius $R_t$, the hub radius $R_h$, the airfoil hub leading edge mean-line angle $zeta_{1h}$, and the airfoil hub trailing edge mean-line angle $zeta_{2h}$ along with a range of values for the airfoil hub pressure coefficient $y_h$ and the airfoil hub parameter $x_h$ suited for a plurality of airfoils that meets the aerodynamic efficiency requirements. The minimum and maximum values provided in FIG. 10E provide an increased aerodynamic benefit. Additionally, the minimum and maximum values provided in FIG. 10E provide a reduced physical footprint suitable for smaller engine sizes and which reduces costs.

Additional benefits associated with the compressor section 200 including the plurality of non-splittered airfoils 235 and the plurality of splittered airfoils 240 described herein include a quick assessment of design parameters in terms of airfoil geometry, airfoil count, and splittered airfoil geometry for engine design and particular compressor designs. Narrowing these multiple factors to a region of possibilities saves time, money, and resources. The compressor section 200 including the plurality of non-splittered airfoils 235 and the plurality of splittered airfoils 240 described herein enables the development and production of high-performance turbine engines and compressor sections across multiple performance metrics within a given set of constraints.

Accordingly, the splittered pressure coefficient $y_s$ is provides an improved designs for the splittered airfoils 240. The airfoil tip pressure coefficient $y_t$, the airfoil midspan pressure coefficient $y_p$, and the airfoil hub pressure coefficient $y_h$ provide improved designs for the non-splittered airfoils 235 based on measurements at the tip, the midspan location, and the hub of the non-splittered airfoils 235, respectively. Accordingly, the $y_s$ values, $y_t$ values, $y_p$ values, and $y_h$ values may be used alone or in combination to provide splittered airfoils 240 and non-splittered airfoils 235 that improves aerodynamic efficiency and radial balance of flow while reducing losses and flow separation from the hub. Design ranges outside the $y_s$ values, $y_t$ values, $y_p$ values, and $y_h$ values may attempt to increase aerodynamic efficiency or stability and reduce flow weakness or separation from the hub by making sacrifices in terms of weight, complexity, and efficiency. Moreover, designs outside the provided ranges do not provide an aerodynamic efficiency or stability benefit that offsets the added complexity and increased costs of such designs.

Using a cost-benefit analysis, the overall engine efficiency may be reduced and related components may have to be redesigned to compensate for additional weight and complexity provided by such systems. In some cases, this result of such cost-benefit analysis is impractical or impossible. Therefore, a solution for increasing aerodynamic efficiency or stability and reducing flow weakness or separation from the hub presently used in existing engines is needed, without requiring redesign of related components or without sacrificing overall engine efficiency.

As disclosed above, the inventors have found that the Examples 1-18 of FIGS. 7A, 7B, 8A, 8B, 9A, 9B, 10A, and 10D provide successful solutions without the need to increase complexity and weight. The Examples 1-18 of FIGS. 7A and 7B, for example, illustrate that designs having a splittered pressure coefficient $(y_s)$ value from 0 to 0.99 (i.e., $0 \leq y_s \leq 0.99$) achieve increased aerodynamic efficiency without causing flow separation from the hub and penalties to size, weight, or efficiency. As disclosed above, the inventors created airfoil and splittered airfoil designs with increased aerodynamic efficiency and reduced flow weakness or separation from the hub for a defined engine operating environment.

To the extent one or more structures provided herein can be known in the art, it should be appreciated that the present disclosure can include combinations of structures not previously known to combine, at least for reasons based in part on conflicting benefits versus losses, desired modes of operation, or other forms of teaching away in the art.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the disclosure are provided by the subject matter of the following clauses:

A compressor section for a gas turbine engine defining a centerline axis, a radial direction, and a circumferential direction, the compressor section comprising: a hub extending along the centerline axis; a plurality of non-splittered airfoils extending from the hub from an airfoil root to an airfoil tip opposite the airfoil root, each of the plurality of non-splittered airfoils comprising an airfoil leading edge, an airfoil trailing edge, an airfoil pressure side extending between the airfoil leading edge and the airfoil trailing edge, an airfoil suction side opposite the airfoil pressure side extending between the airfoil leading edge and the airfoil trailing edge, each of the plurality of non-splittered airfoils comprising a root coupled to the hub and a tip opposite the root, wherein the plurality of non-splittered airfoils define: an airfoil count ($N_b$) corresponding to a number of the plurality of non-splittered airfoils, the airfoil count ($N_b$) greater than or equal to 10 and less than or equal to 90; and a plurality of splittered airfoils extending from a splittered root to a splittered tip, each of the plurality of splittered airfoils comprising a splittered leading edge, a splittered trailing edge, a splittered pressure side extending between the splittered leading edge and the splittered trailing edge, a splittered suction side opposite the splittered pressure side extending between the splittered leading edge and the splittered trailing edge, each of the plurality of splittered airfoils disposed between the plurality of non-splittered airfoils, each of the plurality of splittered airfoils comprising a splittered root coupled to the hub and a splittered tip opposite the splittered root, wherein each of the plurality of splittered airfoils define: a splittered span location between the splittered root and the splittered tip, a splittered mean line extending from the splittered leading edge to the splittered trailing edge at a location midway between the splittered pressure side and the splittered suction side, a splittered leading edge mean-line angle ($zeta_{1s}$) between the splittered mean line at the splittered leading edge and a splittered leading edge reference line extending through the splittered leading edge parallel to the centerline axis, measured at the splittered span location, the splittered leading edge mean-line angle ($zeta_{1s}$) greater than or equal to 18 degrees and less than or equal to 87 degrees, a splittered trailing edge mean-line angle ($zeta_{2s}$) between the splittered mean line at the splittered trailing edge and a splittered trailing edge reference line extending through the splittered trailing edge parallel to the centerline axis, measured at the splittered span location, the splittered trailing edge mean-line angle ($zeta_{2s}$) greater than or equal to 18 degrees and less than or equal to 70 degrees, a chord length ($C_s$) between the splittered leading edge and the splittered trailing edge measured at the splittered span location, the chord length ($C_s$) greater than 0.1 inches and less than 34 inches, a splittered max thickness ($t_{ms}$) extending between the splittered suction side and the splittered pressure side, measured at the splittered span location, the splittered max thickness ($t_{ms}$) greater than 0.005 inches and less than 0.7 inches, a splittered span radius ($R_s$) extending from the centerline axis to the splittered span location and measured at the splittered leading edge, the splittered span radius ($R_s$) greater than or equal to 2 inches and less than or equal to 61 inches, a splittered tip radius ($R_{st}$) extending between the centerline axis and the splittered tip in the radial direction and measured at the splittered leading edge, the splittered tip radius ($R_{st}$) greater than or equal to 2.5 inches and less than or equal to 61 inches, a splittered hub radius ($R_{sh}$) extending from the centerline axis and the splittered root in the radial direction and measured at the splittered leading edge, the splittered hub radius ($R_{sh}$) greater than or equal to 2 inches and less than or equal to 50 inches, a splittered height ($h_s$) equal to $R_{st} - R_{sh}$, a splittered aspect ratio ($a_s$) equal to $$\frac{h_s}{C_s},$$

a splittered leading edge angular placement ($\theta_s$) extending between the splittered leading edge and the airfoil suction side of an adjacent one of the plurality of non-splittered airfoils measured in radians, a splittered relationship (f) equal to $$\frac{\theta_s \cdot N_b}{2\pi},$$

the splittered relationship (f) greater than or equal to 0.05 and less than or equal to 0.95, a splittered solidity ($S_s$) equal to $$\frac{C_s \cdot N_b}{2\pi R_s \cdot f},$$

a splittered span parameter ($x_s$) equal to $$\left[\frac{S_s}{\left(\left(1 - S_s \cdot \frac{t_{ms}}{C_s}\right)a_s \cdot \cos(zeta_{2s})\right)}\right]^{0.5},$$

wherein $0.5 \leq x_s \leq 4.5$; wherein the plurality of splittered airfoils define a splittered pressure coefficient ($y_s$) equal to: $(\cos(zeta_{1s}))^2 \cdot [(\tan(zeta_{1s}))^2 - (\tan(zeta_{2s}))^2]$; wherein $0 \leq y_s \leq 1$; wherein $y_s - \min(0.6 x_s^{0.4}, 1.0) \leq 0$; and wherein the plurality of non-splittered airfoils define an airfoil height extending between the airfoil root and the airfoil tip and the plurality of splittered airfoils define a splittered height extending between the splittered root and the splittered tip, and wherein the splittered height is less than 80% of the airfoil height.

The compressor section of any preceding clause, wherein $1.0 \leq x_s \leq 2.0$.

The compressor section of any preceding clause, wherein: the airfoil count ($N_b$) is greater than or equal to 15 and less than or equal to 70; the chord length ($C_s$) is greater than 0.2 inches and less than 10.0 inches; the splittered span radius ($R_s$) is greater than or equal to 3 inches and less than or equal to 40 inches; the splittered tip radius ($R_{st}$) is greater than or equal to 3 inches and less than or equal to 25 inches; the splittered hub radius ($R_{sh}$) is greater than or equal to 4 inches and less than or equal to 40 inches; and the splittered relationship (f) is greater than or equal to 0.2 and less than or equal to 0.5.

The compressor section of any preceding clause, wherein the splittered leading edge mean-line angle (zeta$_{1s}$) is greater than or equal to 40 degrees and less than or equal to 70 degrees.

The compressor section of any preceding clause, wherein the splittered trailing edge mean-line angle (zeta$_{2s}$) is greater than or equal to 30 degrees and less than or equal to 65 degrees.

The compressor section of any preceding clause, wherein the plurality of non-splittered airfoils and the plurality of splittered airfoils are equidistantly spaced about the centerline axis.

The compressor section of any preceding clause, wherein the splittered trailing edge at the splittered root of one of the plurality of splittered airfoils is forward of or aligned with the airfoil trailing edge of an adjacent one of the plurality of non-splittered airfoils.

The compressor section of any preceding clause, wherein the splittered leading edge at the splittered root of one of the plurality of splittered airfoils is aft of the airfoil leading edge of an adjacent one of the plurality of non-splittered airfoils.

The compressor section of any preceding clause, wherein an axial airfoil distance is defined between the airfoil leading edge and the airfoil trailing edge at the airfoil root and extending parallel to the centerline axis, and wherein the splittered leading edge at the splittered root of one of the plurality of splittered airfoils is positioned at one-third the axial airfoil distance from the airfoil leading edge of the adjacent one of the plurality of non-splittered airfoils.

The compressor section of any preceding clause, wherein an axial airfoil distance is defined between the airfoil leading edge and the airfoil trailing edge at the airfoil root and extending parallel to the centerline axis, and wherein the splittered leading edge at the splittered root of one of the plurality of splittered airfoils is positioned at least one-half the axial airfoil distance from the airfoil leading edge of the adjacent one of the plurality of non-splittered airfoils.

The compressor section of any preceding clause, wherein: the plurality of non-splittered airfoils define an airfoil count (N$_b$) corresponding to a number of the plurality of non-splittered airfoils, the airfoil count (N$_b$) greater than or equal to 10 and less than or equal to 90; each of the plurality of non-splittered airfoils define: a tip chord length (C$_t$) between the airfoil leading edge and the airfoil trailing edge measured at the airfoil tip, the tip chord length (C$_t$) greater than 0.47 inches and less than 50 inches, a tip radius (R$_t$) extending between the centerline axis and the airfoil tip measured at the airfoil leading edge, the tip radius (R$_t$) greater than or equal to 5 inches and less than or equal to 80 inches, a tip solidity (S$_t$) equal to $$\frac{C_t N_b}{2\pi R_t},$$

a tip max thickness (t$_{mt}$) extending between the airfoil suction side and the airfoil pressure side and measured at the airfoil tip, the tip max thickness (t$_{mt}$) greater than 0.003 inches and less than 1.8 inches, a hub radius (R$_h$) extending from the centerline axis to the airfoil root along the radial direction measured at the airfoil leading edge, the hub radius (R$_h$) greater than or equal to 2 inches and less than or equal to 50 inches, an airfoil height (h) equal to R$_t$–R$_h$, an airfoil tip aspect ratio (a$_t$) equal to $$\frac{h}{C_t},$$

an airfoil mean line extending from the airfoil leading edge to the airfoil trailing edge at a location midway between the airfoil pressure side and the airfoil suction side, an airfoil tip leading edge mean-line angle (zeta$_{1t}$) between the airfoil mean line at the airfoil leading edge and an airfoil leading edge reference line extending through the airfoil leading edge parallel to the centerline axis and measured at the airfoil tip, the airfoil tip leading edge mean-line angle (zeta$_{1t}$) greater than or equal to 55 degrees and less than or equal to 87 degrees, and an airfoil tip trailing edge mean-line angle (zeta$_{2t}$) between the airfoil mean line at the airfoil trailing edge and an airfoil trailing edge reference line extending through the airfoil trailing edge parallel to the centerline axis and measured at the airfoil tip, the airfoil tip trailing edge mean-line angle (zeta$_{2t}$) greater than or equal to 20 degrees and less than or equal to 70 degrees; each of the plurality of non-splittered airfoils further define an airfoil tip parameter (x$_t$) equal to:

$$\left[\frac{S_t}{\left(\left(1-S_t\cdot\frac{t_{mt}}{C_t}\right)\cdot a_t\cdot\cos(\text{zeta}_{2t})\right)}\right]^{0.5}; 0.5\leq x_t\leq 2.0;$$

the plurality of non-splittered airfoils define an airfoil tip pressure coefficient (y$_t$) equal to: (cos (zeta$_{1t}$))$^2$·[(tan (zeta$_{1t}$))$^2$–(tan (zeta$_{2t}$))$^2$]; y$_t$–0.44x$_t^{0.2}$≥0; and y$_t$–min (0.92x$_t^{0.2}$, 1.0)≤0.

The compressor section of any preceding clause, wherein 0.6≤x$_t$≤1.7.

The compressor section of any preceding clause, wherein: the airfoil count (N$_b$) greater than or equal to 15 and less than or equal to 70; the tip radius (R$_t$) greater is than or equal to 5 inches and less than or equal to 70 inches; the hub radius (R$_h$) greater is than or equal to 3 inches and less than or equal to 30 inches; the airfoil tip leading edge mean-line angle (zeta$_{1t}$) is greater than or equal to 60 degrees and less than or equal to 75 degrees; and the airfoil tip trailing edge mean-line angle (zeta$_{2t}$) is greater than or equal to 30 degrees and less than or equal to 70 degrees.

The compressor section of any preceding clause, wherein: the plurality of non-splittered airfoils define an airfoil count (N$_b$) corresponding to a number of the plurality of non-splittered airfoils, the airfoil count (N$_b$) greater than or equal to 10 and less than or equal to 90; each of the plurality of non-splittered airfoils define: an airfoil midspan max thickness (t$_{mp}$) extending between the airfoil suction side and the airfoil pressure side and measured at an airfoil midspan location between the airfoil root and the airfoil tip, the airfoil midspan max thickness (t$_{mp}$) greater than 0.003 inches and less than 1.8 inches, a midspan radius (R$_p$) extending from the centerline axis to the airfoil midspan location and measured at the airfoil leading edge, the midspan radius (R$_p$) greater than or equal to 2 inches and less than or equal to 80 inches, a midspan chord length (C$_p$) between the airfoil leading edge and the airfoil trailing edge measured at the airfoil midspan location, the midspan chord length ($C_p$) greater than 0.47 inches and less than 50 inches, a midspan solidity ($S_p$) equal to $$\frac{C_p N_b}{2\pi R_p},$$

a tip radius ($R_t$) extending between the centerline axis and the airfoil tip measured at the airfoil leading edge, the tip radius ($R_t$) greater than or equal to 5 inches and less than or equal to 80 inches, a hub radius ($R_h$) extending from the centerline axis to the airfoil root along the radial direction measured at the airfoil leading edge, the hub radius ($R_h$) greater than or equal to 2 inches and less than or equal to 50 inches, an airfoil height (h) equal to $R_t$–$R_h$, an airfoil midspan aspect ratio ($a_p$) equal to $$\frac{h}{C_p},$$

the airfoil midspan aspect ratio ($a_p$) less than or equal to 2.0, an airfoil mean line extending from the airfoil leading edge to the airfoil trailing edge at a location midway between the airfoil pressure side and the airfoil suction side, an airfoil midspan leading edge mean-line angle ($zeta_{1p}$) between the airfoil mean line at the airfoil leading edge and an airfoil leading edge reference line extending through the airfoil leading edge parallel to the centerline axis and measured at the airfoil midspan location, the airfoil midspan leading edge mean-line angle ($zeta_{1p}$) greater than or equal to 50 degrees and less than or equal to 87 degrees, and an airfoil midspan trailing edge mean-line angle ($zeta_{2p}$) between the airfoil mean line at the airfoil trailing edge and an airfoil trailing edge reference line extending through the airfoil trailing edge parallel to the centerline axis and measured at the airfoil midspan location, the airfoil midspan trailing edge mean-line angle ($zeta_{2p}$) greater than or equal to 18 degrees and less than or equal to 70 degrees; each of the plurality of non-splittered airfoils further define an airfoil midspan parameter ($x_p$) equal to:

$$\left[\frac{S_p}{\left(\frac{1-S_p \cdot t_{mp}}{C_p}\right) \cdot a_p \cdot \cos(zeta_{2p})}\right]^{0.5}; 0.5 \le x_p \le 2.0;$$

the plurality of non-splittered airfoils define an airfoil midspan pressure coefficient ($y_p$) equal to: $(\cos(zeta_{1p}))^2 \cdot (\tan(zeta_{1p})^2 - (\tan(zeta_{2p}))^2$; $y_p - 0.29 x_p^{0.4} \ge 0$; and $y_p - \min(0.83 x_p^{0.4}, 1.0) \le 0$.

The compressor section of any preceding clause, wherein $0.6 \le x_p \le 1.9$.

The compressor section of any preceding clause, wherein: the airfoil count ($N_b$) is greater than or equal to 15 and less than or equal to 70; the midspan radius ($R_p$) is greater than or equal to 3 inches and less than or equal to 70 inches; the tip radius ($R_t$) is greater than or equal to 5 inches and less than or equal to 70 inches; the hub radius ($R_h$) is greater than or equal to 3 inches and less than or equal to 30 inches; the airfoil midspan leading edge mean-line angle ($zeta_{1p}$) is greater than or equal to 60 degrees and less than or equal to 75 degrees; and the airfoil midspan trailing edge mean-line angle ($zeta_{2p}$) is greater than or equal to 30 degrees and less than or equal to 70 degrees.

The compressor section of any preceding clause, wherein: the plurality of non-splittered airfoils define an airfoil count ($N_b$) corresponding to a number of the plurality of non-splittered airfoils, the airfoil count ($N_b$) greater than or equal to 10 and less than or equal to 90; each of the plurality of non-splittered airfoils define: a hub max thickness ($t_{mh}$) extending between the airfoil suction side and the airfoil pressure side and measured at the airfoil root, the hub max thickness ($t_{mh}$) greater than 0.003 inches and less than 1.8 inches, a hub chord length ($C_h$) extending between the airfoil leading edge and the airfoil trailing edge measured at the airfoil root, the hub chord length ($C_h$) greater than 0.43 inches and less than 35 inches, a hub solidity ($S_h$) equal to $$\frac{C_h N_b}{2\pi R_h},$$

a tip radius ($R_t$) extending between the centerline axis and the airfoil tip measured at the airfoil leading edge, the tip radius ($R_t$) greater than or equal to 5 inches and less than or equal to 80 inches, a hub radius ($R_h$) extending from the centerline axis to the airfoil root along the radial direction measured at the airfoil leading edge, the hub radius ($R_h$) greater than or equal to 2 inches and less than or equal to 50 inches, an airfoil height (h) equal to $R_t$–$R_h$, an airfoil hub aspect ratio ($a_h$) equal to $$\frac{R_t - R_h}{C_h},$$

an airfoil mean line extending from the airfoil leading edge to the airfoil trailing edge at a location midway between the airfoil pressure side and the airfoil suction side, an airfoil hub leading edge mean-line angle ($zeta_{1h}$) between the airfoil mean line at the airfoil leading edge and an airfoil leading edge reference line extending through the airfoil leading edge parallel to the centerline axis and measured at the airfoil root, the airfoil hub leading edge mean-line angle ($zeta_{1h}$) greater than or equal to 44 degrees and less than or equal to 87 degrees, and an airfoil hub trailing edge mean-line angle ($zeta_{2h}$) between the airfoil mean line at the airfoil trailing edge and an airfoil trailing edge reference line extending through the airfoil trailing edge parallel to the centerline axis and measured at the airfoil root, the airfoil hub trailing edge mean-line angle ($zeta_{2h}$) greater than or equal to 16 degrees and less than or equal to 70 degrees; each of the plurality of non-splittered airfoils further define an airfoil hub parameter ($x_h$) equal to:

$$\left[\frac{S_h}{\left(\frac{1-S_h \cdot t_{mh}}{C_h}\right) \cdot a_h \cdot \cos(zeta_{2h})}\right]; 0.5 \le x_h \le 2.0;$$

the plurality of non-splittered airfoils define an airfoil hub pressure coefficient ($y_h$) equal to: $(\cos(zeta_{1h}))^2 \cdot [(\tan(zeta_{1h}))^2 - (\tan(zeta_{2h}))^2]$; $y_h - 0.05 x_h^{0.25} \ge 0$; and $y_h - 0.85 x_h^{0.25} \le 0$.

The compressor section of any preceding clause, wherein $0.6 \le x_h \le 1.9$.

The compressor section of any preceding clause, wherein: the airfoil count ($N_b$) is greater than or equal to 15 and less than or equal to 70; the tip radius ($R_t$) is greater than or equal to 5 inches and less than or equal to 70 inches; the hub radius ($R_h$) is greater than or equal to 3 inches and less than or equal to 30 inches; the airfoil hub leading edge mean-line angle (zeta$_{1h}$) is greater than or equal to 50 degrees and less than or equal to 75 degrees; and the airfoil hub trailing edge mean-line angle (zeta$_{2h}$) is greater than or equal to 30 degrees and less than or equal to 70 degrees.

A fan for a gas turbine engine defining a centerline axis, a radial direction, and a circumferential direction, the fan comprising: a hub extending along the centerline axis; a plurality of non-splittered airfoils extending from the hub from an airfoil root to an airfoil tip opposite the airfoil root, each of the plurality of non-splittered airfoils comprising an airfoil leading edge, an airfoil trailing edge, an airfoil pressure side extending between the airfoil leading edge and the airfoil trailing edge, an airfoil suction side opposite the airfoil pressure side extending between the airfoil leading edge and the airfoil trailing edge, each of the plurality of non-splittered airfoils comprising a root coupled to the hub and a tip opposite the root, wherein the plurality of non-splittered airfoils define: an airfoil count ($N_b$) corresponding to a number of the plurality of non-splittered airfoils, the airfoil count ($N_b$) greater than or equal to 10 and less than or equal to 90; and a plurality of splittered airfoils extending from a splittered root to a splittered tip, each of the plurality of splittered airfoils comprising a splittered leading edge, a splittered trailing edge, a splittered pressure side extending between the splittered leading edge and the splittered trailing edge, a splittered suction side opposite the splittered pressure side extending between the splittered leading edge and the splittered trailing edge, each of the plurality of splittered airfoils disposed between the plurality of non-splittered airfoils, each of the plurality of splittered airfoils comprising a splittered root coupled to the hub and a splittered tip opposite the splittered root, wherein each of the plurality of splittered airfoils define: a splittered mean line extending from the splittered leading edge to the splittered trailing edge at a location midway between the splittered pressure side and the splittered suction side, a splittered leading edge mean-line angle (zeta$_{1s}$) between the splittered mean line at the splittered leading edge and a splittered leading edge reference line extending through the splittered leading edge parallel to the centerline axis, measured at the splittered span location, the splittered leading edge mean-line angle (zeta$_{1s}$) greater than or equal to 18 degrees and less than or equal to 87 degrees, a splittered trailing edge mean-line angle (zeta$_{2s}$) between the splittered mean line at the splittered trailing edge and a splittered trailing edge reference line extending through the splittered trailing edge parallel to the centerline axis, measured at the splittered span location, the splittered trailing edge mean-line angle (zeta$_{2s}$) greater than or equal to 18 degrees and less than or equal to 70 degrees, a chord length ($C_s$) between the splittered leading edge and the splittered trailing edge measured at the splittered span location, the chord length ($C_s$) greater than 0.1 inches and less than 34 inches, a splittered max thickness ($t_{ms}$) extending between the splittered suction side and the splittered pressure side, measured at the splittered span location, the splittered max thickness ($t_{ms}$) greater than 0.005 inches and less than 0.7 inches, a splittered span radius ($R_s$) extending from the centerline axis to the splittered span location and measured at the splittered leading edge, the splittered span radius ($R_s$) greater than or equal to 2 inches and less than or equal to 61 inches, a splittered tip radius ($R_{st}$) extending between the centerline axis and the splittered tip in the radial direction and measured at the splittered leading edge, the splittered tip radius ($R_{st}$) greater than or equal to 2.5 inches and less than or equal to 61 inches, a splittered hub radius ($R_{sh}$) extending from the centerline axis and the splittered root in the radial direction and measured at the splittered leading edge, the splittered hub radius ($R_{sh}$) greater than or equal to 2 inches and less than or equal to 50 inches, a splittered height ($h_s$) equal to $R_{st}$–$R_{sh}$, a splittered aspect ratio ($a_s$) equal to $$\frac{h_s}{C_s},$$

a splittered leading edge angular placement ($\theta_s$) extending between the splittered leading edge and the airfoil suction side of an adjacent one of the plurality of non-splittered airfoils measured in radians, a splittered relationship (f) equal to $$\frac{\theta_s \cdot N_b}{2\pi},$$

the splittered relationship (f) greater than or equal to 0.05 and less than or equal to 0.95, a splittered solidity ($S_s$) equal to $$\frac{C_s \cdot N_b}{2\pi R_s \cdot f},$$

a splittered span parameter ($x_s$) equal to $$\left[\frac{S_s}{\left(\left(1 - S_s \cdot \frac{t_{ms}}{C_s}\right) \cdot a_s \cdot \cos(\text{zeta}_{2s})\right)}\right]^{0.5},$$

wherein 0.5≤$x_s$≤4.5; wherein the plurality of splittered airfoils define a splittered pressure coefficient ($y_s$) equal to: (cos (zeta$_{1s}$))$^2$·[(tan (zeta$_{1s}$))$^2$–(tan (zeta$_{2s}$))$^2$]; wherein 0≤$y_s$≤1; wherein $y_s$–min (0.6$x_s^{0.4}$, 1.0)≤0; and wherein the plurality of non-splittered airfoils define an airfoil height extending between the airfoil root and the airfoil tip and the plurality of splittered airfoils define a splittered height extending between the splittered root and the splittered tip, and wherein the splittered height is less than 80% of the airfoil height.

The fan of any preceding clause, wherein the plurality of non-splittered airfoils and the plurality of splittered airfoils are equidistantly spaced about the centerline axis.

The fan of any preceding clause, wherein the splittered trailing edge at the splittered root of one of the plurality of splittered airfoils is forward of or aligned with the airfoil trailing edge of an adjacent one of the plurality of non-splittered airfoils.

The fan of any preceding clause, wherein the splittered leading edge at the splittered root of one of the plurality of splittered airfoils is aft of the airfoil leading edge of an adjacent one of the plurality of non-splittered airfoils.

The fan of any preceding clause, wherein an axial airfoil distance is defined between the airfoil leading edge and the airfoil trailing edge at the airfoil root and extending parallel to the centerline axis, and wherein the splittered leading edge at the splittered root of one of the plurality of splittered airfoils is positioned at one-third the axial airfoil distance from the airfoil leading edge of the adjacent one of the plurality of non-splittered airfoils.

The fan of any preceding clause, wherein an axial airfoil distance is defined between the airfoil leading edge and the airfoil trailing edge at the airfoil root and extending parallel to the centerline axis, and wherein the splittered leading edge at the splittered root of one of the plurality of splittered airfoils is positioned at least one-half the axial airfoil distance from the airfoil leading edge of the adjacent one of the plurality of non-splittered airfoils.

The fan of any preceding clause, wherein: the plurality of non-splittered airfoils define an airfoil count ($N_b$) corresponding to a number of the plurality of non-splittered airfoils, the airfoil count ($N_b$) greater than or equal to 10 and less than or equal to 90; each of the plurality of non-splittered airfoils define: a tip chord length ($C_t$) between the airfoil leading edge and the airfoil trailing edge measured at the airfoil tip, the tip chord length ($C_t$) greater than 0.47 inches and less than 50 inches, a tip radius ($R_t$) extending between the centerline axis and the airfoil tip measured at the airfoil leading edge, the tip radius ($R_t$) greater than or equal to 5 inches and less than or equal to 80 inches, a tip solidity ($S_t$) equal to $$\frac{C_t N_b}{2\pi R_t},$$

a tip max thickness ($t_{mt}$) extending between the airfoil suction side and the airfoil pressure side and measured at the airfoil tip, the tip max thickness ($t_{mt}$) greater than 0.003 inches and less than 1.8 inches, a hub radius ($R_h$) extending from the centerline axis to the airfoil root along the radial direction measured at the airfoil leading edge, the hub radius ($R_h$) greater than or equal to 2 inches and less than or equal to 50 inches, $$\frac{h}{C_t},$$

the airfoil height (h) is equal to $R_t - R_h$, an airfoil tip aspect ratio ($a_t$) equal to an airfoil mean line extending from the airfoil leading edge to the airfoil trailing edge at a location midway between the airfoil pressure side and the airfoil suction side, an airfoil tip leading edge mean-line angle ($zeta_{1t}$) between the airfoil mean line at the airfoil leading edge and an airfoil leading edge reference line extending through the airfoil leading edge parallel to the centerline axis and measured at the airfoil tip, the airfoil tip leading edge mean-line angle ($zeta_{1t}$) greater than or equal to 55 degrees and less than or equal to 87 degrees, and an airfoil tip trailing edge mean-line angle ($zeta_{2t}$) between the airfoil mean line at the airfoil trailing edge and an airfoil trailing edge reference line extending through the airfoil trailing edge parallel to the centerline axis and measured at the airfoil tip, the airfoil tip trailing edge mean-line angle ($zeta_{2t}$) greater than or equal to 20 degrees and less than or equal to 70 degrees; each of the plurality of non-splittered airfoils further define an airfoil tip parameter ($x_t$) equal to:

$$\left[\frac{S_t}{\left(\left(1 - S_t \cdot \frac{t_{mt}}{C_t}\right) \cdot a_t \cdot \cos(zeta_{2t})\right)}\right]^{0.5}; 0.5 \leq x_t \leq 2.0;$$

the plurality of non-splittered airfoils define an airfoil tip pressure coefficient ($y_t$) equal to: $(\cos (zeta_{1t}))^2 \cdot [(\tan (zeta_{1t}))^2 - (\tan (zeta_{2t}))^2]$; $y_t - 0.44 x_t^{0.2} \geq 0$; and $y_t - \min(0.92 x_t^{0.2}, 1.0) \leq 0$.

The fan of any preceding clause, wherein: the plurality of non-splittered airfoils define an airfoil count ($N_b$) corresponding to a number of the plurality of non-splittered airfoils, the airfoil count ($N_b$) greater than or equal to 10 and less than or equal to 90; each of the plurality of non-splittered airfoils define: an airfoil midspan max thickness ($t_{mp}$) extending between the airfoil suction side and the airfoil pressure side and measured at an airfoil midspan location between the airfoil root and the airfoil tip, the airfoil midspan max thickness ($t_{mp}$) greater than 0.003 inches and less than 1.8 inches, a midspan radius ($R_p$) extending from the centerline axis to the airfoil midspan location and measured at the airfoil leading edge, the midspan radius ($R_p$) greater than or equal to 2 inches and less than or equal to 80 inches, a midspan chord length ($C_p$) between the airfoil leading edge and the airfoil trailing edge measured at the airfoil midspan location, the midspan chord length ($C_p$)

$$\frac{C_p N_b}{2\pi R_p},$$

greater than 0.47 inches and less than 50 inches, a midspan solidity ($S_p$) equal to a tip radius ($R_t$) extending between the centerline axis and the airfoil tip measured at the airfoil leading edge, the tip radius ($R_t$) greater than or equal to 5 inches and less than or equal to 80 inches, a hub radius ($R_h$) extending from the centerline axis to the airfoil root along the radial direction measured at the airfoil leading edge, the hub radius ($R_h$) greater than or equal to 2 inches and less than or equal to 50 inches, the airfoil height (h) is equal to $R_t - R_h$, an airfoil midspan aspect ratio ($a_p$) equal to $$\frac{h}{C_p},$$

the airfoil midspan aspect ratio ($a_p$) less than or equal to 2.0, an airfoil mean line extending from the airfoil leading edge to the airfoil trailing edge at a location midway between the airfoil pressure side and the airfoil suction side, an airfoil midspan leading edge mean-line angle ($zeta_{1p}$) between the airfoil mean line at the airfoil leading edge and an airfoil leading edge reference line extending through the airfoil leading edge parallel to the centerline axis and measured at the airfoil midspan location, the airfoil midspan leading edge mean-line angle ($zeta_{1p}$) greater than or equal to 50 degrees and less than or equal to 87 degrees, and an airfoil midspan trailing edge mean-line angle ($zeta_{2p}$) between the airfoil mean line at the airfoil trailing edge and an airfoil trailing edge reference line extending through the airfoil trailing edge parallel to the centerline axis and measured at the airfoil midspan location, the airfoil midspan trailing edge mean-line angle ($zeta_{2p}$) greater than or equal to 18 degrees and less than or equal to 70 degrees; each of the plurality of non-splittered airfoils further define an airfoil midspan parameter ($x_p$) equal to:

$$\left[\frac{S_p}{\left(\frac{1 - S_p \cdot t_{mp}}{C_p}\right) \cdot a_p \cdot \cos(zeta_{2p})}\right]^{0.5}; 0.5 \leq x_p \leq 2.0;$$

the plurality of non-splittered airfoils define an airfoil midspan pressure coefficient ($y_p$) equal to: $(\cos(\text{zeta}_{1p}))^2 \cdot [\tan(\text{zeta}_{1p})^2 - (\tan(\text{zeta}_{2p})]^2$; $y_p - 0.29 x_p^{0.4} \geq 0$; and $y_p - \min(0.83 x_p^{0.4}, 1.0) \leq 0$.

The fan of any preceding clause, wherein: the plurality of non-splittered airfoils define an airfoil count ($N_b$) corresponding to a number of the plurality of non-splittered airfoils, the airfoil count ($N_b$) greater than or equal to 10 and less than or equal to 90; each of the plurality of non-splittered airfoils define: a hub max thickness ($t_{mh}$) extending between the airfoil suction side and the airfoil pressure side and measured at the airfoil root, the hub max thickness ($t_{mh}$) greater than 0.003 inches and less than 1.8 inches, a hub chord length ($C_h$) extending between the airfoil leading edge and the airfoil trailing edge measured at the airfoil root, the hub chord length ($C_h$) greater than 0.43 inches and less than 35 inches, a hub solidity ($S_h$) equal to $$\frac{C_h N_b}{2\pi R_h},$$

a tip radius ($R_t$) extending between the centerline axis and the airfoil tip measured at the airfoil leading edge, the tip radius ($R_t$) greater than or equal to 5 inches and less than or equal to 80 inches, a hub radius ($R_h$) extending from the centerline axis to the airfoil root along the radial direction measured at the airfoil leading edge, the hub radius ($R_h$) greater than or equal to 2 inches and less than or equal to 50 inches, the airfoil height (h) is equal to $R_t - R_h$, an airfoil hub aspect ratio ($a_h$) equal to $$\frac{R_t - R_h}{C_h},$$

an airfoil mean line extending from the airfoil leading edge to the airfoil trailing edge at a location midway between the airfoil pressure side and the airfoil suction side, an airfoil hub leading edge mean-line angle ($\text{zeta}_{1h}$) between the airfoil mean line at the airfoil leading edge and an airfoil leading edge reference line extending through the airfoil leading edge parallel to the centerline axis and measured at the airfoil root, the airfoil hub leading edge mean-line angle ($\text{zeta}_{1h}$) greater than or equal to 44 degrees and less than or equal to 87 degrees, and an airfoil hub trailing edge mean-line angle ($\text{zeta}_{2h}$) between the airfoil mean line at the airfoil trailing edge and an airfoil trailing edge reference line extending through the airfoil trailing edge parallel to the centerline axis and measured at the airfoil root, the airfoil hub trailing edge mean-line angle ($\text{zeta}_{2h}$) greater than or equal to 16 degrees and less than or equal to 70 degrees; each of the plurality of non-splittered airfoils further define an airfoil hub parameter ($x_h$) equal to:

$$\left[\frac{S_h}{\left(\frac{1 - S_h \cdot t_{mh}}{C_h}\right) \cdot a_h \cdot \cos(\text{zeta}_{2h})}\right]^{0.5}; 0.5 \leq x_h \leq 2.0;$$

the plurality of non-splittered airfoils define an airfoil hub pressure coefficient ($y_h$) equal to: $(\cos(\text{zeta}_{1h}))^2 \cdot [(\tan(\text{zeta}_{1h}))^2 - (\tan(\text{zeta}_{2h}))^2]$; $y_h - 0.05 x_h^{0.25} \geq 0$; and $y_h - 0.85 x_h^{0.25} \leq 0$.

What is claimed is:

1. A compressor section for a gas turbine engine defining a centerline axis, a radial direction, and a circumferential direction, the compressor section comprising:
   a hub extending along the centerline axis;
   a plurality of non-splittered airfoils extending from the hub from an airfoil root to an airfoil tip opposite the airfoil root, each of the plurality of non-splittered airfoils comprising an airfoil leading edge, an airfoil trailing edge, an airfoil pressure side extending between the airfoil leading edge and the airfoil trailing edge, an airfoil suction side opposite the airfoil pressure side extending between the airfoil leading edge and the airfoil trailing edge, wherein the plurality of non-splittered airfoils define:
      an airfoil count ($N_b$) corresponding to a number of the plurality of non-splittered airfoils, the airfoil count ($N_b$) greater than or equal to 10 and less than or equal to 90; and
   a plurality of splittered airfoils extending from the hub from a splittered root to a splittered tip, each of the plurality of splittered airfoils comprising a splittered leading edge, a splittered trailing edge, a splittered pressure side extending between the splittered leading edge and the splittered trailing edge, a splittered suction side opposite the splittered pressure side extending between the splittered leading edge and the splittered trailing edge, each of the plurality of splittered airfoils disposed between the plurality of non-splittered airfoils, wherein each of the plurality of splittered airfoils define:
      a splittered span location between the splittered root and the splittered tip,
      a splittered mean line extending from the splittered leading edge to the splittered trailing edge at a location midway between the splittered pressure side and the splittered suction side,
      a splittered leading edge mean-line angle ($\text{zeta}_{1s}$) between the splittered mean line at the splittered leading edge and a splittered leading edge reference line extending through the splittered leading edge parallel to the centerline axis, measured at the splittered span location, the splittered leading edge mean-line angle ($\text{zeta}_{1s}$) greater than or equal to 18 degrees and less than or equal to 87 degrees,
      a splittered trailing edge mean-line angle ($\text{zeta}_{2s}$) between the splittered mean line at the splittered trailing edge and a splittered trailing edge reference line extending through the splittered trailing edge parallel to the centerline axis, measured at the splittered span location, the splittered trailing edge mean-line angle ($\text{zeta}_{2s}$) greater than or equal to 18 degrees and less than or equal to 70 degrees,
      a chord length ($C_s$) between the splittered leading edge and the splittered trailing edge measured at the splittered span location, the chord length ($C_s$) greater than 0.1 inches and less than 34 inches,
      a splittered max thickness ($t_{ms}$) extending between the splittered suction side and the splittered pressure side, measured at the splittered span location, the splittered max thickness ($t_{ms}$) greater than 0.005 inches and less than 0.7 inches,
      a splittered span radius ($R_s$) extending from the centerline axis to the splittered span location and measured at the splittered leading edge, the splittered span radius ($R_s$) greater than or equal to 2 inches and less than or equal to 61 inches, a splittered tip radius ($R_{st}$) extending between the centerline axis and the splittered tip in the radial direction and measured at the splittered leading edge, the splittered tip radius ($R_{st}$) greater than or equal to 2.5 inches and less than or equal to 61 inches, a splittered hub radius ($R_{sh}$) extending from the centerline axis and the splittered root in the radial direction and measured at the splittered leading edge, the splittered hub radius ($R_{sh}$) greater than or equal to 2 inches and less than or equal to 50 inches, a splittered height ($h_s$) equal to $R_{st}-R_{sh}$, a splittered aspect ratio ($a_s$) equal to $$\frac{h_s}{C_s},$$

a splittered leading edge angular placement ($\theta_s$) extending between the splittered leading edge and the airfoil suction side of an adjacent one of the plurality of non-splittered airfoils measured in radians, a splittered relationship (f) equal to $$\frac{\theta_s \cdot N_b}{2\pi},$$

the splittered relationship (f) greater than or equal to 0.05 and less than or equal to 0.95, a splittered solidity ($S_s$) equal to $$\frac{C_s \cdot N_b}{2\pi R_s \cdot f},$$

a splittered span parameter ($x_s$) equal to $$\left[\frac{S_s}{\left(\left(1-S_s \cdot \frac{t_{ms}}{C_s}\right) \cdot a_s \cdot \cos(zeta_{2s})\right)}\right]^{0.5},$$

wherein $0.5 \leq x_s \leq 4.5$;

wherein the plurality of splittered airfoils define a splittered pressure coefficient ($y_s$) equal to:

$(\cos(zeta_{1s}))^2 \cdot [(\tan(zeta_{1s}))^2 - (\tan(zeta_{2s}))^2]$;

wherein $0 \leq y_s \leq 0.99$;

wherein $y_s - \min(0.6 x_s^{0.4}, 1.0) \leq 0$; and wherein the plurality of non-splittered airfoils define an airfoil height (h) between the airfoil root and the airfoil tip, and wherein the splittered height ($h_s$) is less than 80% of the airfoil height.

2. The compressor section of claim 1, wherein $1.0 \leq x_s \leq 2.0$.

3. The compressor section of claim 1, wherein:
the airfoil count ($N_b$) is greater than or equal to 15 and less than or equal to 70;
the chord length ($C_s$) is greater than 0.2 inches and less than 10.0 inches;
the splittered span radius ($R_s$) is greater than or equal to 3 inches and less than or equal to 40 inches;
the splittered tip radius ($R_{st}$) is greater than or equal to 3 inches and less than or equal to 25 inches;
the splittered hub radius ($R_{sh}$) is greater than or equal to 4 inches and less than or equal to 40 inches; and the splittered relationship (f) is greater than or equal to 0.2 and less than or equal to 0.5.

4. The compressor section of claim 1, wherein the splittered leading edge mean-line angle ($zeta_{1s}$) is greater than or equal to 40 degrees and less than or equal to 70 degrees.

5. The compressor section of claim 1, wherein the splittered trailing edge mean-line angle ($zeta_{2s}$) is greater than or equal to 30 degrees and less than or equal to 65 degrees.

6. The compressor section of claim 1, wherein the plurality of non-splittered airfoils and the plurality of splittered airfoils are equidistantly spaced about the centerline axis.

7. The compressor section of claim 1, wherein the splittered trailing edge at the splittered root of one of the plurality of splittered airfoils is forward of or aligned with the airfoil trailing edge of an adjacent one of the plurality of non-splittered airfoils.

8. The compressor section of claim 1, wherein the splittered leading edge at the splittered root of one of the plurality of splittered airfoils is aft of the airfoil leading edge of an adjacent one of the plurality of non-splittered airfoils.

9. The compressor section of claim 8, wherein an axial airfoil distance is defined between the airfoil leading edge and the airfoil trailing edge at the airfoil root and extending parallel to the centerline axis, and wherein the splittered leading edge at the splittered root of one of the plurality of splittered airfoils is positioned at one-third the axial airfoil distance from the airfoil leading edge of the adjacent one of the plurality of non-splittered airfoils.

10. The compressor section of claim 8, wherein an axial airfoil distance is defined between the airfoil leading edge and the airfoil trailing edge at the airfoil root and extending parallel to the centerline axis, and wherein the splittered leading edge at the splittered root of one of the plurality of splittered airfoils is positioned at least one-half the axial airfoil distance from the airfoil leading edge of the adjacent one of the plurality of non-splittered airfoils.

11. The compressor section of claim 1, wherein:
each of the plurality of non-splittered airfoils define:
a tip chord length ($C_t$) between the airfoil leading edge and the airfoil trailing edge measured at the airfoil tip, the tip chord length ($C_t$) greater than 0.47 inches and less than 50 inches, a tip radius ($R_t$) extending between the centerline axis and the airfoil tip measured at the airfoil leading edge, the tip radius ($R_t$) greater than or equal to 5 inches and less than or equal to 80 inches, a tip solidity ($S_t$) equal to $$\frac{C_t N_b}{2\pi R_t},$$

a tip max thickness ($t_{mt}$) extending between the airfoil suction side and the airfoil pressure side and measured at the airfoil tip, the tip max thickness ($t_{mt}$) greater than 0.003 inches and less than 1.8 inches, a hub radius ($R_h$) extending from the centerline axis to the airfoil root along the radial direction measured at the airfoil leading edge, the hub radius ($R_h$) greater than or equal to 2 inches and less than or equal to 50 inches, the airfoil height (h) is equal to $R_t-R_h$, an airfoil tip aspect ratio ($a_t$) equal to $$\frac{h}{C_t},$$

an airfoil mean line extending from the airfoil leading edge to the airfoil trailing edge at a location midway between the airfoil pressure side and the airfoil suction side, an airfoil tip leading edge mean-line angle ($zeta_{1t}$) between the airfoil mean line at the airfoil leading edge and an airfoil leading edge reference line extending through the airfoil leading edge parallel to the centerline axis and measured at the airfoil tip, the airfoil tip leading edge mean-line angle ($zeta_{1t}$) greater than or equal to 55 degrees and less than or equal to 87 degrees, and an airfoil tip trailing edge mean-line angle ($zeta_{2t}$) between the airfoil mean line at the airfoil trailing edge and an airfoil trailing edge reference line extending through the airfoil trailing edge parallel to the centerline axis and measured at the airfoil tip, the airfoil tip trailing edge mean-line angle ($zeta_{2t}$) greater than or equal to 20 degrees and less than or equal to 70 degrees;

each of the plurality of non-splittered airfoils further define an airfoil tip parameter ($x_t$) equal to:

$$\left[\frac{S_t}{\left(\left(1 - S_t \cdot \frac{t_{mt}}{C_t}\right) \cdot a_t \cdot \cos(zeta_{2t})\right)}\right]^{0.5};$$

$0.5 \leq x_t \leq 2.0$;

the plurality of non-splittered airfoils define an airfoil tip pressure coefficient ($y_t$) equal to:

$(\cos(zeta_{1t}))^2 \cdot [(\tan(zeta_{1t}))^2 - (\tan(zeta_{2t}))^2]$;

$y_t - 0.44 x_t^{0.2} \geq 0$; and
$y_t - \min(0.92 x_t^{0.2}, 1.0) \leq 0$.

12. The compressor section of claim 11, wherein $0.6 \leq x_t \leq 1.7$.

13. The compressor section of claim 11, wherein:
the airfoil count ($N_b$) greater than or equal to 15 and less than or equal to 70;
the tip radius ($R_t$) greater is than or equal to 5 inches and less than or equal to 70 inches;
the hub radius ($R_h$) greater is than or equal to 3 inches and less than or equal to 30 inches;
the airfoil tip leading edge mean-line angle ($zeta_{1t}$) is greater than or equal to 60 degrees and less than or equal to 75 degrees; and
the airfoil tip trailing edge mean-line angle ($zeta_{2t}$) is greater than or equal to 30 degrees and less than or equal to 70 degrees.

14. The compressor section of claim 1, wherein:
each of the plurality of non-splittered airfoils define:
an airfoil midspan max thickness ($t_{mp}$) extending between the airfoil suction side and the airfoil pressure side and measured at an airfoil midspan location between the airfoil root and the airfoil tip, the airfoil midspan max thickness ($t_{mp}$) greater than 0.003 inches and less than 1.8 inches,
a midspan radius ($R_p$) extending from the centerline axis to the airfoil midspan location and measured at the airfoil leading edge, the midspan radius ($R_p$) greater than or equal to 2 inches and less than or equal to 80 inches,
a midspan chord length ($C_p$) between the airfoil leading edge and the airfoil trailing edge measured at the airfoil midspan location, the midspan chord length ($C_p$) greater than 0.47 inches and less than 50 inches,
a midspan solidity ($S_p$) equal to $$\frac{C_p N_b}{2 \pi R_p},$$

a tip radius ($R_t$) extending between the centerline axis and the airfoil tip measured at the airfoil leading edge, the tip radius ($R_t$) greater than or equal to 5 inches and less than or equal to 80 inches,
a hub radius ($R_h$) extending from the centerline axis to the airfoil root along the radial direction measured at the airfoil leading edge, the hub radius ($R_h$) greater than or equal to 2 inches and less than or equal to 50 inches,
the airfoil height (h) is equal to $R_t - R_h$,
an airfoil aspect ratio ($a_p$) equal to $$\frac{h}{C_p},$$

the airfoil midspan aspect ratio ($a_p$) less than or equal to 2.0,
an airfoil mean line extending from the airfoil leading edge to the airfoil trailing edge at a location midway between the airfoil pressure side and the airfoil suction side,
an airfoil midspan leading edge mean-line angle ($zeta_{1p}$) between the airfoil mean line at the airfoil leading edge and an airfoil leading edge reference line extending through the airfoil leading edge parallel to the centerline axis and measured at the airfoil midspan location, the airfoil midspan leading edge mean-line angle ($zeta_{1p}$) greater than or equal to 50 degrees and less than or equal to 87 degrees, and
an airfoil midspan trailing edge mean-line angle ($zeta_{2p}$) between the airfoil mean line at the airfoil trailing edge and an airfoil trailing edge reference line extending through the airfoil trailing edge parallel to the centerline axis and measured at the airfoil midspan location, the airfoil midspan trailing edge mean-line angle ($zeta_{2p}$) greater than or equal to 18 degrees and less than or equal to 70 degrees;
each of the plurality of non-splittered airfoils further define an airfoil midspan parameter ($x_p$) equal to:

$$\left[\frac{S_p}{\left(\left(\frac{1 - S_p \cdot t_{mp}}{C_p}\right) \cdot a_p \cdot \cos(zeta_{2p})\right)}\right]^{0.5};$$

$0.5 \leq x_p \leq 2.0$;

the plurality of non-splittered airfoils define an airfoil midspan pressure coefficient ($y_p$) equal to:

$(\cos(zeta_{1p}))^2 \cdot [(\tan(zeta_{1p}))^2 - (\tan(zeta_{2p}))^2]$;

$y_p - 0.29 x_p^{0.4} \geq 0$; and
$y_p - \min(0.83 x_p^{0.4}, 1.0) \leq 0$.

15. The compressor section of claim 14 wherein $0.6 \leq x_p \leq 1.9$.

16. The compressor section of claim 14, wherein:
the airfoil count ($N_b$) is greater than or equal to 15 and less than or equal to 70;
the midspan radius ($R_p$) is greater than or equal to 3 inches and less than or equal to 70 inches;
the tip radius ($R_t$) is greater than or equal to 5 inches and less than or equal to 70 inches;
the hub radius ($R_h$) is greater than or equal to 3 inches and less than or equal to 30 inches;
the airfoil midspan leading edge mean-line angle ($zeta_{1p}$) is greater than or equal to 60 degrees and less than or equal to 75 degrees; and
the airfoil midspan trailing edge mean-line angle ($zeta_{2p}$) is greater than or equal to 30 degrees and less than or equal to 70 degrees.

17. The compressor section of claim 1, wherein:
each of the plurality of non-splittered airfoils define:
a hub max thickness ($t_{mh}$) extending between the airfoil suction side and the airfoil pressure side and measured at the airfoil root, the hub max thickness ($t_{mh}$) greater than 0.003 inches and less than 1.8 inches,
a hub chord length ($C_h$) extending between the airfoil leading edge and the airfoil trailing edge measured at the airfoil root, the hub chord length ($C_h$) greater than 0.43 inches and less than 35 inches,
a hub solidity ($S_h$) equal to $$\frac{C_h N_b}{2\pi R_h},$$

a tip radius ($R_t$) extending between the centerline axis and the airfoil tip measured at the airfoil leading edge, the tip radius ($R_t$) greater than or equal to 5 inches and less than or equal to 80 inches,
a hub radius ($R_h$) extending from the centerline axis to the airfoil root along the radial direction measured at the airfoil leading edge, the hub radius ($R_h$) greater than or equal to 2 inches and less than or equal to 50 inches, the airfoil height (h) is equal to $R_t - R_h$,
an airfoil hub aspect ratio (an) equal to $$\frac{R_t - R_h}{C_h},$$

an airfoil mean line extending from the airfoil leading edge to the airfoil trailing edge at a location midway between the airfoil pressure side and the airfoil suction side,
an airfoil hub leading edge mean-line angle ($zeta_{1h}$) between the airfoil mean line at the airfoil leading edge and an airfoil leading edge reference line extending through the airfoil leading edge parallel to the centerline axis and measured at the airfoil root, the airfoil hub leading edge mean-line angle ($zeta_{1h}$) greater than or equal to 44 degrees and less than or equal to 87 degrees, and
an airfoil hub trailing edge mean-line angle ($zeta_{2h}$) between the airfoil mean line at the airfoil trailing edge and an airfoil trailing edge reference line extending through the airfoil trailing edge parallel to the centerline axis and measured at the airfoil root, the airfoil hub trailing edge mean-line angle ($zeta_{2h}$) greater than or equal to 16 degrees and less than or equal to 70 degrees;
each of the plurality of non-splittered airfoils further define an airfoil hub parameter ($x_h$) equal to:

$$\left[\frac{S_h}{\left(\frac{1-S_h \cdot t_{mh}}{C_h}\right) \cdot a_h \cdot \cos(zeta_{2h})}\right]^{0.5};$$

$0.5 \leq x_h \leq 2.0;$ the plurality of non-splittered airfoils define an airfoil hub pressure coefficient ($y_h$) equal to:

$(\cos(zeta_{1h}))^2 \cdot [(\tan(zeta_{1h}))^2 - (\tan(zeta_{2h}))^2];$ $y_h - 0.05 x_h^{0.25} \geq 0;$ and
$y_h - 0.85 x_h^{0.25} \leq 0.$ 18. The compressor section of claim 17, wherein $0.6 \leq x_h \leq 1.9$.

19. The compressor section of claim 17, wherein:
the airfoil count ($N_b$) is greater than or equal to 15 and less than or equal to 70;
the tip radius ($R_t$) is greater than or equal to 5 inches and less than or equal to 70 inches;
the hub radius ($R_h$) is greater than or equal to 3 inches and less than or equal to 30 inches;
the airfoil hub leading edge mean-line angle ($zeta_{1h}$) is greater than or equal to 50 degrees and less than or equal to 75 degrees; and
the airfoil hub trailing edge mean-line angle ($zeta_{2h}$) is greater than or equal to 30 degrees and less than or equal to 70 degrees.

20. A fan for a gas turbine engine defining a centerline axis, a radial direction, and a circumferential direction, the fan comprising:
a hub extending along the centerline axis;
a plurality of non-splittered airfoils extending from the hub from an airfoil root to an airfoil tip opposite the airfoil root, each of the plurality of non-splittered airfoils comprising an airfoil leading edge, an airfoil trailing edge, an airfoil pressure side extending between the airfoil leading edge and the airfoil trailing edge, an airfoil suction side opposite the airfoil pressure side extending between the airfoil leading edge and the airfoil trailing edge, each of the plurality of non-splittered airfoils comprising a root coupled to the hub and a tip opposite the root, wherein the plurality of non-splittered airfoils define:
an airfoil count ($N_b$) corresponding to a number of the plurality of non-splittered airfoils, the airfoil count ($N_b$) greater than or equal to 10 and less than or equal to 90; and
a plurality of splittered airfoils extending from the hub from a splittered root to a splittered tip, each of the plurality of splittered airfoils comprising a splittered leading edge, a splittered trailing edge, a splittered pressure side extending between the splittered leading edge and the splittered trailing edge, a splittered suction side opposite the splittered pressure side extending between the splittered leading edge and the splittered trailing edge, each of the plurality of splittered airfoils disposed between the plurality of non-splittered airfoils, wherein each of the plurality of splittered airfoils define:
a splittered span location between the splittered root and the splittered tip,
a splittered mean line extending from the splittered leading edge to the splittered trailing edge at a location midway between the splittered pressure side and the splittered suction side, a splittered leading edge mean-line angle ($zeta_{1s}$) between the splittered mean line at the splittered leading edge and a splittered leading edge reference line extending through the splittered leading edge parallel to the centerline axis, measured at the splittered span location, the splittered leading edge mean-line angle ($zeta_{1s}$) greater than or equal to 18 degrees and less than or equal to 87 degrees, a splittered trailing edge mean-line angle ($zeta_{2s}$) between the splittered mean line at the splittered trailing edge and a splittered trailing edge reference line extending through the splittered trailing edge parallel to the centerline axis, measured at the splittered span location, the splittered trailing edge mean-line angle ($zeta_{2s}$) greater than or equal to 18 degrees and less than or equal to 70 degrees, a chord length ($C_s$) between the splittered leading edge and the splittered trailing edge measured at the splittered span location, the chord length ($C_s$) greater than 0.1 inches and less than 34 inches, a splittered max thickness ($t_{ms}$) extending between the splittered suction side and the splittered pressure side, measured at the splittered span location, the splittered max thickness ($t_{ms}$) greater than 0.005 inches and less than 0.7 inches, a splittered span radius ($R_s$) extending from the centerline axis to the splittered span location and measured at the splittered leading edge, the splittered span radius ($R_s$) greater than or equal to 2 inches and less than or equal to 61 inches, a splittered tip radius ($R_{st}$) extending between the centerline axis and the splittered tip in the radial direction and measured at the splittered leading edge, the splittered tip radius ($R_{st}$) greater than or equal to 2.5 inches and less than or equal to 61 inches, a splittered hub radius ($R_{sh}$) extending from the centerline axis and the splittered root in the radial direction and measured at the splittered leading edge, the splittered hub radius ($R_{sh}$) greater than or equal to 2 inches and less than or equal to 50 inches, a splittered height ($h_s$) equal to $R_{st} - R_{sh}$, a splittered aspect ratio ($a_s$) equal to $$\frac{h_s}{C_s},$$

a splittered leading edge angular placement ($\theta_s$) extending between the splittered leading edge and the airfoil suction side of an adjacent one of the plurality of non-splittered airfoils measured in radians, a splittered relationship (f) equal to $$\frac{\theta_s \cdot N_b}{2\pi},$$

the splittered relationship (f) greater than or equal to 0.05 and less than or equal to 0.95, a splittered solidity ($S_s$) equal to $$\frac{C_s \cdot N_b}{2\pi R_s \cdot f},$$

a splittered span parameter ($x_s$) equal to $$\left[\frac{S_s}{\left(\left(1 - S_s \cdot \frac{t_{ms}}{C_s}\right) \cdot a_s \cdot \cos(zeta_{2s})\right)}\right]^{0.5},$$

wherein $0.5 \leq x_s \leq 4.5$;

wherein the plurality of splittered airfoils define a splittered pressure coefficient ($y_s$) equal to:
$(\cos(zeta_{1s}))^2 \cdot [(\tan(zeta_{1s}))^2 - (\tan(zeta_{2s}))^2]$;

wherein $0 \leq y_s \leq 0.99$;

wherein $y_s - \min(0.6 x_s^{0.4}, 1.0) \leq 0$; and wherein the plurality of non-splittered airfoils define an airfoil height between the airfoil root and the airfoil tip, and wherein the splittered height ($h_s$) is less than 80% of the airfoil height.

* * * * *